United States Patent
Ochiai et al.

(10) Patent No.: US 10,228,653 B2
(45) Date of Patent: Mar. 12, 2019

(54) SYSTEM AND METHOD FOR RENDERING INTERACTIVE AERIAL VOLUMETRIC GRAPHICS AND GENERATING SPATIAL AUDIO USING FEMTOSECOND LASERS

(71) Applicant: Pixie Dust Technologies, Inc., Tokyo (JP)

(72) Inventors: Yoichi Ochiai, Tokyo (JP); Takayuki Hoshi, Tokyo (JP); Jun Rekimoto, Yokohama (JP); Kota Kumagai, Miyako (JP); Satoshi Hasegawa, Utsunomiya (JP); Yoshio Hayasaki, Utsunomiya (JP)

(73) Assignee: Pixie Dust Technologies, Inc., Minato-Ku, Tokyo (JP)

(*) Notice: Subject to any disclaimer, the term of this patent is extended or adjusted under 35 U.S.C. 154(b) by 0 days.

(21) Appl. No.: 15/092,828

(22) Filed: Apr. 7, 2016

(65) Prior Publication Data

US 2017/0293259 A1    Oct. 12, 2017

(51) Int. Cl.
| | |
|---|---|
| *G03H 1/08* | (2006.01) |
| *G03H 1/00* | (2006.01) |
| *G03H 1/22* | (2006.01) |
| *G02B 26/10* | (2006.01) |
| *G02B 3/00* | (2006.01) |
| *G02B 27/22* | (2018.01) |
| *H04N 13/204* | (2018.01) |

(Continued)

(52) U.S. Cl.
CPC ......... *G03H 1/0005* (2013.01); *G02B 3/0081* (2013.01); *G02B 26/101* (2013.01); *G02B 27/2292* (2013.01); *G03H 1/2205* (2013.01); *G03H 1/2286* (2013.01); *G03H 1/2294* (2013.01); *H04N 13/204* (2018.05); *H04N 13/388* (2018.05); *G02B 3/0006* (2013.01); *G03H 2001/0061* (2013.01); *G03H 2001/2213* (2013.01); *G03H 2001/2292* (2013.01); *G03H 2222/33* (2013.01); *H04N 13/39* (2018.05)

(58) Field of Classification Search
CPC ...... G03H 1/2294; G03H 1/2205; G03H 1/02; G02B 5/32; A61N 7/00
USPC ........................................... 359/15, 9; 601/2
See application file for complete search history.

(56) References Cited

U.S. PATENT DOCUMENTS

2005/0286101 A1* 12/2005 Garner .................... G03H 1/02
                                                         359/9

OTHER PUBLICATIONS

Parker, E. 1948. Three-dimensional cathode-ray tube displays. Journal of the Institution of Electrical Engineers—Part III: Radio and Communication Engineering 95 (September), 371-387(16).

(Continued)

*Primary Examiner* — Audrey Y Chang
(74) *Attorney, Agent, or Firm* — Amster, Rothstein & Ebenstein LLP

(57) ABSTRACT

A plasma generator including: a femtosecond light source that generates a laser pulse beam; a processor that computes a computer generated hologram; a spatial light modulator that modifies the laser pulse beam in accordance with the computer generated hologram; a three dimensional scanner optically coupled to the spatial light modulator to direct the modified laser pulse beam to one or more focal points in air; and a lens that focuses the modified laser pulse beam. The modified laser pulse beam induces a light emission effect at a one or more focal points that can be visible, audible, and palpable.

21 Claims, 55 Drawing Sheets

(51) Int. Cl.
H04N 13/388 (2018.01)
H04N 13/39 (2018.01)

(56) References Cited

OTHER PUBLICATIONS

Sutherland, I. E. 1968. A head-mounted three dimensional display. In Proceedings of the Dec. 9-11, 1968, Fall Joint Computer Conference, Part I, ACM, New York, NY, USA, AFIPS '68 (Fall, part I), 757-764.
Willis, K., Brockmeyer, E., Hudson, S., and Poupyrev, I. 2012. Printed optics: 3d printing of embedded optical elements for interactive devices. In Proceedings of the 25th Annual ACM Symposium on User Interface Software and Technology, ACM, New York, NY, USA, UIST '12, 589-598.
Yoshida, T., Kamuro, S., Minamizawa, K., Nii, H., and Tachi, S. 2010. Repro3d: Full-parallax 3d display using retro-reflective projection technology. In ACM SIGGRAPH 2010 Emerging Technologies, ACM, New York, NY, USA, SIGGRAPH '10, 20:1-20:1.
Bolanowski, S. J. Jr., Gescheider, G. A., Verrillo, R.T., and Checkosky, C. M. 1968. Four channels mediate the mechanical aspects of touch. The Journal of the Acoustical Society of America. 84, 5, 1680-1694.
Brandt, E. H. 1989. Levitation in physics. Science 243, 4889, 349-355.
Carter, T., Seah, S. A., Long, B., Drinkwater, B., and Subramanian, S. 2013 Ultrahaptics: Multi-point mid-air haptic feedback for touch surfaces. In Proceedings of the 26th Annual ACM Symposium on User Interface Software and Technology, ACM, New York, NY, USA, UIST '13, 505-514.
Gupta, S., Morris, D., Patel, S. N., and Tan, D. 2013. Airwave: Non-contact haptic feedback using air vortex rings. In Proceedings of the 2013 ACM International Joint Conference on Pervasive and Ubiquitous Computing, ACM, New York, NY, USA, UbiComp '13, 419-428.
Hasegawa, K., and Shinoda, H. 2013. Aerial display of vibrotactile sensation with high spatial-temporal resolution using large-aperture airborne ultrasound phased array. In World Haptics Conference (WHC), 2013, 31-36.
Hoshi, T., Takahashi, M., Iwamoto, T., and Shinoda, H. 2010. Noncontact tactile display based on radiation pressure of airborne ultrasound. IEEE Transactions on Haptics 3, 3, 155.165.
Inoue, S., Kobayashi-Kirschvink, K. J., Monnai, Y., Hasegawa, K., Makino, Y., and Shinoda, H. 2014. Horn: The hapt-optic reconstruction. In ACM SIGGRAPH 2014 Emerging Technologies, ACM, New York, NY, USA, SIGGRAPH '14, 11:1.11:1.
Iwaki, S., Morimasa, H., Noritsugu, T., and Kobayashi, M. 2011. Contactless manipulation of an object on a plane surface using multiple air jets. In ICRA, IEEE, 3257-3262.
Jun, J. H, Park, J. R., Kim, S. P., Min, B. Y., Park J. Y., Kim H. S., Choi, S., Jung, S. J., Hwa P. S., Yeom D. I., Jung, G. I., Kim J. S., and Chung, S. C. 2015. Laser-induced thermoelastic effects can evoke tactile sensations. Scientific Reports 5, 11016.
Lee, H., Kim, J. S., Choi, S., Jun, J. H., Park, J.R., Kim, A. H., Oh, H. B., Kim, H. S, and Chung, S. C., 2015. Mid-air tactile stimulation using laser induced thermoelastic effects: The first study for indirect radiation. In World Haptics conference (WHC), 2015, 374-380.
Marshall, M., Carter, T., Alexander, J., and Subramanian, S. 2012. Ultra-tangibles: Creating movable tangible objects on interactive tables. In Proceedings of the SIGCHI Conference on Human Factors in Computing Systems, ACM, New York, NY, USA, CHI '12, 2185-2188.
Yoneyama, M., Fujimoto, J., Kawamo, Y., and Sasabe, S. 1983. The audio spotlight: An application of nonlinear interaction of sound waves to a new type of loudspeaker design. The Journal of the Acoustical Society of America 73, 5, 1532-1536.
Satoshi Saga. 2014. HeatHapt Thermal Radiation-Based Haptic Display. Haptic Interaction. vol. 277 of the series Lecture Notes in Electrical Engineering, pp. 105-107.
Sodhi, R., Poupyrev, I., Glisson, M., and Israr, A. 2013. Aireal: Interactive tactile experiences in free air. ACM Trans. Graph. 32, 4 (July), 134:1-134:10.
Suzuki, Y., and Kobayashi, M. 2005. Air jet driven force feedback in virtual reality. Computer Graphics and Applications, IEEE 25, 1 (January), 44-47.
Weiss, M., Wacharamanotham, C., Voelker, S., and Borchers, J. 2011. Fingerflux: Near-surface haptic feedback on tabletops. In Proceedings of the 24th Annual ACM Symposium on User Interface Software and Technology, ACM, New York, NY, USA, UIST '11, 615-620.
Johnston, B., Bailey, J., and McKinnon, D. 2014. Nico: An open-source interface, bridging the gap between musician and tesla coil. In Proc. ICMC-SMC-2014, 711-714.
Ochiai, Y., Oyama, A., Hoshi, T., and Rekimoto, J. 2014. The colloidal metamorphosis: Time division multiplexing of the reflectance state. IEEE Computer Graphics and Applications 34,4, 42-51.
Ochiai, Y., Kumagai, K., Hoshi, T., Rekimoto, J., Hasegawa, S., and Yoshio, H. 2015. Fairy lights in femtoseconds: Aerial and volumetric graphics rendered by focused femtosecond laser combined with computational holographic fields. In ACM SIGGRAPH 2015 Emerging Technologies, ACM, New York, NY, USA, SIGGRAPH '15.
Ochiai, Y., Kumagai, K., Hoshi, T., Rekimoto, J., Hasegawa, S., and Yoshio, H. 2015. Fairy lights in femtoseconds: Aerial and volumetric graphics rendered by focused femtosecond laser combined with computational holographic fields. CoRR abs/1506.06668.
Sano, S., Hashishin, Y., and Nakayama, T. 2011. Development of cw co2 laser percussion technique. 5th Kuala Lumpur International Conference on Biomedical Engineering 2011, vol. 35 of the series IFMBE Proceedings, pp. 296-299.
Shinagawa, K., Amemiya, Y., Takemura, H., Kagami, S., and Mizoguchi, H. 2007. Three dimensional simulation and measurement of sound pressure distribution generated by 120 ch plane loudspeaker array. In Systems, Man and Cybernetics, 2007. ISIC. IEEE International Conference on, 278-283.
Shinoda, H., Nakajima, T., Ueno, K., and Koshida, N. 1999. Thermally induced ultrasonic emission from porous silicon. Nature 400, 853-855.
National Institute of Advanced Industrial Science and Technology. "Spatial Three-dimensional Drawing (3D Display)" Success in High Performance Experiment of Technology. Press Release. Jul. 2007. <http://www.aist.go.jp/aist_i/press_release/pr2007/pr20070710/pr20070710.html> (last accessed on Feb. 23, 2015).
Benjamin Long, Sue Ann Seah, Tom Carter and Sriram Subramanian. 2014. Rendering Volumetric Haptic Shapes in Mid-Air using Ultrasound. ACM Transactions on Graphics, vol. 33, No. 6, Article 181, 181:1-181:10 (November).
Ammosov, M. V., Delone, N. B., and Krainov, V. P. 1986. Tunnel ionization of complex atoms and of atomic ions in an alternating electromagnetic field. Soviet Physics JETP 64, 6, 1191-1194.
Barnum, P. C., Narasimhan, S. G., and Kanade, T. 2010. A multilayered display with water drops. ACM Trans. Graph. 29, 4 (July), 76:1-76:7.
Bengtsson, J. 1994. Kinoform design with an optimal-rotation-angle method. Appl. Opt. 33, 29 (Oct), 6879-6884.
Benzie, P., Watson, J., Surman, P., Rakkolainen, I., Hopf, K.,Urey, H., Sainov, V., and Von Kopylow, C. 2007. A survey of 3dtv displays: Techniques and technologies. Circuits and Systems for Video Technology, IEEE Transactions on 17, 11 (Nov), 1647-1658.
Cain, C. P., Roach, W. P., Stolarski, D. J., Noojin, G. D., Kumru, S. S., Stockton, K. L., Zohner, J. J., and Rockwell, B. A., 2007. Infrared laser damage thresholds for skin at wavelengths from 0.810 to 1.54 microns for femto-to-microsecond pulse durations. In Proc. SPIE, vol. 6435, 64350W-1-64350W-12.
Clar, J. 2008. traffic. http://www.viatraffic.org/index.php?page=3ddisplay-cube-v4 (last accessed on Jan. 20, 2015).
Denk, W., Strickler, J., and Webb, W. 1990. Two-photon laser scanning fluorescence microscopy. Science 248, 4951, 73-76.
Downing, E., Hesselink, L., Ralston, J., and Macfarlane, R. 1996. A three-color, solid-state, three-dimensional display. Science 273, 5279, 1185-1189.

(56) References Cited

OTHER PUBLICATIONS

Eitoku, S., Tanikawa, T., and Suzuki, Y. 2006. Display composed of water drops for filling space with materialized virtual three-dimensional objects. In Virtual Reality Conference, 2006, 159-166.

Favalora, G. E., Napoli, J., Hall, D. M., Dorval, R. K., Giovinco, M., Richmond, M. J., and Chun, W. S. 2002. 100-million-voxel volumetric display. In Proc. SPIE, vol. 4712, 300-312.

Follmer, S., Leithinger, D., Olwal, A., Hogge, A., and Ishii, H. 2013. inform: Dynamic physical affordances and constraints through shape and object actuation. In Proceedings of the 26th Annual ACM Symposium on User Interface Software and Technology, ACM, New York, NY, USA, UIST '13, 417-426.

Grossman, T., and Balakrishnan, R. 2006. The design and evaluation of selection techniques for 3d volumetric displays. In Proceedings of the 19th Annual ACM Symposium on User Interface Software and Technology, ACM, New York, NY, USA, UIST '06, 3-12.

Hasegawa, S., and Hayasaki, Y. 2013. Liquid volumetric display with parallel optical access by computer-generated hologram. In Digital Holography and Three-Dimensional Imaging, Optical Society of America, DTh2A.7.

Hashida, T., Kakehi, Y., and Naemura, T. 2011. Photochromic sculpture: Volumetric color-forming pixels. In ACM SIGGRAPH 2011 Emerging Technologies, ACM, New York, NY, USA, SIGGRAPH '11, 11:1-11:1.

Hayasaki, Y., Sugimoto, T., Takita, A., and Nishida, N. 2005. Variable holographic femtosecond laser processing by use of a spatial light modulator. Appl. Phys. Lett. 87, 031101-1-031101-3.

Hoshi, T., Takahashi, M., Nakatsuma, K., and Shinoda, H. 2009. Touchable holography. In ACM SIGGRAPH 2009 Emerging Technologies, ACM, New York, NY, USA, SIGGRAPH '09, 23:1-23:1.

Ishikawa, H., and Saito, H 2008. Closed-line based representation of 3d shape for point cloud for laser plasma scanning 3d display. Proc. 18th International Conference on Artificial Reality and Telexistence (ICAT08), Yokohama, Japan, Dec. 28-35.

Ishikawa, H., and Saito, H. 2008. Point cloud representation of 3d shape for laser-plasma scanning 3d display. In Industrial Electronics, 2008 (IECON 2008) 34th Annual Conference of IEEE, 1913-1918.

Ishikawa, H., Watanabe, H., Aoki, S., Saito, H., Shimada, S., Kakehata, M., Tsukada, Y., and Kimura, H. 2011. Surface representation of 3d object for aerial 3d display. In Proc. SPIE, vol. 7863, 78630X-1-78630X-8.

Iwata, H., Yano, H., Nakaizumi, F., and Kawamura, R. 2001. Project feelex: Adding haptic surface to graphics. In Proceedings of the 28th Annual Conference on Computer Graphics and Interactive Techniques, ACM, New York, NY, USA, SIGGRAPH '01, 469-476.

Berlin, Edwin P. A three-dimensional computer display. Submitted in Partial Fulfillment of the Requirements for the Degree of Bachelor of Science at the Massachusetts Institute of Technology May 1978.

Jones, A., Mcdowall, I., Yamada, H., Bolas, M., and Debevec, P. 2007. Rendering for an interactive 360 deg light field display. ACM Trans. Graph. 26, 3 (July).

Karnik, A., Henderson, A., Dean, A., Pang, H., Campbell, T., Sakurai, S., Herrmann, G., Izadi, S., Kitamura, Y., and Subramanian, S. 2011. Vortex: Design and implementation of an interactive volumetric display. In CHI '11 Extended Abstracts on Human Factors in Computing Systems, ACM, New York, NY, USA, CHI EA '11, 2017-2022.

Keldysh, L. V. 1965. Ionization in the field of a strong electromagnetic wave. Soviet Physics JETP 20 (May), 1307-1314.

Kimura, H., Uchiyama, T., and Yoshikawa, H. 2006. Laser produced 3d display in the air. In ACM SIGGRAPH 2006 Emerging Technologies, ACM, New York, NY, USA, SIGGRAPH '06.

Kimura, H., Asano, A., Fujishiro, I., Nakatani, A., and Watanabe, H. 2011. True 3d display. In ACM SIGGRAPH 2011 Emerging Technologies, ACM, New York, NY, USA, SIGGRAPH '11, 20:1-20:1.

Lee, C., Diverdi, S., and Hollerer, T. 2009. Depth-fused 3d imagery on an immaterial display. IEEE Trans. Vis. Comput. Graph. 15, 1, 20-33.

Lee, J., Post, R., and Ishii, H. 2011. Zeron: Mid-air tangible interaction enabled by computer controlled magnetic levitation. In Proceedings of the 24th Annual ACM Symposium on User Interface Software and Technology, ACM, New York, NY, USA, UIST '11, 327-336.

Macfarlane, D. L. 1994. Volumetric three-dimensional display. Appl. Opt. 33 (November), 7453-7457.

Masia, B., Wetzstein, G., Didyk, P., and Gutierrez, D. 2013. A survey on computational displays: Pushing the boundaries of optics, computation, and perception. Computers & Graphics 37, 8, 1012-1038.

Matoba, Y., Tokui, T., Sato, R., Sato, T., and Koike, H. 2012. Splashdisplay: Volumetric projection using projectile beads. In ACM SIGGRAPH 2012 Emerging Technologies, ACM, New York, NY, USA, SIGGRAPH '12, 19:1-19:1.

Ochiai, Y., Hoshi, T., Oyama, A., and Rekimoto, J. 2013. Poppable display: A display that enables popping, breaking, and tearing interactions with people. In 2013 IEEE 2nd Global Conference on Consumer Electronics (GCCE), 124-128.

Ochiai, Y., Hoshi, T., and Rekimoto, J. 2014. Pixie Dust: Graphics generated by levitated and animated objects in computational acoustic-potential field. ACM Trans. Graph. 33, 4 (Jul.), 85:1-85:13.

Paddock, S. 1999. Confocal laser scanning microscopy. Biotechniques 27, 5, 992-1004.

Pereira, T., Rusinkiewicz, S., and Matusik, W. 2014. Computational light routing: 3d printed optical fibers for sensing and display. ACM Trans. Graph. 33, 3 (June), 24:1-24:13.

Poupyrev, I., Nashida, T., Maruyama, S., Rekimoto, J., and Yamaji, Y. 2004. Lumen: Interactive visual and shape display for calm computing. In ACM SIGGRAPH 2004 Emerging Technologies, ACM, New York, NY, USA, SIGGRAPH '04, p. 17.

Rakkolainen, I., Diverdi, S., Olwal, A., Candussi, N., Hü Llerer, T., Laitinen, M., Piirto, M., and Palovuori, K. 2005. The interactive fogscreen. In ACM SIGGRGAPH 2005 Emerging Technologies, ACM, New York, NY, USA, SIGGRAPH '05.

Saito, H., Kimura, H., Shimada, S., Naemura, T., Kayahara, J., Jarusirisawad, S., Nozick, V., Ishikawa, H., Murakami, T., Aoki, J., Asano, A., Kimura, T., Kakehata, M., Sasaki, F., Yashiro, H., Mori, M., Torizuka, K., and Ino, K. 2008. Laser-plasma scanning 3d display for putting digital contents in free space. Proc. SPIE 6803, pp. 680309-1-680309-10.

Soltan, P., Trias, J. A., Robinson, W. R., and Dahlke, W. J. 1992. Laser-based 3-d volumetric display system. In Proc. SPIE, vol. 1664, 177-192.

Sullivan, A. 2004. Depthcube solid-state 3d volumetric display. In Proc. SPIE, vol. 5291, 279-284.

\* cited by examiner

FIG. 1A
FIG. 1B
FIG. 1C
FIG. 1D
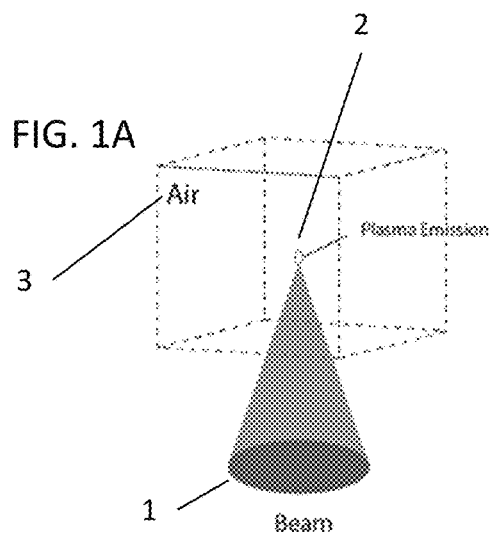
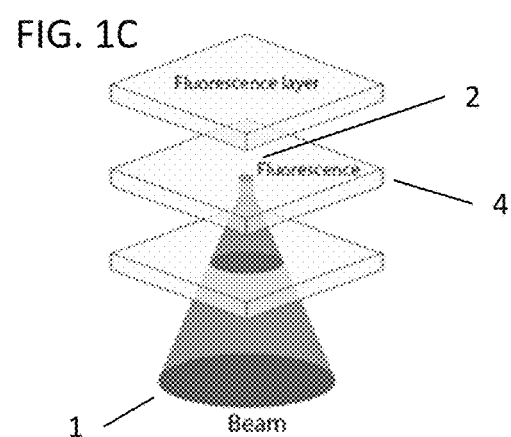
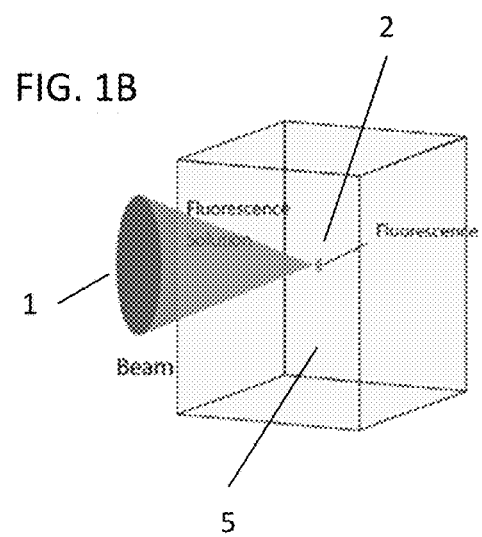
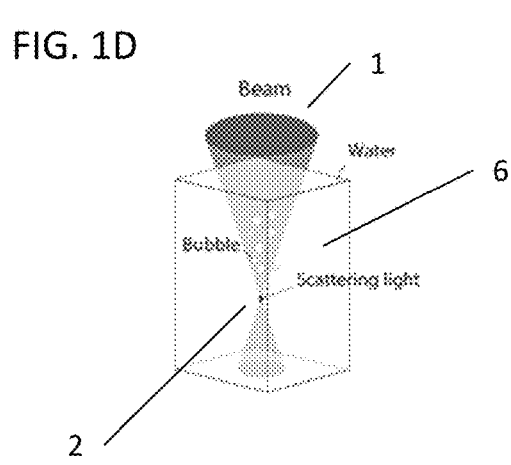

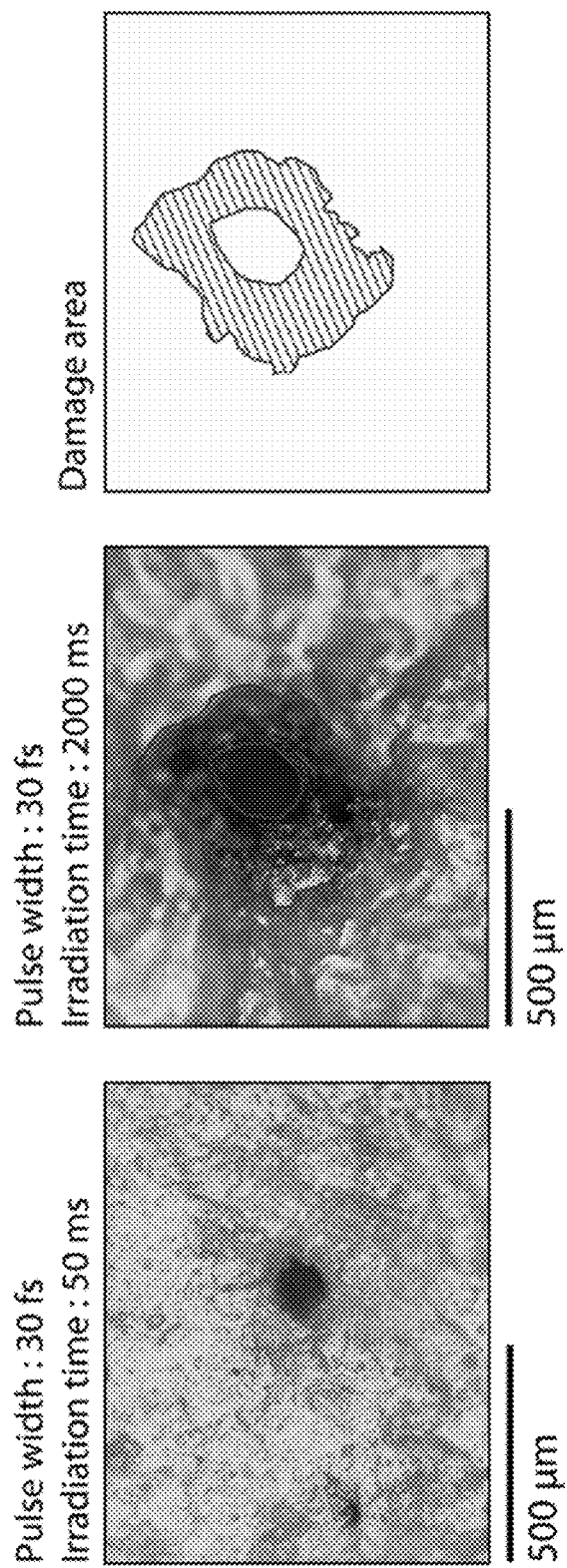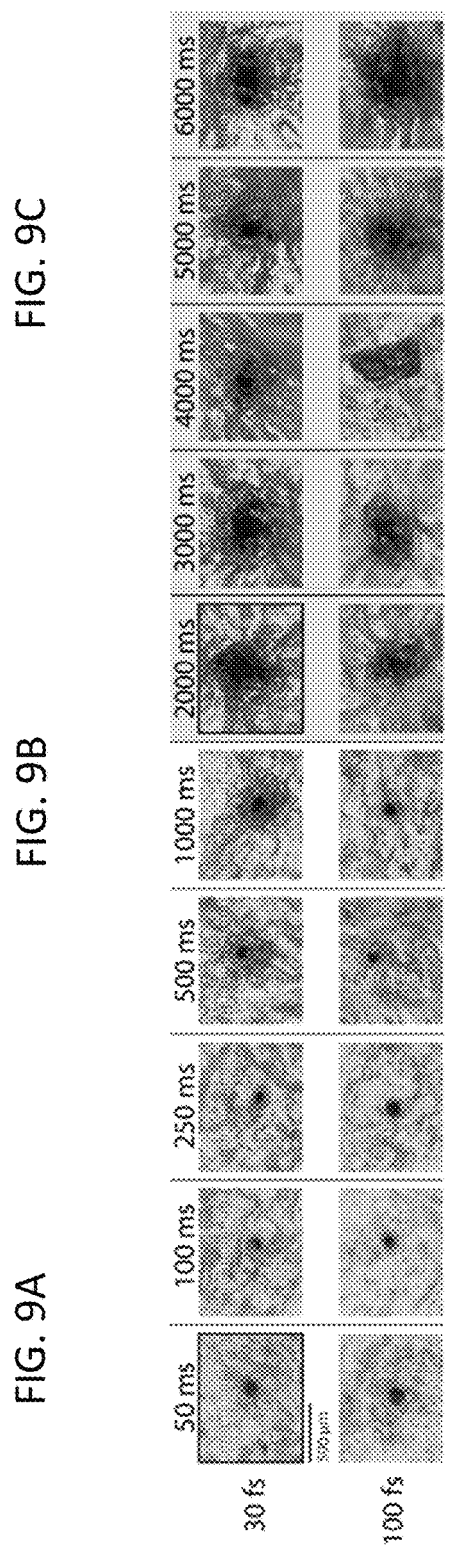
FIG. 9A  FIG. 9B  FIG. 9C  FIG. 9D

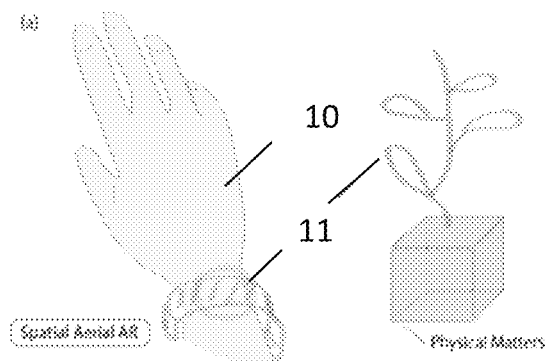 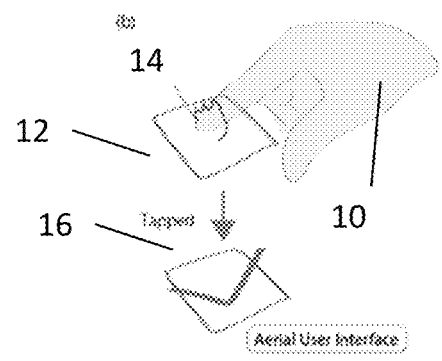
FIG. 10A　　　　　　　　　　　FIG. 10B
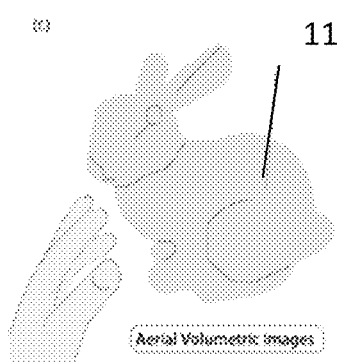 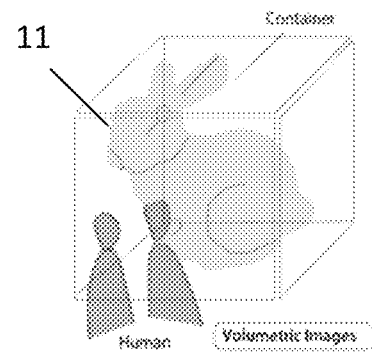
FIG. 10C　　　　　　　　　　　FIG. 10D

| Merged (7 persons) | | Answered | |
|---|---|---|---|
| | | Dot | Line |
| Applied | Dot | 8 | 20 |
| | Line | 17 | 11 |

| Inverse (3) | | Answered | |
|---|---|---|---|
| | | Dot | Line |
| Applied | Dot | 2 | 10 |
| | Line | 11 | 1 |

| Ambiguous (2) | | Answered | |
|---|---|---|---|
| | | Dot | Line |
| Applied | Dot | 4 | 4 |
| | Line | 4 | 4 |

| Bias-toward-line (2) | | Answered | |
|---|---|---|---|
| | | Dot | Line |
| Applied | Dot | 2 | 6 |
| | Line | 2 | 6 |

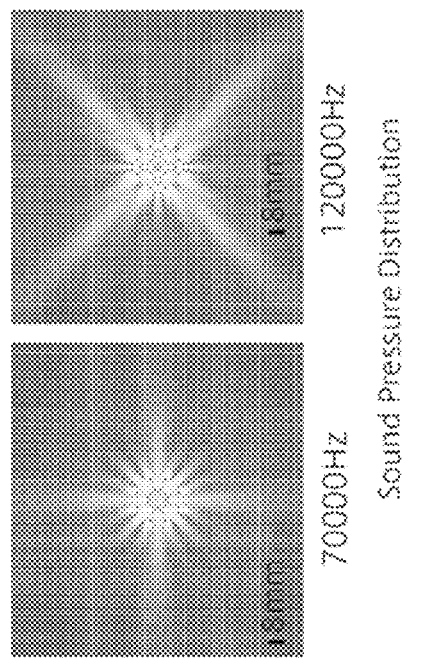
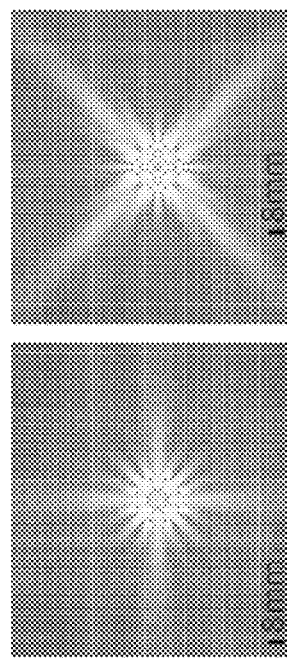
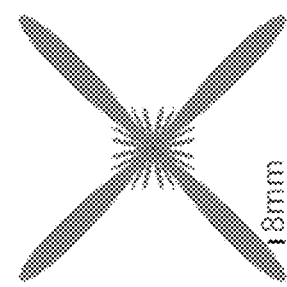
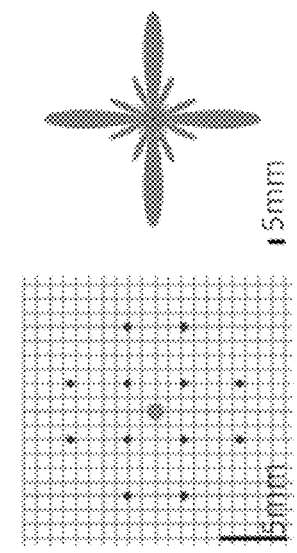
FIG. 30A  FIG. 30B  FIG. 30C  FIG. 30D  FIG. 30E

SYSTEM AND METHOD FOR RENDERING INTERACTIVE AERIAL VOLUMETRIC GRAPHICS AND GENERATING SPATIAL AUDIO USING FEMTOSECOND LASERS

FIELD OF THE INVENTION

The present invention generally relates to interactive volumetric audiovisual displays. More particularly, the present invention relates to systems and methods for generating a high-resolution, safe, interactive, three-dimensional images in air with spatial audio using a high-intensity ultra-short-pulse laser source.

BACKGROUND

Three-dimensional (3D) displays have attracted great attention over the past five decades. 3D virtual objects were originally displayed with a head-mounted display. Since then, continuous efforts have been made to explore 3D displays that have planar surfaces, and several methods have been developed to provide stereopsis for binocular vision. The 3D displays that employ glasses to achieve this are based on techniques such as anaglyphs, time-division, and polarization. On the other hand, those 3D displays that do not rely on glasses are based on techniques such as parallax barrier and lenticular lens array. Although these methods can offer effective 3D images, they require calculation and generation of precise images for multiple viewpoints, and users have to stay within a limited view angle.

A different approach to realizing advanced 3D displays is using a physical 3D space to render graphics instead of a planar surface. This approach forms a visual representation of an object in three physical dimensions, as opposed to the planar image of traditional screens that simulate depth through a number of different visual effects. These 3D displays, which are called volumetric displays, allow users to view the displayed images from any angle. Volumetric displays arranged "voxels" in a 3D space.

Lasers can be used to induce light spots ("voxels") in various media at arbitrary points in three dimensional space. Some of the advantages of laser-induced light spots include: (1) no need to arrange special materials and suspend it in a medium to emit light; (2) wireless transmission of power so that structures that possibly obstruct the line-of-sight can be avoided; and (3) precise control of the laser owing to the progress in optical technologies. In an aerial laser-based volumetric display, voxels in air, i.e., plasma, are generated by high-intensity lasers which are achieved by shortening pulse duration (e.g., nanoseconds) under a limited total power.

An aerial volumetric display was first demonstrated using a nanosecond laser where a rendering speed of only 100 dot/sec was achieved. (Kimura et al. 2006). Later, 1,000 dot/sec was achieved by using a femtosecond laser. (Saito et al. 2008). However, these systems had low resolution.

Laser-based volumetric displays in media other than air have also been demonstrated. A nanosecond laser-based volumetric display in water was developed where a rendering speed of 50,000 dot/sec was achieved. (Kimura et al 2011). Later, a femtosecond laser-based volumetric display in a fluorescent medium with parallel optical access via computer generated hologram was developed to achieve higher resolution. (Hasegawa et al. 2013). In these systems, the induced light spots are not accessible.

Aerial volumetric displays are usually accompanied by interaction with a user's hand. It would be advantageous to integrate aerial haptics into an aerial volumetric display in order to provide tactile sensation to a user interacting with virtual objects. Aerial haptics is advantageous because force can be projected from a distance without physical contact or wearable devices, and it has high programmability. In other words, it can be set and rearranged at an arbitrary position in a 3D space because it does not require physical actuators. For example, recent research has explored the use of an array of ultrasonic transducers (Hoshi et al. 2010; Carter et al. 2013; Inoue et al. 2014) or air vortices (Sodhi et al. 2013; Gupta et al. 2013) for non-contact haptic stimulation and feedback. These approaches lack spatial precision and has limited working distance. Recent research has also explored the use of a low power nanosecond laser to evoke tactile sensation on human skin. (Jun et al. 2015; Lee et al. 2015). However, it was shown that even a low power nanosecond laser can instantaneously increase the temperature of human skin.

Aerial volumetric displays are usually accompanied by a sound system. Conventional studies on controlling spatial sound distribution in free space include multi-channel audio synthesis and ultrasound based superdirective speakers (parametric speakers) as a means of generating 3D acoustics. Conventional surround sound speakers simulate an immersive sonic environment by using multiple speakers to surround a target area and generate a spatial pattern via interference of audible sound waves (Shinagawa et al. 2007). But the quality of the aural experience depends on the position of the listener relative to the placement of the surround sound speakers and the aural experience is generally optimized for a listener located at the center of the target area. Parametric speakers can generate a narrow beam of audible sound using an ultrasonic transducer array, such that only individuals targeted by the device is able to hear the emitted sound. (Yoneyama et al 1983). In both of these sound systems, audible sound is generated from outside the target area and emitted towards the target area.

Consequently, it would be desirable to have a high resolution and scalable aerial volumetric display. It would also be desirable to have an aerial volumetric display with improved non-contact haptic feedback. It would also be desirable to have a personalized immersive spatial audio experience to accompany a 3D visual experience viewed from a particular vantage point.

SUMMARY

The present invention is directed to a system and method for rendering aerial volumetric graphics in which a femtosecond laser excites physical matter to emit light at an arbitrary 3D position.

An object of this invention is to increase scalability and resolution of a laser-based aerial volumetric display through the use of a spatial light modulator and computational phase modulation. Another object of this invention is to provide safe interaction between a user and a volumetric display through the use of a femtosecond laser. Another object of this invention is to realize functional aerial audio speakers through the use of a femtosecond laser. Plasma induced at the focal points of an ultra-short pulse laser generates impulse-like shockwaves, and the focal points can be manipulated and distributed at arbitrary positions within a 3D space. Computational graphical design methods are used to implement spatial audio speakers.

According to an exemplary embodiment, a system including an ultra-fast femtosecond laser source, a spatial light modulator, and a 3D position scanner can provide simultaneous addressing, combined computer-generated holograms, near-field laser plasma display, touch-based plasma interaction, and immersive audio.

An advantage provided by the present invention is that the laser-induced plasma resulting from a femtosecond light source can be used for interactive control including haptic interaction. The lower energy plasma minimizes the danger posed to a person making contact with the plasma.

A plasma generator according to an exemplary embodiment of the present invention includes: a femtosecond light source that generates a laser pulse beam; a processor that computes a computer generated hologram, a spatial light modulator that modifies the laser pulse beam in accordance with the computer generated hologram; a three dimensional scanner optically coupled to the spatial light modulator to direct the modified laser pulse beam to one or more focal points in air; and a lens that focuses the modified laser pulse beam.

According to another exemplary embodiment of the present invention, the modified laser pulse beam induces a light emission effect at a focal point.

According to another exemplary embodiment of the present invention, the modified laser pulse beam induces simultaneous light emission effects at a plurality of focal points.

According to another exemplary embodiment of the present invention, the three dimensional scanner comprises a galvano scanner and a varifocal lens.

According to another exemplary embodiment of the present invention, the plasma generator includes a sensor that detects a change in brightness of the light emission effect.

According to another exemplary embodiment of the present invention, the modified laser pulse beam generates a palpable light field at the one or more focal points.

According to another exemplary embodiment of the present invention, the plasma generator includes an ultrasonic phased array that generates a palpable acoustic field at the one or more focal points.

According to another exemplary embodiment of the present invention, the plasma generator includes one or more ultrasonic phased arrays that generate a palpable acoustic field surrounding the one or more focal points.

According to another exemplary embodiment of the present invention, the palpable light field comprises a tactile image pattern.

According to another exemplary embodiment of the present invention, the lens is a microlens array.

According to another exemplary embodiment of the present invention, the plasma generator includes a sensor that detects the position of objects.

According to another exemplary embodiment of the present invention, the plasma generator includes an amplitude modulator that changes the intensity of the laser pulse beam in accordance with an audio signal.

According to an exemplary embodiment of the present invention, a method of generating plasma includes: generating a femtosecond laser pulse beam; computing a computer generated hologram; modifying the femtosecond laser pulse beam in accordance with the computer generated hologram to generate one or more modified laser pulse beams; directing the one or more modified laser pulse beams to one or more focal points in air.

According to another exemplary embodiment of the present invention, the method of generating plasma includes the step of focusing the one or more modified laser pulse beams to induce a light emission effect at the one or more focal points.

According to another exemplary embodiment of the present invention, the method of generating plasma includes the step of detecting a change in brightness of said light emission effect.

According to another exemplary embodiment of the present invention, the method of generating plasma includes the step of generating a palpable light field at the one or more focal points.

According to another exemplary embodiment of the present invention, the method of generating plasma includes the step of generating ultrasonic acoustic radiation pressure at the one or more focal points.

According to another exemplary embodiment of the present invention, the method of generating plasma includes the step of generating ultrasonic acoustic radiation pressure around the one or more focal points.

According to another exemplary embodiment of the present invention, the method of generating plasma includes the step of inducing the light emission effects at a rate sufficient to generate persistence of vision.

According to another exemplary embodiment of the present invention, the method of generating plasma includes the step of determining a new set of one or more focal points that is adjacent to the one or more focal points.

According to another exemplary embodiment of the present invention, the method of generating plasma includes the step of using the detected change as an input selection.

According to another exemplary embodiment of the present invention, the method of generating plasma includes the step of directing a sequence of the one or more modified light pulse beams at the one or more focal points to induce light emission effects that create sound waves.

According to another exemplary embodiment of the present invention, wherein the sound waves are in the audible frequency range.

According to another exemplary embodiment of the present invention, wherein the sound waves are in the ultrasonic frequency range.

According to another exemplary embodiment of the present invention, the method of generating plasma includes the step of modulating the intensity of the femtosecond laser pulse beam in accordance with an audio signal.

According to another exemplary embodiment of the present invention, the method of generating plasma includes the step of attenuating the femtosecond laser pulse beam.

According to another exemplary embodiment of the present invention, the one or more focal points are positioned in accordance with the computer generated hologram to generate directed soundwaves.

According to an exemplary embodiment of the present invention, a method of generating plasma includes: generating a plurality of femtosecond laser pulse beams; directing said plurality of femtosecond laser pulse beams, alternately, to two or more focal points.

According to another exemplary embodiment of the present invention, the two or more focal points comprise a palpable tactile pattern.

According to another exemplary embodiment of the present invention, the method of generating plasma includes the step of generating ultrasonic acoustic radiation pressure near said two or more focal points.

Other features and advantages of embodiments of the invention will become readily apparent from the following detailed description, the accompanying drawings and the appended claims.

BRIEF DESCRIPTION OF THE DRAWINGS

The features and advantages of exemplary embodiments of the present invention will be more fully understood with reference to the following, detailed description when taken in conjunction with the accompanying figures, wherein:

FIGS. 1A-1D show different laser-induced effects in different media, and more specifically, FIG. 1A shows plasma emission resulting from the ionization of air, FIG. 1B shows fluorescence induced in a fluorescent solution, FIG. 1C shows fluorescence induced in a fluorescent plate, and FIG. 1D shows light scattered by microbubbles resulting from the cavitation of water;

FIG. 8A shows a chart comparing the normalized intensity of a plasma dot against the pulse energy for simultaneously generated voxels; FIG. 8B shows a close up photograph of the simultaneously addressed plasma dots and the computer generated hologram used to generate the plasma dot pattern; and FIG. 8C shows a series of photographs comparing the intensity of a plasma dot against the pulse energy for simultaneously generated voxels;

FIGS. 9A-9D show experimental results regarding skin damage, and more specifically, FIG. 9A shows the effect of exposure of 30 fs laser pulses for 50 ms on a leather sheet; FIG. 9B shows the effect of exposure of 30 fs laser pulses for 2,000 ms on a leather sheet; FIG. 9C is an illustration of the damage area of a leather sheet exposed to 30 fs laser pulses for 2,000 ms; and FIG. 9D is a series of photographs showing the effect of exposure of 30 and 100 fs laser pulses and an irradiation time ranging from 50 ms to 6,000 ms;

FIGS. 10A-10D show different applications of the present invention, and more specifically, FIG. 10A shows an example of spatial augmented reality; FIG. 10B shows an example of haptic feedback; FIG. 10C shows an example of volumetric graphics in air; and FIG. 10D shows an example of volumetric graphics in air surrounded by transparent walls, such as glass walls;

FIG. 14A shows a logo rendered in air, FIG. 14B shows a cylinder rendered in air, FIG. 14C shows a heart rendered in air and the effect of interaction; FIG. 14D shows a fairy rendered in air; FIG. 14E shows "sprouts" coming out from a seed as an example of augmented reality; FIG. 14F shows a light point that changes into a "jewel" after contact with a ring; and FIG. 14G shows direct interaction between a light point and a finger;

FIG. 18A shows the perceptual threshold of laser shockwaves; FIG. 18B shows the perceptual threshold of ultrasonic acoustic radiation pressure; and FIG. 18C shows the perceptual threshold of a cross-field including shockwaves of laser plasma under the preload of ultrasonic vibrotactile stimulation that is weaker than the perceptual threshold;

FIG. 19A shows a rendering of a dot, FIG. 19B shows a rendering of a line, and FIG. 19C shows a rendering of a box;

FIG. 20 shows experimental results regarding the discrimination of spatial patterns rendered with laser plasma;

FIG. 23A shows a user's view of visiohaptic augmented reality FIG. 23B shows laser plasma, FIG. 23C shows acoustic field visualized by dry ice, FIG. 23D shows augmented reality marker in camera's view, and FIG. 23E shows the position of a camera in a system setup;

FIG. 24 shows rendered plasma images of particular alphanumeric characters belonging to a Braille alphabet set and their corresponding computer generated holograms;

FIGS. 30A-30E show the input and output screens of a graphical simulator that simulates the interference patterns of sound points, more specifically, FIG. 30A shows a graphical user interface that enables a user to input the positions of sound sources by selecting a point on a grid, FIG. 30B shows the directivity results for a particular set of input points, FIG. 30C shows the directivity results for another set of input points, FIG. 30D show heat map results for a particular set of input points, and FIG. 30E show heat map results for another set of input points;

FIG. 35A represents the time domain and FIG. 3B represents the frequency domain;

FIG. 41A shows a single conventional speaker configuration, FIG. 41B shows a single directed speaker configuration, FIG. 41C shows a conventional multiple speaker configuration, and FIG. 41D shows a multiple directed speaker configuration;

FIG. 42A shows the use of spatial sound with 3D graphics, FIG. 42B shows the use of spatial sound with aerial graphics, FIG. 42C shows the use of spatial sound with interactive aerial graphics;

DETAILED DESCRIPTION

Figure 2:
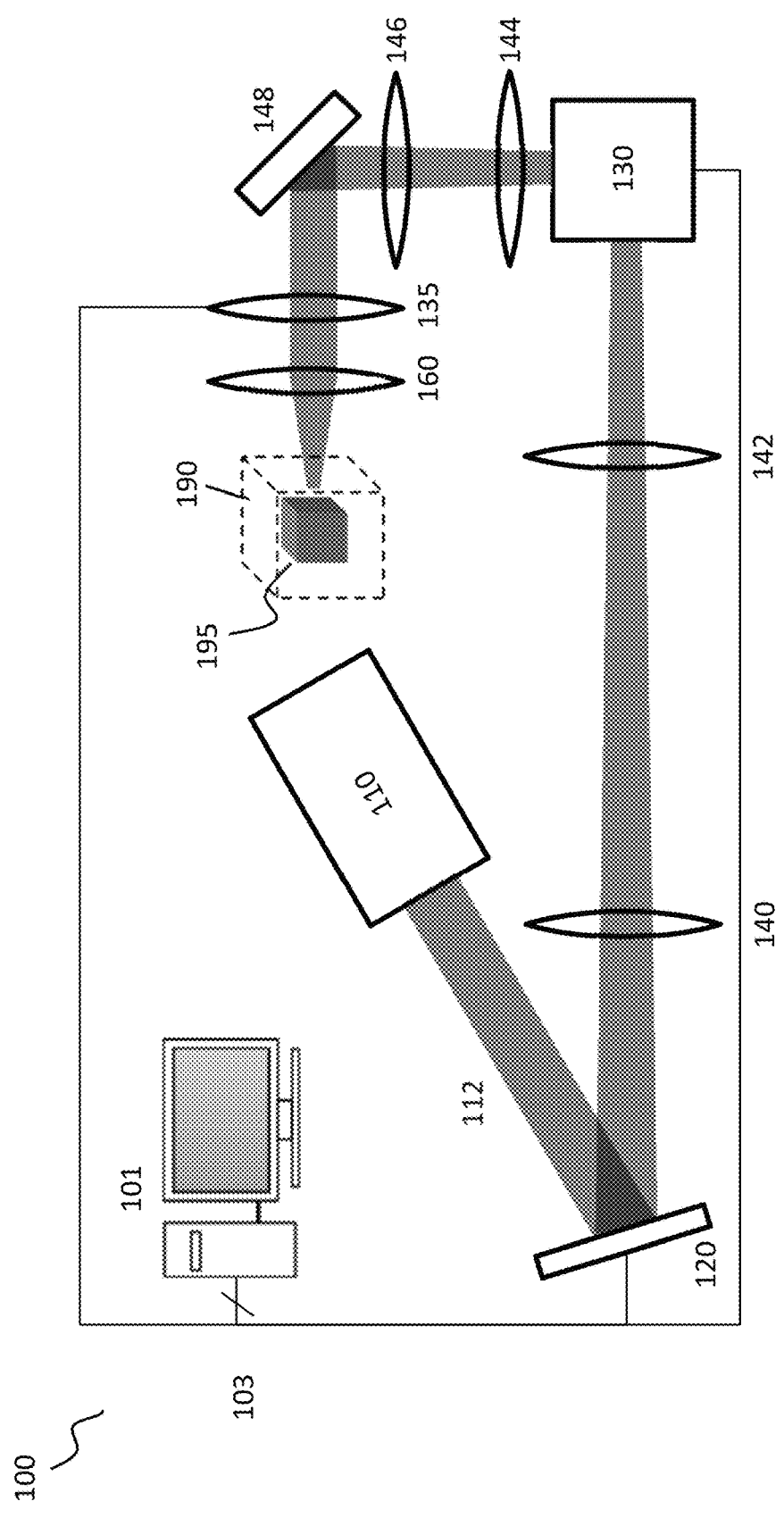
FIG. 2 shows a system for rendering volumetric graphics according to an exemplary embodiment of the invention.

The present invention provides a system and method for rendering touchable aerial volumetric graphics and generating immersive audio using a femtosecond laser. In accordance with the embodiments of the present invention disclosed and described herein, laser induced light spots generated in air are used to provide an interactive audiovisual experience. The purpose of the present invention is to provide a safe and scalable system and method that permit a high-intensity laser for general, wide-spread application.

There are three types of laser-induced effects that produce light spots, including fluorescence, cavitation, and ionization. The specific effect involved is dependent on the display medium. FIGS. 1A-1D show the different laser-induced effects in various display media.

Laser-induced fluorescence occurs when a laser is used to excite a fluorescent solution or fluorescent object. First, an orbital electron in a molecule or atom is excited when the atom absorbs one or more photons. Next, a new photon is emitted when the electron relaxes. If two photons are absorbed at the same time, the wavelength of the emitted photon is half of that of the original photons. The wavelength required to excite an electron is dependent upon the type of fluorescent material. The emitted light has N times shorter wavelength when N photons are absorbed simultaneously. This effect occurs with a relatively low-intensity laser (an energy of nJ to mJ is sufficient).

Laser-induced cavitation occurs when a laser is used to excite a liquid medium. Microbubbles are generated at the focal point of a laser in a liquid medium. This localized cluster of microbubbles diffuses the incident laser such that the laser is seen as a point light. The color of this point light depends directly on the wavelength of the incident laser. This fact indicates that RGB images can be expressed by using multiple lasers of different wavelengths. This effect is material-independent and requires an intense laser to generate microbubbles.

Finally, laser-induced ionization occurs when laser is used to excite a gas medium. In particular, tunnel ionization can produce sufficiently visible light, which predominantly occurs when the laser intensity is greater than $10^{14}$ W/cm$^2$. The potential well of a molecule or atom is deformed by the electric field of the high-intensity laser to have a potential barrier, and then, an electron has the opportunity to leave the atom (i.e., ionization) based on the tunnel effect. It is known that higher laser intensity leads to higher tunnel-ionization probability; that is, more electrons are ionized. The ionized electron is recombined with the atom after a half-cycle and a photon is emitted; this effect is called laser breakdown. The emitted light has a bluish-white color.

Exemplary embodiments of the present invention focus on the ionization effect because it can be easily achieved in air and has wider applications, but the other effects are taken into account when different display media are discussed. Additionally, the plasma induced by the exemplary embodiments can be touched. Further, the induced plasma generates impulse-like shockwaves which can be modulated to generate soundwaves.

FIG. 2 shows an exemplary embodiment of a system 100 for rendering simultaneous multipoint volumetric graphics in accordance with the present invention. The system 100 includes a system controller 101, femtosecond laser source 110, a spatial light modulator 120, a 3D position scanner including a galvano mirror scanner unit 130 and a varifocal lens 135, an objective lens 160, and optical lenses and mirror 140, 142, 144, 146, and 148. The system 100 can be used to display images in various display media, including, e.g., air and water.

The system controller 101 is operatively coupled to the spatial light modulator 120, the galvano scanner unit 130, and the varifocal lens 135. It directs a laser pulse beam through an optical circuit to form an image 195 in workspace 190. The system controller 101 maintains these components in object-image correspondence and synchronizes them with the femtosecond light source 110 to render graphics generated by the system controller 101.

As shown in FIG. 2, a femtosecond light source 110 generates a laser pulse beam 112 which is modulated by a spatial light modulator 120. The modulated laser pulse beam passes through two lenses 140 and 142 that act as beam reducers. Next, the laser pulse beam is then redirected by a galvano scanner unit 130, which determines the XY-axis focal points of the laser beam in the workspace 190. The redirected laser pulse beam passes through two lenses 144 and 146 that act as beam expanders. Next, the laser pulse beam is redirected by mirror 148 to pass through a varifocal lens unit 135, which adjusts the Z-axis focal points of the laser pulse beam in the workspace 190. Finally, the laser pulse beam enters the objective lens 160 which concentrates the laser pulse beam on the focal point to excite a particular point of the display medium (e.g., air, water, fluorescent plate, or fluorescent solution) in the workspace 190.

System controller 101 can be, for example, a conventional personal computer ("PC") with video output ports (e.g., DVI port) and Universal Serial Bus (USB) ports.

The femtosecond light source 110 can be a commercially available laser. Ultra-short pulses can be generated by converting low-intensity and long-duration pulses to high-intensity and short-duration pulses. If the time-averaged laser power is constant, the peak intensity differs according to the pulse width. For example, a 30-fs pulse width has a threefold greater peak intensity than a 100-fs pulse width at the same time-averaged power. For aerial plasma production, the laser peak intensity, rather than the pulse width, is more important.

When selecting a femtosecond light source for a volumetric display, the display medium is a major factor to consider. The available wavelengths differ depending on how light spots are induced. In the case of ionization, the plasma color is wavelength-independent and, hence, it is reasonable to use invisible wavelengths, e.g., infrared or ultraviolet. In the case of fluorescence, multi-electron fluorescence is reasonable, in which multiple photons are absorbed by molecules and a single photon with shorter wavelength is emitted. Thus, it is acceptable to use invisible ultraviolet light because only the emissions would be visible. On the other hand, when applying cavitation, a visible wavelength should be used, because the incoming wavelength is diffused by the microbubbles and observed, unchanged, as the emission.

Figure 5A:
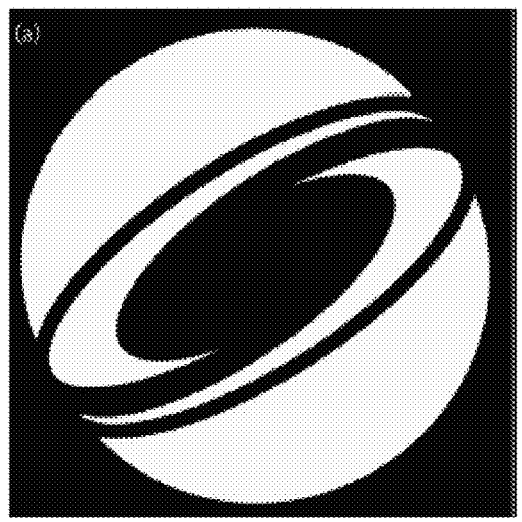
FIG. 5A shows an example of an original image.
Figure 5B:
FIG. 5B shows a converted spot-array image of the original image.
Figure 5C:
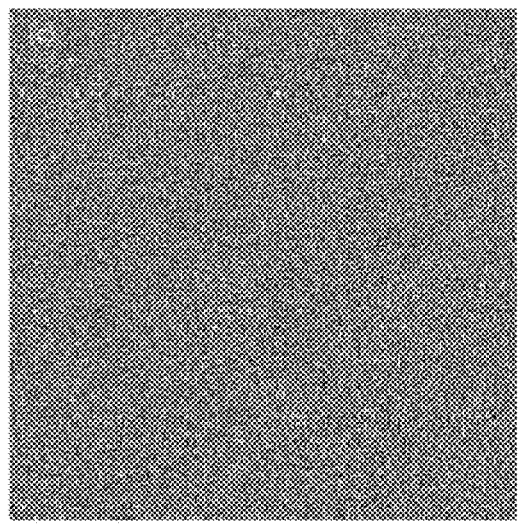
FIG. 5C shows a computer generated hologram of the original image to be displayed on a spatial light modulator.

A spatial light modulator 120 can be a commercially available spatial light modulator (SLM), which is an optical device that can be used to render holograms. An SLM modifies the phases or intensities or both of light rays and produces various spatial distributions of light based on interference. It can be used to generate arbitrary laser patterns. This is accomplished by applying computation phase modulation based on a computer generated hologram (CGH) hologram, i.e., two dimensional cross sections of laser beams. An example of a desired output image and its corresponding CGH is shown in FIGS. 5A and 5C. FIG. 5A shows a target image and FIG. 5C shows a CGH derived from the target image. The SLM uses the CGH image to modulate a laser pulse beam. Thus, an SLM enables the generation of one or more focal points in 3D space from one laser pulse beam, including simultaneously addressed voxels.

In accordance with embodiments of the present invention, any desired 3D graphics can be generated by computational holography using an SLM as follows.

The spatial phase control of light enables the control of focusing position along both the lateral (XY) and axial (Z) directions. A complex amplitude (CA) of the reconstruction from the computer generated hologram (CGH) $U_r$ is given by the Fourier transform of that of a designed CGH pattern $U_h$:

$$U_r(v_x, v_y) = \int\int U_h(x, y)\exp[-i2\pi(xv_x + yv_y)]dxdy \quad (1)$$
$$= a_r(v_x, v_y)\exp[i\varphi_r(v_x, v_y)]$$

$$U_h(x, y) = a_h(x, y)\exp[i\varphi_h(x, y)] \quad (2)$$

where $a_h$ and $\varphi_h$ are the amplitude and phase of the hologram plane displayed on the SLM, respectively, and, $a_r$ and $\varphi_r$ are the amplitude and phase of the reconstruction plane, respectively. For simplicity, $a_h$ can be constant when an irradiation light to the CGH can be approximated as a plane wave with a uniform intensity distribution. $\varphi_h$ is derived by an optimal-rotation-angle (ORA) method. The spatial intensity distribution of reconstruction is actually observed as $|U_r|^2 = a_r^2$.

To control the focusing position along the lateral (XY) direction, the CGH is designed based on a superposition of CAs of blazed gratings with variety of azimuth angles. If the reconstruction has N-multiple focusing spots, CGH includes N-blazed gratings. In the control of focusing position along the axial (Z) direction, a phase Fresnel lens pattern $$\varphi_p(x, y) = k\frac{x^2 + y^2}{2f}$$

with a focal length f is simply added to $\varphi_h$ where $$k = \frac{2\pi}{\lambda}$$

is a wave number. In this case, the spatial resolution of the SLM determines the minimum focal length, following the assumption that the size of the induced-light spot is equal to the size of the focal point of the laser.

The ORA method is an optimization algorithm to obtain the reconstruction of CGH composed of spot array with a uniform intensity. FIGS. 5A and 5C show an example of an original image and its corresponding CGH. It is based on adding an adequate phase variation calculated by an iterative optimization process into the CGH. In the i-th iterative process, amplitude $a_h$ and phase $\varphi_h^{(i)}$ at a pixel h on the CGH plane, and a complex amplitude (CA) $U_r^{(i)}$ at a pixel r corresponding to focusing position on the reconstruction plane are described in the computer as follows, $$U_r^{(i)} = \omega_r^{(i)} \sum_h u_{hr}^{(i)} \quad (3)$$
$$= \omega_r^{(i)} \sum_h a_h \exp[i(\varphi_{hr} + \varphi_h^{(i)})],$$

where $u_{hr}$ is CA contributed from a pixel h on the CGH plane to a pixel r on the reconstruction plane, $\varphi_{hr}$ is a phase contributed by the light propagation from a pixel h to a pixel r, $\omega_r^{(i)}$ is a weight coefficient to control the light intensity at pixel r. In order to maximize the sum of the light intensity $\Sigma_r |U_r^{(i)}|^2$ at each pixel r, the phase variation $\Delta\varphi_h^{(i)}$ added to $\varphi_h^{(i)}$ at pixel h is calculated using flowing equations.

$$\Delta\varphi_h^{(i)} = \tan^{-1}\left(\frac{S_2}{S_1}\right), \quad (4)$$
$$S_1 = \sum_r \omega_r^{(i)} a_h \cos(\varphi_r - \varphi_{hr} - \varphi_h^{(i)}), \quad (5)$$
$$S_2 = \sum_r \omega_r^{(i)} a_h \sin(\varphi_r - \varphi_{hr} - \varphi_h^{(i)}), \quad (6)$$

where $\omega_r$ is the phase at pixel r on the reconstruction plane. The phase of CGH $\varphi_h^{(i)}$ is updated by calculated $\Delta\varphi_h^{(i)}$ as follows, $$\varphi_h^{(i)} = \varphi_h^{(i-1)} + \Delta\varphi_h^{(i)}. \quad (7)$$

Furthermore, $\omega_r^{(i)}$ is also updated according to the light intensity of the reconstruction obtained by the Fourier transform of Eq. (7) in order to control the light intensity at pixel r on the reconstruction plane $$\omega_r^{(i)} = \omega_r^{(i-1)} \left(\frac{I_r^{(d)}}{I_r^{(i)}}\right)^\alpha \quad (8)$$

where $I_r^{(i)} = |U_r^{(i)}|^2$ is the light intensity at pixel r on the reconstruction plane in the i-th iterative process, $I_r^{(d)}$ is an desired light intensity, and a is constant. The phase variation $\Delta\varphi_h^{(i)}$ is optimized by the above iterative process (Eqs. (4)-(8)) until $I_r^{(i)}$ is nearly equal to $I_r^{(d)}$. Consequently, the ORA method facilitates the generation of a high quality CGH.

In general, an SLM has an array of pixels that modulate a laser beam's intensities, phases, or both. SLMs have pixels that are dynamically reconfigurable. For example, SLMs include LCOS SLMs which modulates phase and DMD SLMs which modulates intensity. Dual mask SLMs can modulate both phase and intensity.

Liquid crystal SLMs include a layer of liquid crystal molecules in which the orientation of the liquid crystal molecules within this layer are controlled by electrodes, i.e., pixels, and the phases of light rays reflected by or transmitted through this layer are spatially modulated according to the directions of the liquid crystal molecules. There are two types of liquid crystal based SLMs—liquid crystal (LC)-SLMs and liquid crystal on silicon (LCOS)-SLMs.

An LC-SLM is a parallel-aligned nematic liquid crystal spatial light modulator (PAL-SLM) coupled with a liquid crystal display (LCD) and a laser diode (LD). This device is frequently used to display real-time CGHs. A PAL-SLM is included of a liquid crystal layer, a dielectric mirror layer for a specified wavelength range, and an optically addressed photoconductive layer containing amorphous silicon, which are sandwiched between two transparent indium tin oxide electrodes. The liquid crystal molecules in the liquid crystal layer are aligned in parallel. When incident light illuminates the photoconductive layer, the impedance of this layer decreases and the electric field across the liquid crystal layer increases accordingly. With this increased field, the liquid crystal molecules become tilted in the propagation direction of the readout light and the effective refractive index of the liquid crystal layer decreases. Pure phase modulation occurs only when the polarization direction of the femtosecond laser is parallel to the aligned direction of the liquid crystal molecules. The CGH pattern on the LCD illuminated by the LD is applied to the photoconductive layer through imaging optics.

An LCOS-SLM is a spatial light modulator having a structure in which a liquid crystal layer is arranged on a silicon substrate. An electric addressing circuit is formed on the silicon substrate by semiconductor technology. The top layer contains pixels made by aluminum electrodes, each of which controls its electrical potential independently. A glass substrate is placed on the silicon substrate while keeping a constant gap, and the liquid crystal material is filled in that gap. The liquid crystal molecules are aligned in parallel by the alignment control technology provided on the silicon and glass substrates without being twisted between both substrates. The electric field across the liquid crystal layer can be controlled pixel by pixel. This causes the liquid crystal molecules to tilt according to the electric field so that the phase of light can be modulated. There is also a dielectric mirror layer that provides enhanced reflectivity which reduces the internal absorption, making operation with a high power laser possible.

A Digital Micromirror Device (DMD) SLM includes a layer of microscopic mirrors, i.e. pixels, that can be individually rotated to an on or off state and two pairs of electrodes at each mirror that control the position of the mirror. The amplitudes of light rays reflected by this layer are spatially modulated according to the directions of the mirrors.

In other words, SLMs act as optical phased arrays. Thus, by accurately controlling the light wave front, an SLM can be used for optical beam pattern forming to generate holograms. Referring to Eqs. (3)-(8), for LCOS SLM, $a_h$ is fixed at 1 and $\varphi_h$ is calculated. Instead, for DMD SLM, $\varphi_h$ is fixed to 0 and $a_h$ is calculated under the condition $0 \leq a_h \leq 1$. After that, $a_h$ is rounded to 0 or 1. $a_h$ is 0 when $0 \leq a_h \leq 0.5$, and $a_h$ is 1 when $0.5 \leq a_h \leq 1$.

When selecting an SLM for a volumetric display, the resolution and speed of an SLM are major factors to consider. An LCOS SLM has lower operation frequency than a DMD SLM, although it has higher diffraction efficiency, which means that LCOS SLMs are slower but has better resolution. A DMD SLM has higher heat resistance and higher operation frequency than an LCOS-SLM. A summary of the factors to consider is shown in Table 1.

TABLE 1

Table of Design Parameters

| Laser Source | SLM | Optics |
|---|---|---|
| Pulse Duration (fs) | DMD SLM (binary/fast) | Workspace (m³) |
| Pulse Energy (J) | LCOS (gray scale/slow) | Maximum Energy (W) |
| Repeat Frequency (Hz) | | |

FIG. 2 shows an optical circuit based on reflective SLMs, however transmissive SLMs may also be used instead of reflective SLMs. Preferably, SLM 120 is a reflective type linear array SLM that uses nematic liquid crystal elements, including, for example, liquid crystal SLMs (LC-SLMs) and liquid crystal on silicon SLMs (LCOS-SLMs). The energy conversion rate of SLM 120 should be between about 65% to about 95%.

SLMs that are currently commercially available are not resistant to strong laser sources and, therefore, the laser power of a laser light source cannot be used to its fullest extent. In addition, the optical circuit should be developed and treated carefully because when using high intensity lasers, ionization can sometimes occur in the optical circuit. This reduces output energy and can also destroy optical components.

An alternative to an SLM is a fabricated modulator which is an array of passive small lenses, e.g., a microlens array, whose apertures can be set by a cover such as a paper sheet with holes. A fabricated modulator provides multi-access because each of the lenses has its own focal point. Although a fabricated modulator is static, a fabricated modulator is advantageous for its higher resolution.

A 3D position scanner can be a combination of commercially available optical components. The 3D position scanner of the exemplary embodiment depicted in FIG. 2 includes a galvano scanner unit 130 and a varifocal lens unit 135. The galvano scanner unit 130 scans the luminous point along the lateral directions (X- and Y-scanning), while the varifocal lens unit 135 can vary its focal point in the axial direction (Z-scanning). The galvano scanner unit 130 and varifocal lens 135 are controlled by system controller 101. Further, they may be coupled to the system controller through additional control circuits.

In another exemplary embodiment, an SLM can also be used as a 3D position scanner because the spatial phase control of light enables the control of focusing position along both the lateral (XY) and axial (Z) directions.

Thus, with regards to a 3D position scanner, one of ordinary skill in the art would appreciate that there are three options to place a point at an intended position. One is leading a laser there by adjusting a galvano scanner unit and varifocal lens unit and another is changing the focal point by modifying the cross-section distribution of the laser by the SLM. The SLM and the combination of a galvano scanner unit and varifocal lens can render graphics within approximately the same area. However, one limitation is that the scanning speed of an SLM is not as fast as the scanning speed of a galvano scanner unit. The conditions and/or response times of these devices determine which is a suitable 3D position scanner. A third option is the combination of an SLM, galvano scanner unit, and a varifocal lens unit.

The SLM is used to render additional dots in a single frame, while the galvano scanner is used primarily for positioning the rendered holograms. For a femtosecond laser pulsed at a frequency of 1 kHz, the theoretical rendering limit is 33 dots per second for 30 frames per second.

The system controller 101 can be a conventional personal computer ("PC") executing custom software applications and is coupled, directly or indirectly (via e.g., USB cable or optional interface circuit boards, e.g., PCI driver boards) to a 3D position scanner. In a preferred embodiment, the system controller 101 is connected to a galvano scanner unit 130 and the varifocal lens unit 135 via USB.

SLMs have a control interface port that can be connected to a video output port (e.g., DVI port) of standard computer system. The alignment of liquid crystal molecules or micromirrors can be controlled pixel by pixel. In a preferred embodiment, an SLM 120 is connected to the system controller 101 as an external display via a DVI port.

The system controller 101 derives a CGH based on a desired output image and controls the SLM 120, galvano scanner unit 130, and varifocal lens unit 135 in synchronicity with the femtosecond light source 110 to display the output image in the workspace 190. To monitor the workspace 190, a camera can be connected to the system controller 101.

An objective lens can be a commercially available optical lenses. An objective lens is not a special lens but an ordinary optical lens placed at the end of the optical circuit. An objective lens is required to produce aerial plasma. Laser plasma generation needs a laser power of $PW/cm^2$. Thus, an objective lens is required to focus the light to make focal points to generate aerial plasma. The aperture size of the objective lens determines the maximum workspace, because the angle range of the galvano scanner unit 130, i.e., XY scanning is limited by the aperture size of the objective lens. A larger aperture size permits a larger angle range of the galvano scanner, but a smaller aperture size results in more laser power.

In other exemplary embodiments, the objective lens is optional. The laser power needed to excite water is small compared to the laser power needed to excite air. Thus, the objective lens is not required in volumetric displays using water as the display medium. The size of the workspace of these displays are limited by the angle range of galvano scanner and depth range of varifocal lens.

In the exemplary embodiment depicted in FIG. 2, the optical circuit includes a pair of beam expander lenses and a pair of beam reducer lenses. These beam expander and reducer lenses can be commercially available optical lenses. They are used to adjust the beam spot size of the laser beam and are added for the purpose of compatibility, i.e., when the components of the optical circuit operate under different beam spot sizes. They are optional.

The display medium is the key factor determining the potential interactions because the brightness of the voxels depends on the absorption rate of the chosen medium. The order of the required energy decreases from air to water. Thus, the air breakdown for tunnel ionization requires energy in the order of $PW/cm^2$, while water may require energy in the order of $MW/cm^2$. Further, the softness of the medium determines the interaction.

With aerial plasma, a user can insert their hand or touch the plasma. Liquid voxels caused by cavitation can yield full color expression when full-color laser sources are employed; however, the air breakdown method can only produce monochromatic expression.

The size of a voxel (i.e., emission effect) is about the size of the focal point of the laser. The focal point is usually an ovoid with two diameters. One is the diameter perpendicular to the path of the laser beam, $w_f$, which is the diffraction limit and determined by the original beam width, a, the focal length, r, and the wavelength, $\lambda$, such that $$w_f = 2\lambda \frac{r}{a}, \qquad (9)$$

and the other is the diameter parallel to path of the laser beam, $w_d$, which is geometrically obtained from the relationship a: $w_f$=r:$w_d$/2, such that $$w_d = 4\lambda \left(\frac{r}{a}\right)^2. \qquad (10)$$

An emission dot generated by a high-intensity laser has a tail along the propagation direction (filamentation). This tail is generated as the self-focusing behavior due to the optical Kerr effect. It competes with the natural diffraction of the laser beam and is undesirable when rendering 3D graphics in air. Practically, this effect is invisible to the human eye because the light at the focal point is much brighter.

The spatiotemporal resolution of a volumetric display is determined by the number of dots per frame (dpf). When the dots are displayed in darkness, the minimum required energy for each dot is equal to the laser breakdown threshold, $E_{lbd}$. The total output energy, $E_{tot}$, is divided among the dots by the SLM. The number of dots per laser pulse, $N_{dot}$, is expressed as $$N_{dot} = \frac{E_{tot}}{E_{lbd}}, \qquad (11)$$

The number of dots per frame is determined by $N_{dot}$, the repeat frequency, $F_{rep}$, of the laser pulses, and the frame time, $T_f$, which is determined based on the persistence of human vision. Hence, $$dpf = N_{dot} \times F_{rep} \times T_f \qquad (12)$$

For example, if $N_{dot}$=100, $F_{rep}$=1 kHz, and $T_f$=100 ms, an animation of 10,000 dpf is played in 10 fps. Note that, in practice, the number of dots per frame is determined by the bottleneck of the time response of the galvano scanners and/or the SLM, instead of by $F_{rep}$.

Spatiotemporal resolution can be improved by using the SLM to generate simultaneously addressed voxels and increasing the repetition frequency of the laser source. A Fourier CGH is used to create simultaneously addressed voxels. A Fourier CGH can be optimized using the Optimal-Rotation-Angle (ORA) method. The amount of improvement to the resolution arising from the use of simultaneously addressed voxels depends on (1) the energy of the laser source, (2) durability of SLM, (3) refresh rate of the SLM, and (4) resolution of the SLM. However, due to the nature of liquid crystal molecules in the SLM, improvements to the refresh rate and durability of the SLM are limited. Thus, to achieve higher resolution in aerial plasma imaging, repetition frequency plays important role to increasing resolution. Higher energy and repetition frequency will solve the resolution.

In contrast, because less energy is required to induce emissions in water, the SLM can still play an important role in achieving a high resolution image in this medium. Thus, parallel access to 3D position can achieve a high resolution image in a volumetric display.

EXPERIMENTS

The following experiments were conducted to prove the feasibility and illustrate various advantages of the present invention.

The experiments described in below were performed at 20.5° C. under normal atmosphere (i.e., ordinary air having a mixture of 80% $N_2$ and 20% $O_2$ at sea level). The water was tap water.

For each of the Visual Experiments 1-6, one or more of the following preferred embodiments were used.

A preferred embodiment (referred to herein as "System A") based on the optical system setup depicted in FIG. 2 is described below.

System A includes a femtosecond laser source developed by Coherent Co., Ltd which has a center wavelength of 800 nm, a repetition frequency of 1 kHz, a pulse energy of up to 2 mJ, and a pulse duration that is adjustable from 30 fs to 100 fs. FIGS. 4A-4D show the spectra and pulse energies of the 30 and 100 fs pulse settings with this light source. If the average laser pulse energy is unchanged, the peak energy differs for lasers with varying pulse durations. In fact, the 30 fs pulse duration has a three-fold greater peak energy than the 100 fs duration at the same average energy setting. In Visual Experiments 1-6, the experiments are performed with pulse width set at 30 and at 100 fs pulse durations. The experiments and results will be identified as System A (30 fs) and or System A (100 fs), respectively. The peak intensity of a laser rather than the average power, even if it is a short pulse, is important to produce the aerial plasma. System A has sufficient peak intensity to excite the air and generate ionized plasma.

System A further includes an LC-SLM manufactured by Hamamatsu Photonics K. K., which includes a PAL-SLM coupled with an LCD and a 680-nm laser diode. This device can perform phase-only modulation of more than 2 radian and has a resolution of 768 pixels×768 pixels, a pixel size of 20×20 µm², and a response time of 100 ms.

System A further includes two lenses, having focal lengths of 450 mm and 150 mm, respectively. The two-lens unit reduces the beam spot size by a factor of ⅓.

System A further includes a galvano scanner unit, which includes a scan head unit (Canon GH-315) driven by a scanner control board (Canon GB-501). The Canon GH-315 scan head unit has a beam diameter of 10-14 mm, a scan angle of ±0.17 rad, an error of less than 5 prad, and a resolution of 20 bits. The scan head covers an area of at least about 10×10 mm². The Canon GB-501 scanner control board controls the scan head unit and laser unit to direct a laser beam to any coordinate in an XY plane. It has a standard PCI bus for interfacing with a PC and takes instructions from PC commands.

System A further includes two lenses having focal lengths of 450 mm and 150 mm, respectively, positioned after the galvano scanner unit. This two-lens unit enlarges the beam spot size by a factor of 1.5.

System A further includes a varifocal lens unit, EL-10-30, manufactured by Optotune. The specifications of the EL-10-30 varifocal lens include an aperture of 10 mm, a response time of less than 2.5 ms, and a focal length range from +45 to +120 mm. The EL-10-30 varifocal lens adjusts the z-axis focal points of the laser beam on the volumetric screen.

System A further includes an objective lens which has a focal length of 40 mm.

System A further includes a system controller comprising a PC running a Windows® operating system, with all programs coded in C++ which controls the operation of the SLM, galvano scanner unit, and varifocal lens unit. The galvano scanner unit and varifocal lens unit run along different threads and are synchronized when new draw patterns are received. The user input may be captured at 20

Hz. The control system further includes a USB microscope used to monitor the interactions between the optical set up and the display medium.

The energy conversion rate of System A is 53%.

Figure 3:
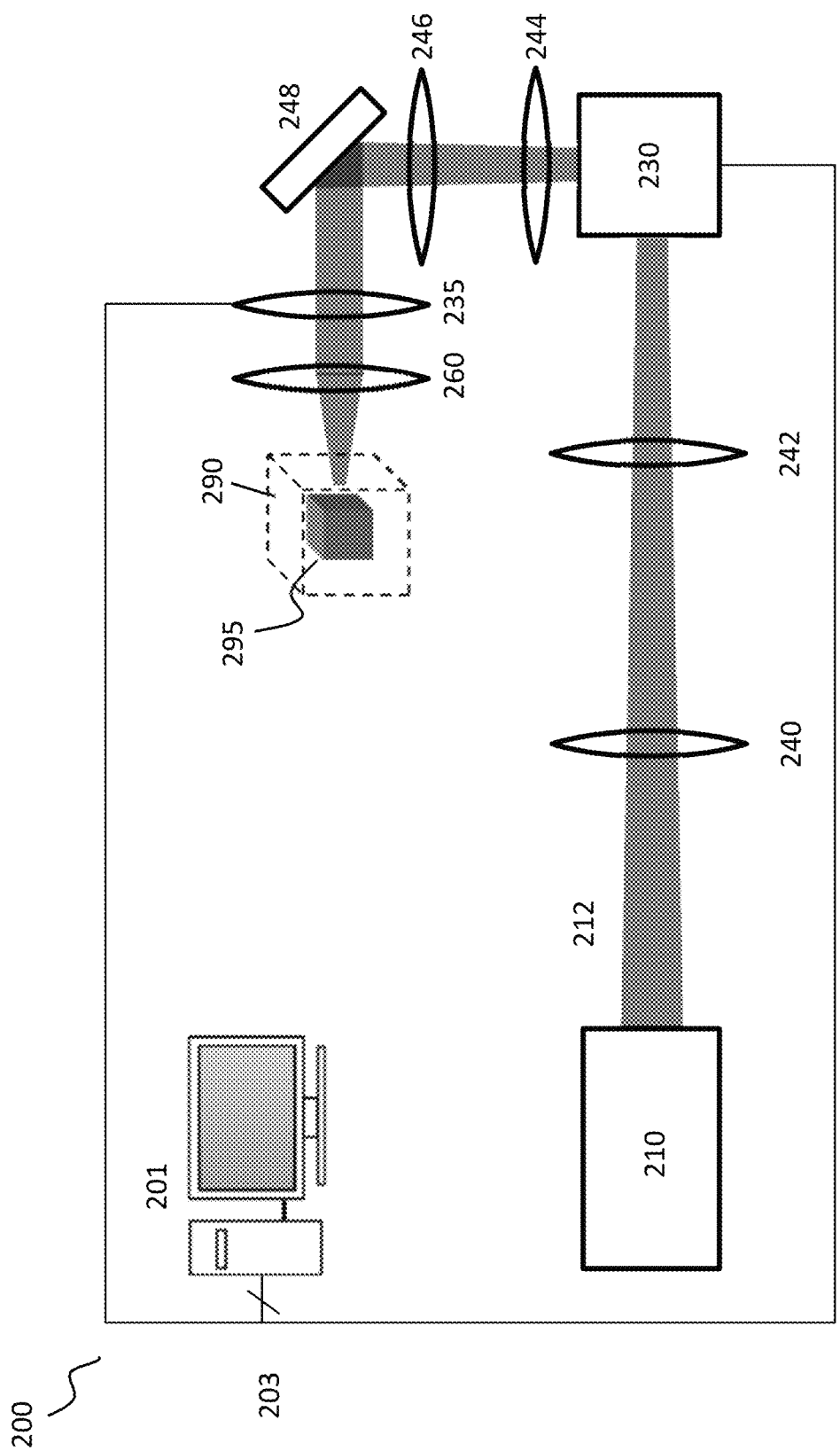
FIG. 3 shows system for rendering volumetric graphics according to another exemplary embodiment of the invention.
Figures 4A, 4B:
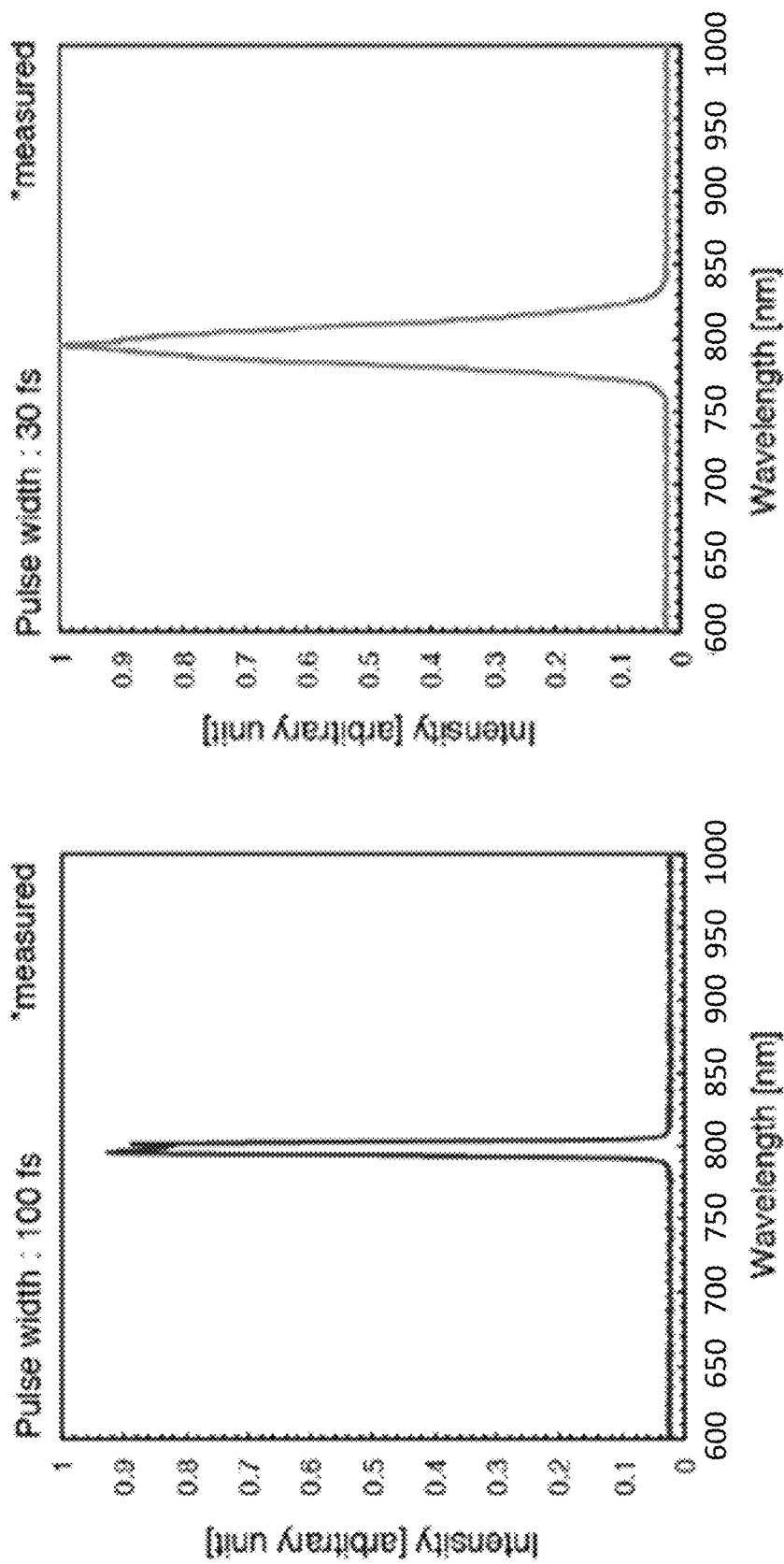
FIG. 4A shows the spectra of a 100 fs laser.
FIG. 4B shows the spectra of a 30 fs laser.
Figure 4D:
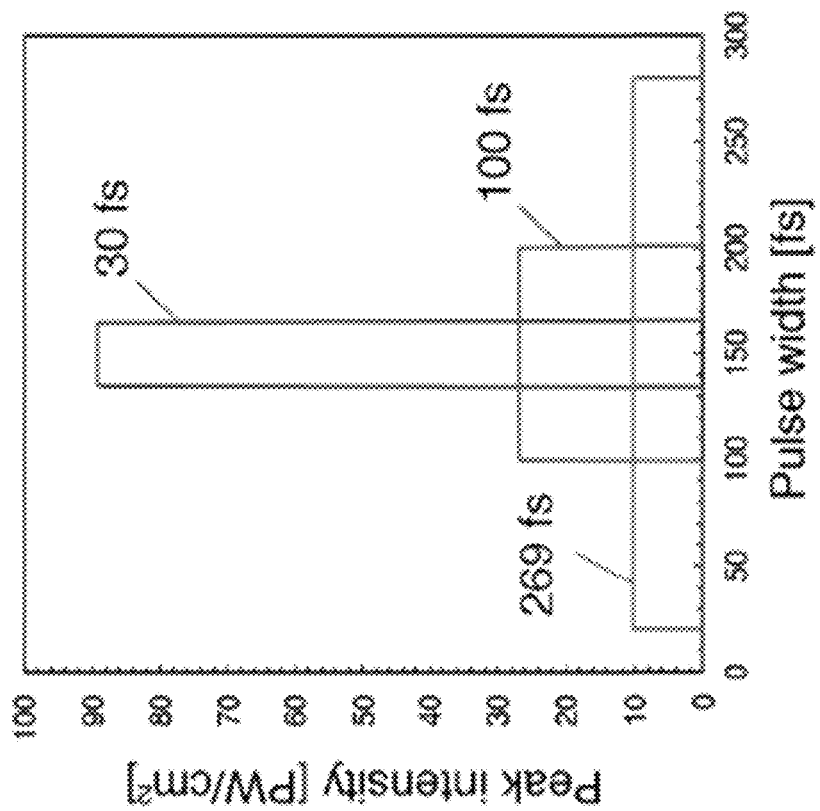
FIG. 4D shows the peak intensity and pulse width of each of the 100 fs laser, 30 fs laser, and 269 fs laser.
Figure 4C:
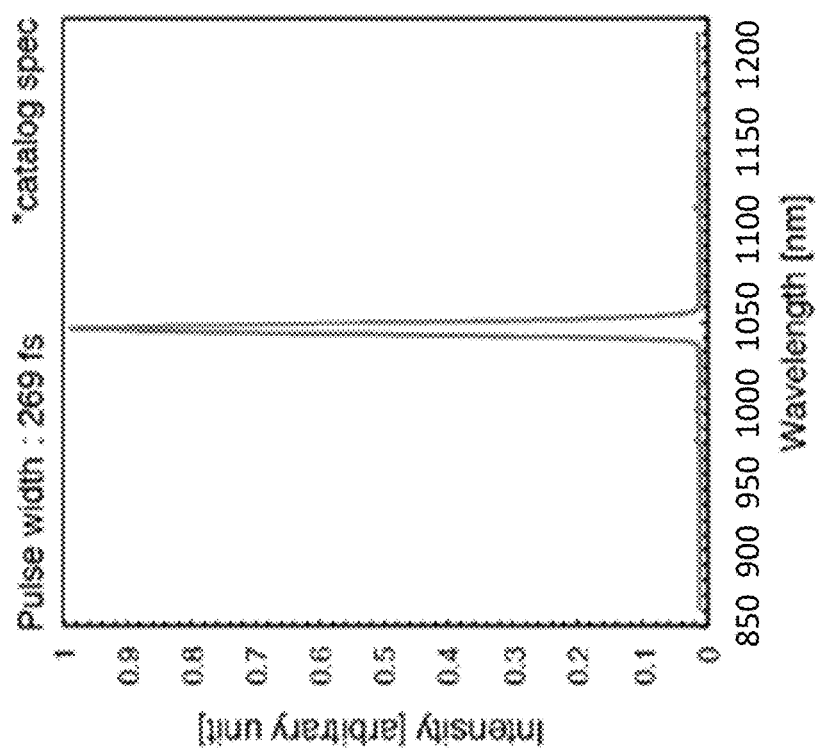
FIG. 4C shows the spectra of a 269 fs laser.

Another preferred embodiment (referred to herein as "System B") based on the optical system setup depicted in FIG. 3 is described below.

System B includes a femtosecond laser manufactured by IMRA America, Inc., FCPA μJewel DE 1050, which has a center wavelength of 1045 nm, a repetition frequency of 200 kHz, a pulse energy of up to 50 J, and a pulse duration of 269 fs. System B has a sufficient peak intensity to excite the air and generate ionized plasma.

System B further includes a galvano scanner, Intelliscan 20i, which has a scan angle of ±0.35 rad, an error of less than 5 rad, and a resolution of 20 bits.

System B further includes a varifocal lens unit, EL-10-30, manufactured by Optotune. The specifications of the EL-10-30 varifocal lens include an aperture of 10 mm, a response time of less than 2.5 ms, and a focal length range from +45 to +120 mm. The EL-10-30 varifocal lens adjusts the z-axis focal points of the laser beam on the volumetric screen.

System B further include two lenses having focal lengths 50 mm and 80 mm.

System B further includes an objective lens which has a focal length of 20 mm.

System B further includes a control system comprising a personal computer running a Windows® operating system, with all programs coded in C++ which controls the operation of the galvano scanner unit and varifocal lens unit. The control system further includes a camera used to monitor the interactions between the optical set up and the display medium.

The energy conversion rate of System B is 80%.

Laser induced plasma emission effect in air requires a laser power in the order of petawatts per square centimeter ($PW/cm^2$).

Visual Experiment 1: Energy vs. Brightness

The inventors conducted an experiment to evaluate the relationship between the plasma-production energy level and the resultant brightness of the image. Voxel brightness relative to the input energy is an important consideration to achieving higher spatiotemporal resolution. This experiment aimed to confirm the feasibility of System A and investigate how it can be applied to display voxels. Thus, the minimum peak energy value was determined.

The experiment was conducted using System A with the pulse width set at 30 fs. The femtosecond laser source made by Coherent Co., Ltd can provide power of up to 7 W, however, some components in the optical circuit before the objective lens cause air breakdown under higher powers. Hence, the full power of the laser source cannot be used. Moreover, the energy capacity of the SLM made by Hamamatsu Photonics is not guaranteed past 2 W. Thus, the experiments were conducted for a power range from 0.05 to 1.00 W. A microscopic camera was used to capture the resultant image.

Figure 6:
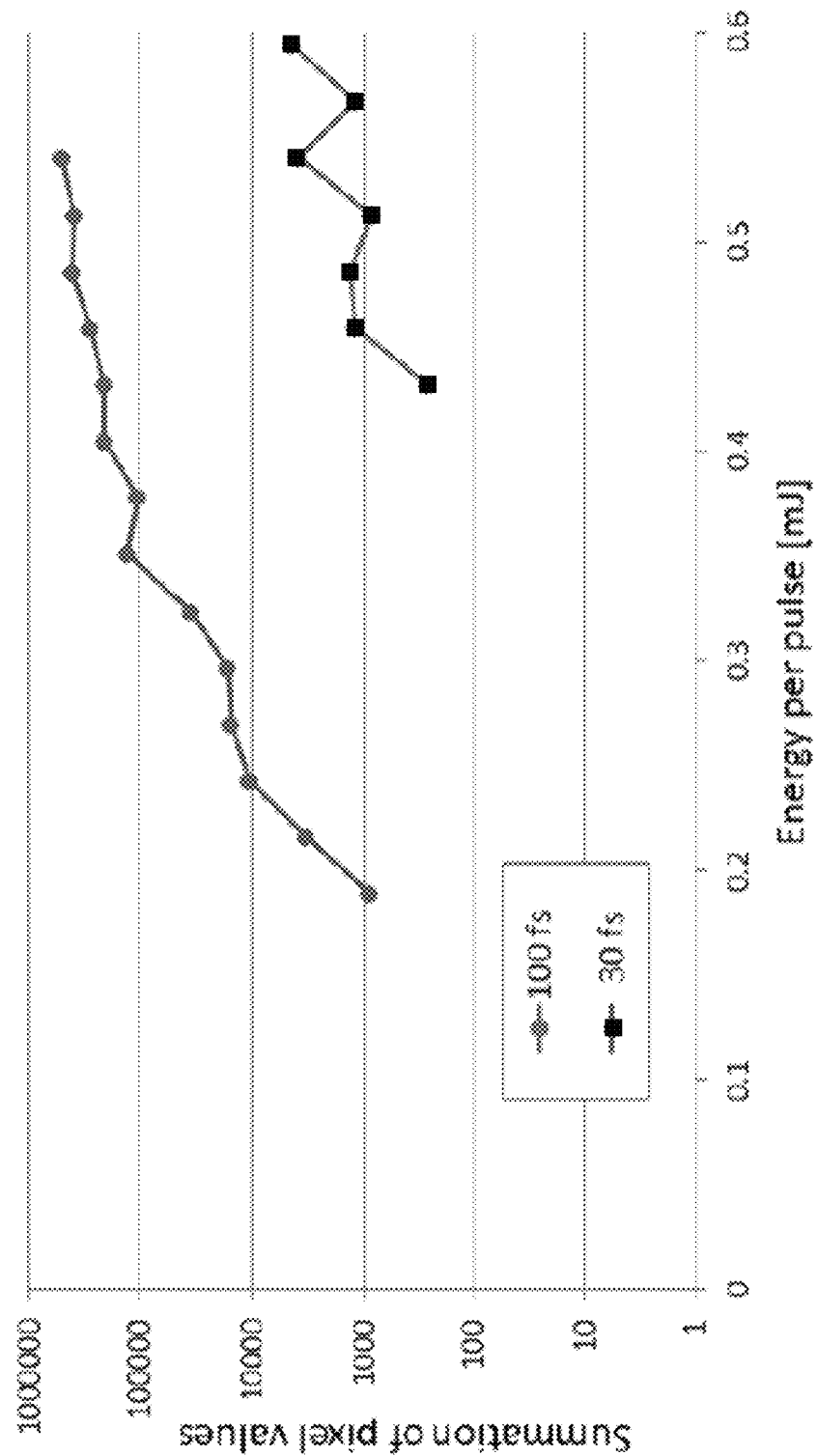
FIG. 6 shows experimental results regarding the brightness of light emission in air induced by a 30 fs laser and a 100 fs laser.

FIG. 6 shows the experimental results. The experiment was conducted under energies per pulse from 0.16 to 0.55 mJ. The experiment showed that a 30 fs laser can generate plasma beginning at 0.2 mJ per pulse. The cross-sectional area of the focal point is theoretically calculated to be $2 \times 10^7$ $cm^2$. Then, the peak intensity is 36 $PW/cm^2$ and surely higher than the ionized plasma threshold (>1 $PW/cm^2$).

Visual Experiment 2. Pulse Width vs. Brightness

The inventors conducted an experiment to evaluate the relationship between pulse duration and voxel brightness. This is important for scalability, particularly when a faster laser source is developed. The relationship between the peak pulse and the resultant image brightness was also examined, as the peak energy plays an important role in plasma generation.

The experiments were conducted using System A with pulse widths set at 30 fs and at 100 fs and for a power range from 0.05 to 1.00 W. A microscopic camera was used to capture the resultant image.

The results are shown in FIG. 6. Pulses of 30 and 100 fs yield different spectra and peak energies for the same average powers. The 30 fs laser yielded a three-fold higher peak pulse. The experiment showed that a 100 fs laser can generate plasma beginning at 0.45 mJ per pulse and the peak intensity is 24 $PW/cm^2$. In addition, the experiment confirms that the 30 fs pulse requires less energy than the 100 fs pulse to produce plasma under the same average power.

Visual Experiment 3. Different Display Media

The inventors conducted an experiment with various display media (e.g., air, water, and fluorescence solution) in order to compare the energy consumption performances among the various laser-induced effects, including gas-ionized plasma, photon absorption, and caverning, and explore means of applying the femtosecond laser system to the various display technology.

Figure 7:
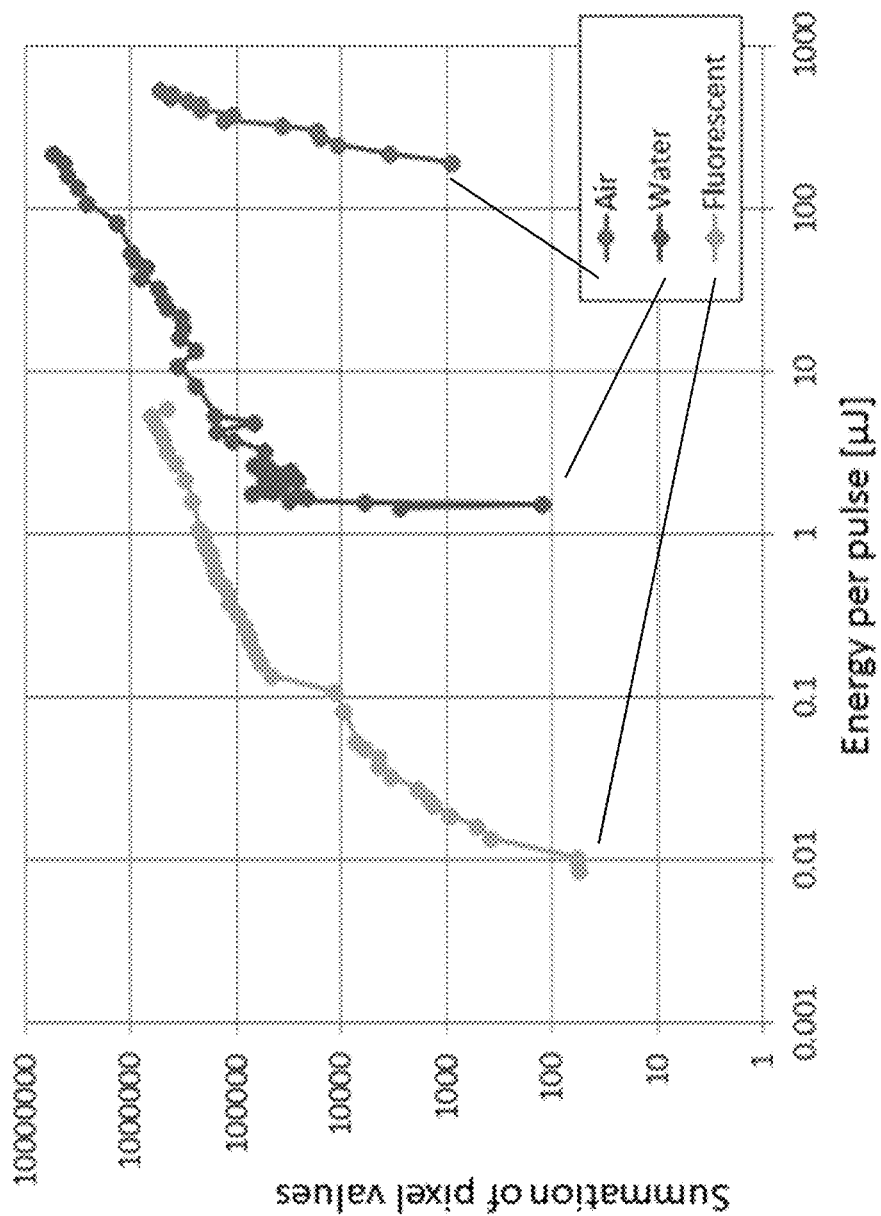
FIG. 7 shows experimental results regarding the brightness of light emission in fluorescent solution, water, and air induced by 30 fs laser (plotted left to right, respectively)

The experiments were conducted using System A with the pulse width set at 30 fs. A microscopic camera was used to capture the resultant images. The results, shown in FIG. 7, show that the values of required pulse energy are dramatically different depending on the display media—differing by orders of magnitude. Fluorescence occurs at about 0.01 μJ, cavitation occurs at about 2 μJ, and ionization occurs at more than 100 μJ.

Visual Experiment 4: Simultaneous Addressing in Air

The inventors conducted an experiment to determine the feasibility of using CGHs to modulate the phase of a laser pulse beam to generate high resolution graphics in air. In conventional systems, multiple voxels could not be generated simultaneously. This particular experiment was conducted to explore resolution scalability by using an SLM to generate simultaneously addressed voxels from a single light source. Simultaneous addressing is important because it can be used to increase the spatiotemporal resolution, but the simultaneously addressed voxels are dimmer than a single voxel because the energy is distributed among the voxels. The inventors hypothesized that the use of CGHs can be used to simultaneously generate multiple plasma spots. Simultaneous addressing is available for both the lateral (X, Y) and beam (Z) axes, by displaying appropriate holograms on a single SLM. However, for simplicity, in this experiment, only simultaneous addressing for the lateral axis was investigated.

The experiments were conducted using System A with a pulse width set at 30 fs and a laser power range from 0.05 to 1.84 W. A microscopic camera was employed to capture the resultant images.

Figure 8A:
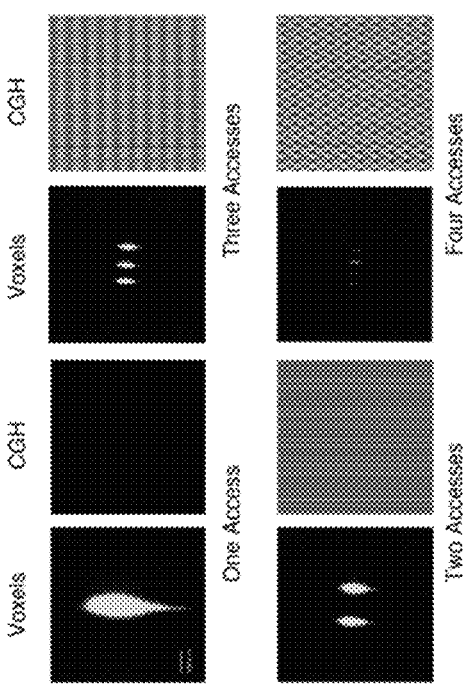
FIGS. 8A-8C show experimental results evaluating the brightness of simultaneously addressed plasma dots, and more specifically.
Figure 8B:
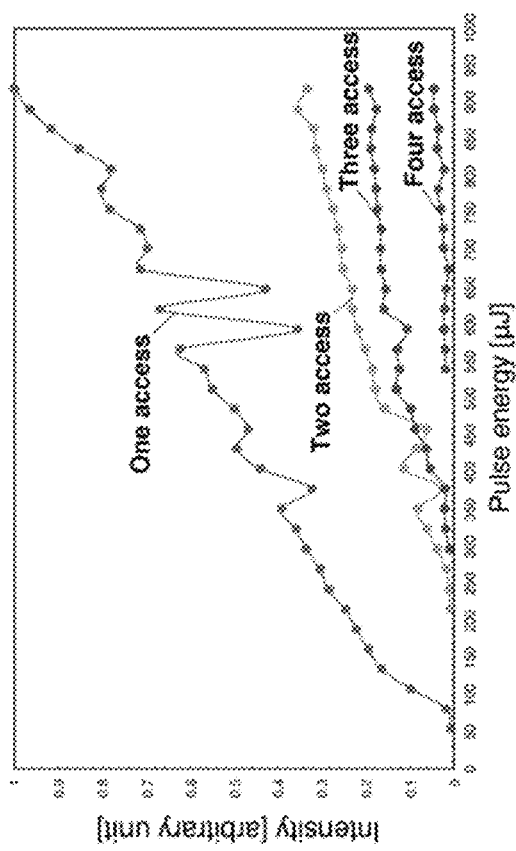
Figure 8C:
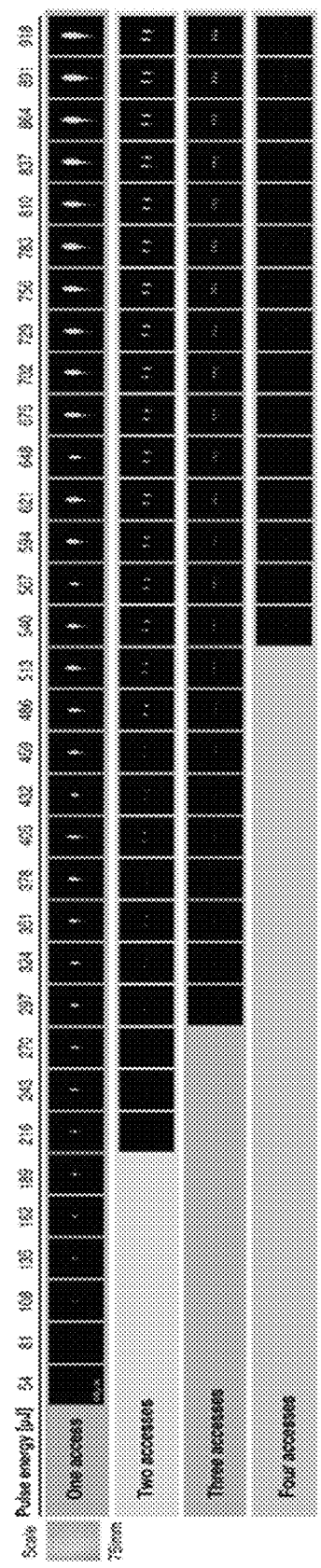
Figure 11:
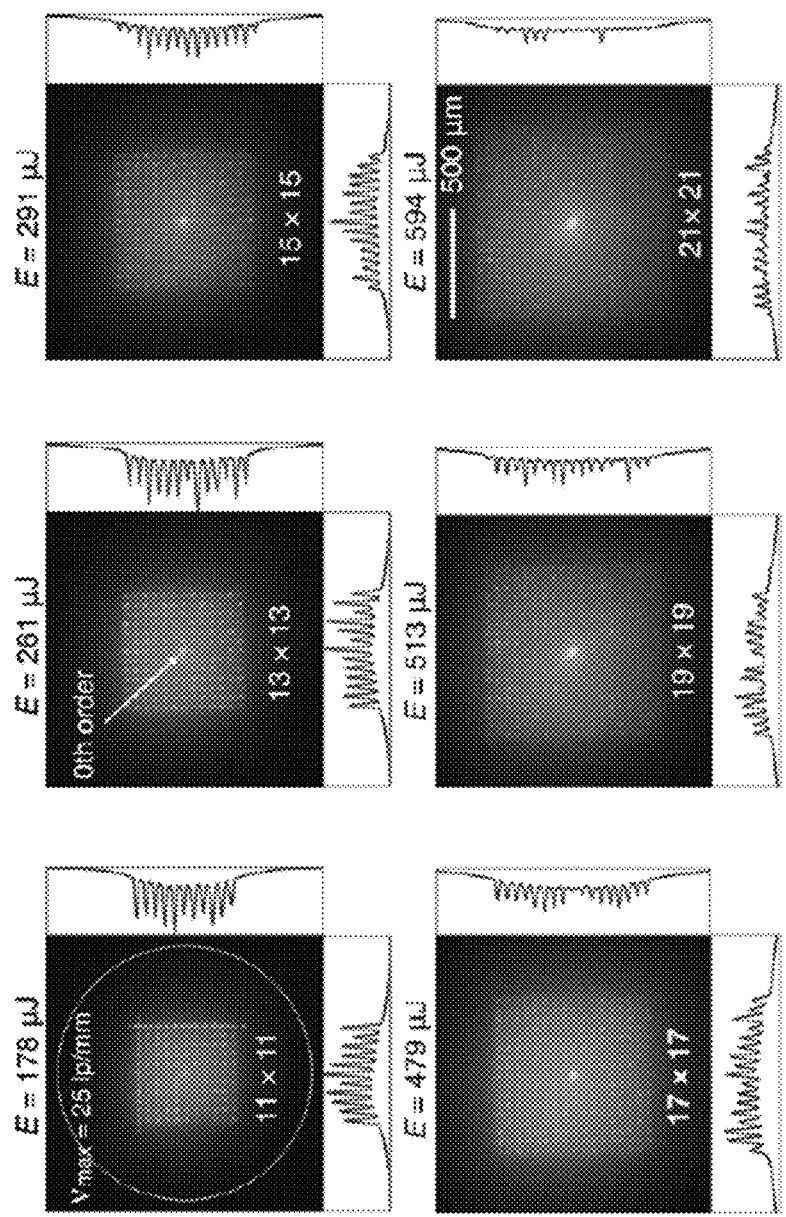
FIG. 11 shows experimental results regarding simultaneous addressing in a fluorescence solution.
Figure 12:
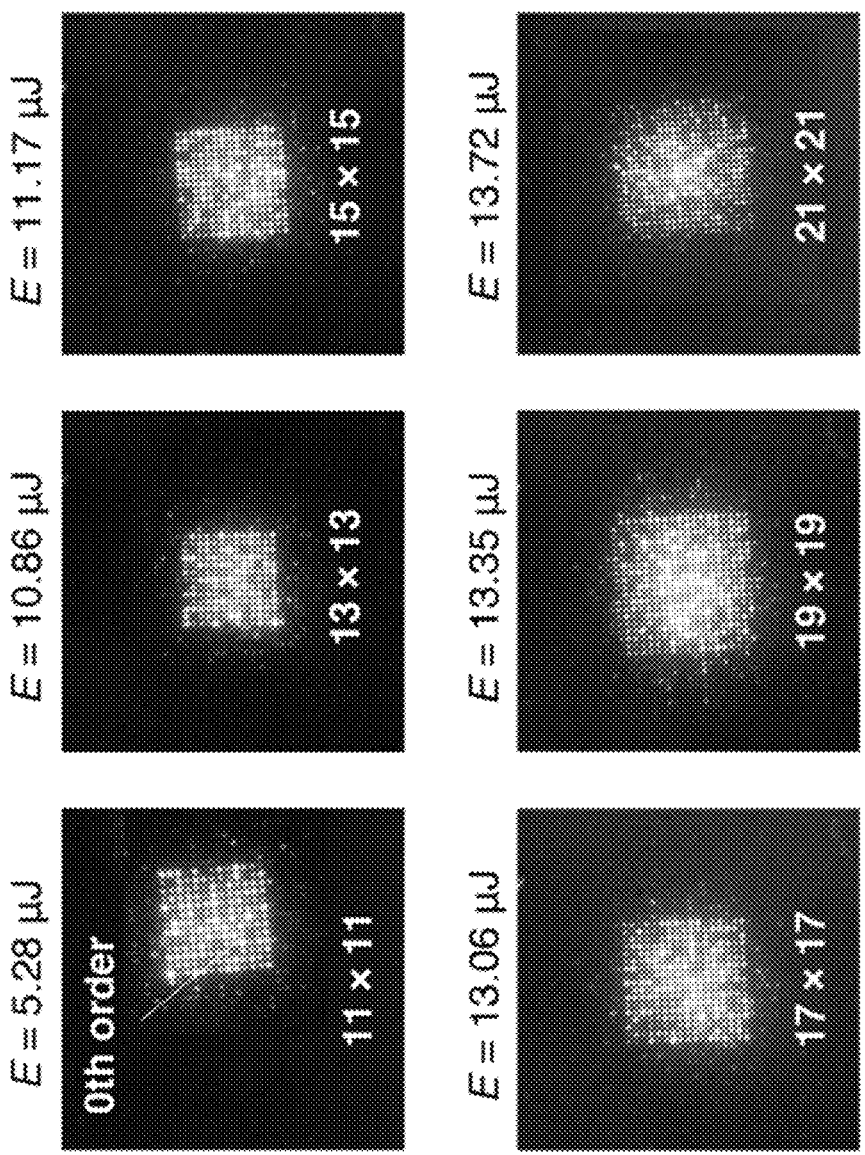
FIG. 12 shows experimental results regarding simultaneous addressing in fluorescence plates.

FIGS. 8A-8C show the results and the CGHs used in the SLM. As shown in FIG. 8C, 1 to 4 simultaneously addressed voxels were visible. The results show that even under the power constraints of System A, up to four parallel accesses were observable. The SLM diffraction efficiency is determined to be almost 50%.

Video Experiment 5. Simultaneous Addressing in Water

The inventors conducted an experiment to determine the feasibility of using CGHs to modulate the phase of a laser pulse beam to generate high resolution graphics in water. The experiments were conducted using System A with a pulse width set at 30 fs and a laser power range from 0.05 to 1.84 W. A microscopic camera was employed to capture the resultant images.

Figure 13:
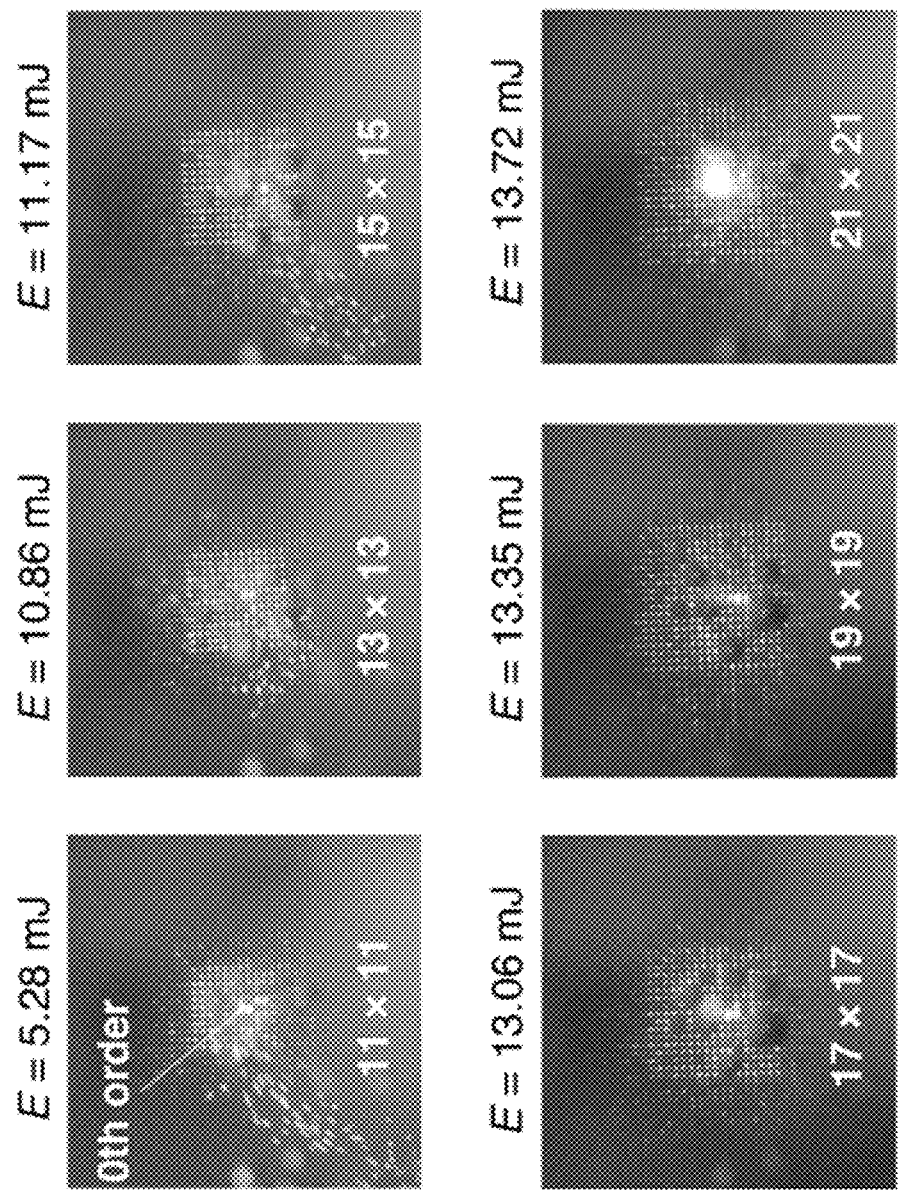
FIG. 13 shows experimental results regarding simultaneous addressing in water.

FIG. 13 shows multiple light spots from 11×11 to 21×21 grids can be rendered simultaneously based on CGH.

Visual Application 1: Aerial Displays

Laser induced-plasma floats in the air. In accordance with another embodiment of the present invention, a high resolution aerial volumetric display is provided. FIGS. 10C-10D show volumetric images generated in mid-air. An aerial volumetric display using air tunnel ionization can be realized by Systems A and B. FIGS. 14A-14G show various graphics rendered in air utilizing Systems A and B. For Systems A and B, the workspaces are 10×10×10 mm$^3$ and 8×8×8 mm$^3$, respectively. These workspaces are smaller than those of conventional studies, but their resolutions are 10 to 200 times higher than conventional methods. The maximum spatiotemporal resolution is 4,000 dots per second for System A and 200,000 dots per second for System B. The image frame rate is determined by the number of vertices used in the models.

Visual Application 2: Spatial Augmented Reality (AR) to Real-World Object

Figure 14A:
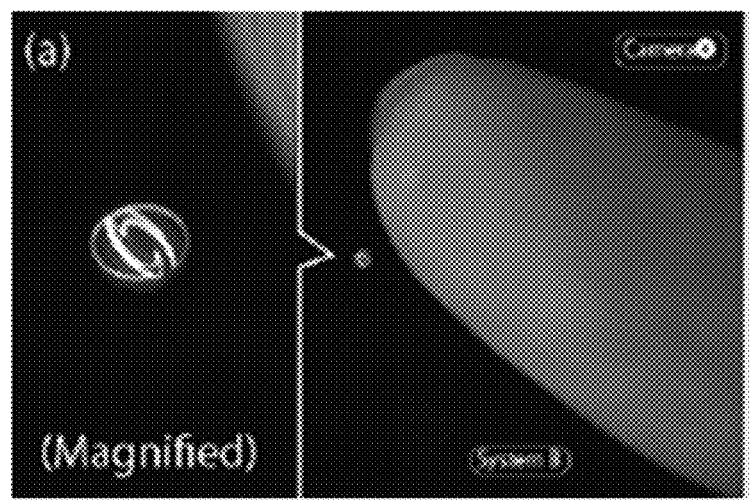
FIGS. 14A-14G show experimental results regarding aerial rendering, and more specifically.
Figure 14B:
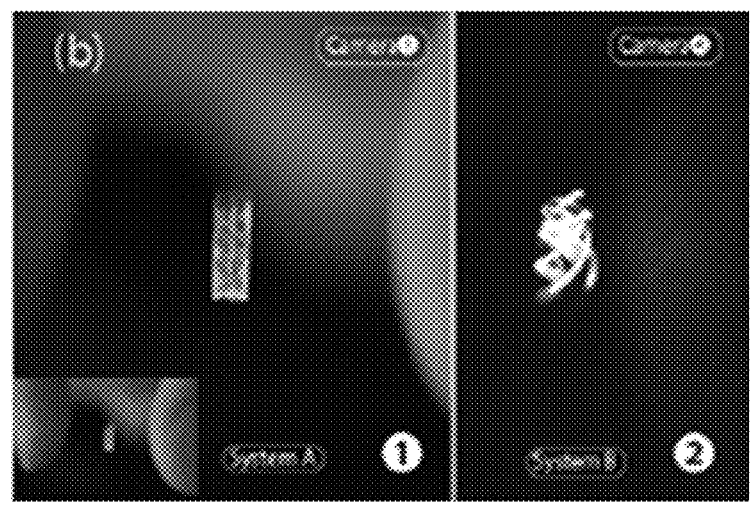
Figure 14C:
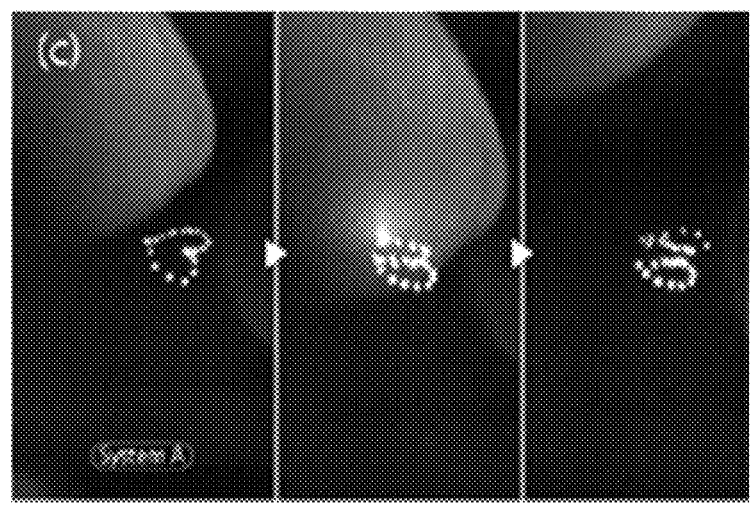
Figure 14D:
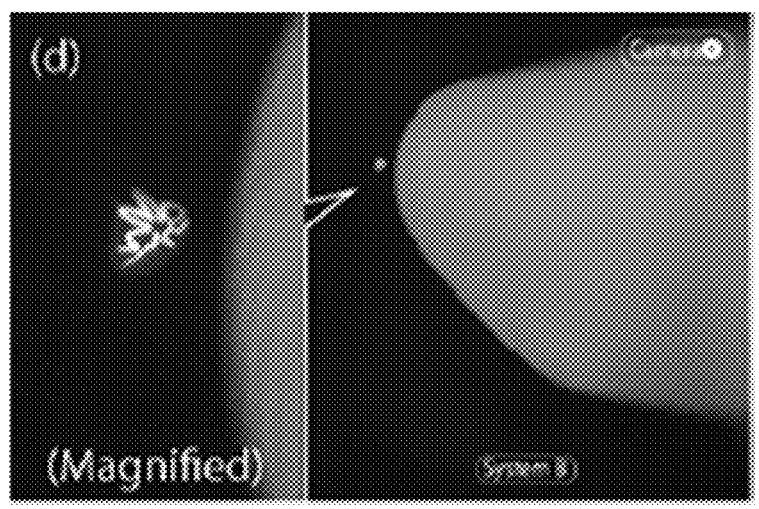
Figure 14E:
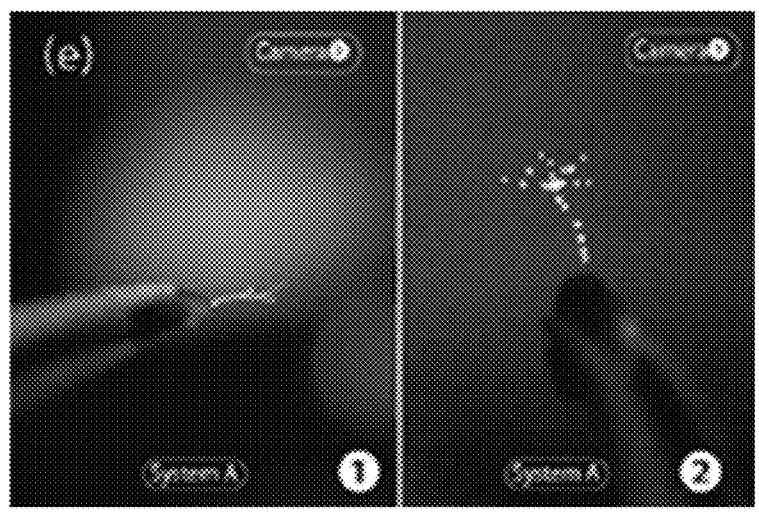

In accordance with another embodiment of the present invention, an augmented reality display is provided. Rendered plasma images can be used with real-world objects. For example, FIG. 10A shows plasma images 11 generated as extensions or accessories of a real object 10. As another example of augmented reality, FIG. 14E is a photograph showing "sprouts" coming out from a seed. One of the merits of the spatial AR to real-world object technique is that the AR content is on the same scale as that of the object that it is augmenting. Also, the aerial display can be combined with a microscopic camera which can be used to detect the object in the workspace, detect when the plasma touches the object, and position the AR content to overlap the object or to make it appear as an extension of the object.

This has an advantage over conventional approaches in terms of correspondence to the 3D spatial position. In conventional AR technology, it is difficult to show AR content at arbitrary 3D positions. However, this invention permits the generation of plasma spots at any position in real space within the working space.

Visual Application 3: Color Volumetric Displays in Water

In accordance with another embodiment of the present invention, a color laser-based volumetric display using water a display medium is provided. Systems A and B can work with water as a display medium. In this configuration, the workspaces are 1 and 10 cm$^3$, respectively. These workspaces depend on the focal area of the objective lens. In this application, the principle used for obtaining the voxels is different from that of the other applications. In this application, the voxels reflect light using micro bubbles, and the user can see the color of the laser source at points in the 3D water-filled space. The minimum energy required to excite the water is in the J range. With System B, the user can see only bubbles, because the wavelength of this system is 1,064 mm.

Scalability

Scalability in size of workspace is a main concern. Size scalability depends on the type of display medium because the display medium determines the amount of energy needed to generate a laser-induced effect.

With respect to an aerial display, in order to induce tunnel ionization, energy on the order of PW/cm$^2$ is necessary because a large amount of power is needed in the focused areas. Thus, the generation of aerial plasma is mainly limited by the attributes of the objective lens which concentrates the laser beam at focal points. An objective lens with a larger aperture provides a larger workspace.

The experiments relating to average power and high intensity peak pulses show that the following three factors are key to achieving safe, calm, and appropriate workspace size for daily applications: (1) increasing power of laser source, (2) shortening pulse and increase peak energy, and (3) increasing scanning speed. By achieving these factors, the workspace can be enlarged to maintain tangibility and visibility in the applications.

With respect to volumetric displays involving water as a display medium, the energy needed to induce cavitation is small enough such that the workspace is not limited by the objective lens. The workspaces in these types of displays are limited by the workspace of the 3D scanner (i.e., galvano scanner unit and varifocal lens unit). In general, the galvano scanner unit and varifocal lens unit are fast enough to scan a large space. To achieve larger workspace for these displays, multiple laser focusing systems can be used.

Haptic Interaction

In general, plasma has high energy and can be dangerous to humans. However, femtosecond lasers which emit ultra-short laser pulses are often used for non-thermal breaking in industrial purposes. Thus, the inventors hypothesized that contact with plasma induced by femtosecond lasers when the laser sources were limited to certain peak intensities would not pose much danger to humans.

Haptics Experiment 1: Skin Exposure

The inventors conducted a series of experiments to explore whether the exposure of plasma induced by a femtosecond laser on human skin would cause damage. In these experiments, cow leather was utilized as a substitute for human skin.

The experiments were conducted using System A configured at 30 fs at 1 W and configured at 100 fs at 1 W. The plasma exposure duration was varied between 50 and 6,000 ms. FIG. 9D, which shows the results of the experiment, shows that the 30 and 100 fs pulses have almost the same effect on the skin. As described previously, the 30 fs pulse has a three-fold greater peak energy and can generate brighter voxels. However, for a 50 ms duration (50 shots), there is almost no difference between the 30 fs and 100 fs results. In this experiment, the average power is the factor determining the result. For exposure of under 2,000 ms (2,000 shots), only 100 μm diameter holes appeared and there was no heat damage to the leather. For a period of longer than 2,000 ms, heat effects were observed around the holes.

A test with a continuous (non-pulsed) nanosecond laser was conducted for comparison with this result. With the nanosecond laser, the leather burned within 100 ms. This means that pulse duration, repetition times, and energy are important factors affecting the level of damage caused by the laser.

The inventors verified that an ultra-short pulse laser would have a non-thermal effect, which is different from thermoelastic effect of nanosecond laser. See Jun et al. 2015; Lee et al. 2015. Hence, the ultra-short laser pulse emitted from a femtosecond laser is safer. Systems A and B induce plasma spots that are bright and has an average output that is not highly intensive.

Haptics Experiment 2: Touch Effect

The inventors conducted a test to explore what happens when plasma is contacted by human skin. The test was conducted using System A.

When the inventors touched a plasma voxel in an aerial image with their fingers, the plasma generated shock waves upon contact that the inventor could feel as an impulse on the finger as if the aerial image has some physical substance. Tactile sensation is based on the evaporation effect of a femtosecond laser pulse, which ablates the surface of the skin and generates shockwaves. The sensation is vivid and sharp, and similar to electric stimulation, e.g., static discharge, or rough sand paper.

Figure 14F:
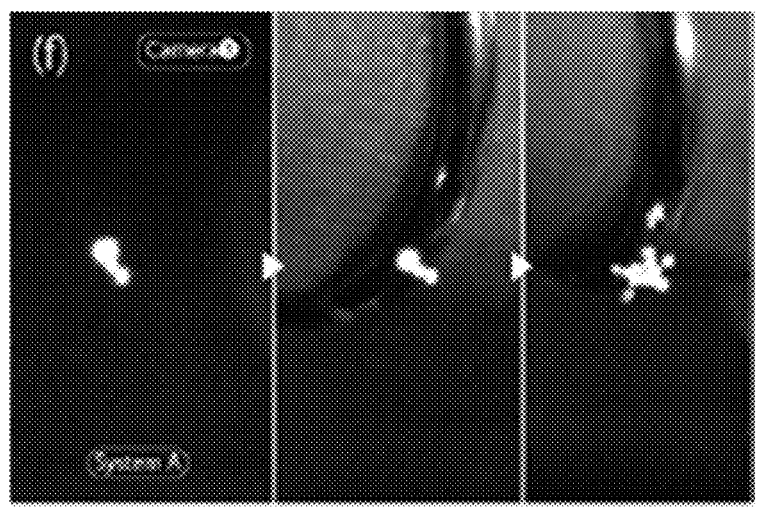
Figure 14G:
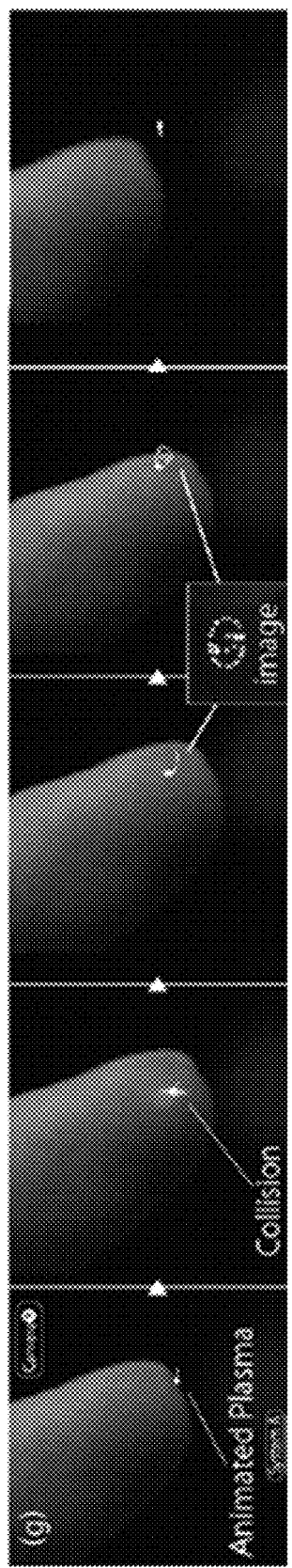

The inventors also noticed that contact between plasma and a finger causes the plasma to become brighter. The difference in density between air and human skin causes a change in the brightness of the light. This effect, which is shown in FIGS. 14C and 14G, can be used as an indication of contact for interactive applications.

Haptics Experiment 3: Perceptual Threshold

Figure 16B:
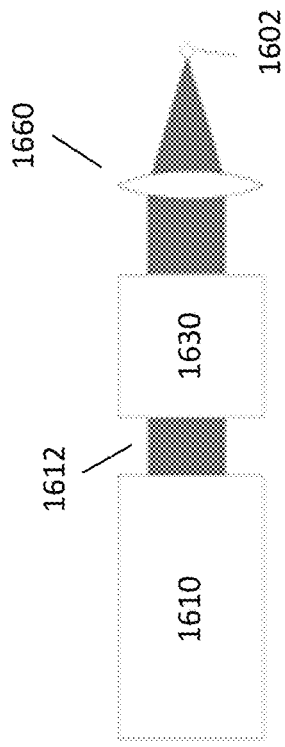
FIG. 16B shows another system for generating plasma dots.
Figure 16A:
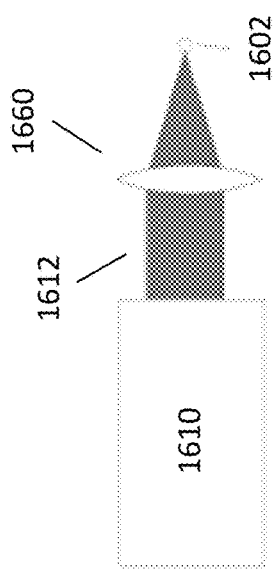
FIG. 16A shows a system for generating plasma dots.
Figure 16D:
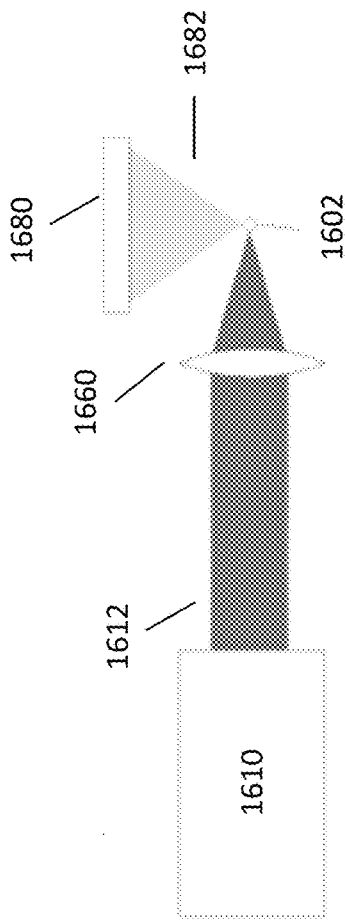
FIG. 16D shows a system for rendering volumetric graphics and a cross-field haptic feedback according to an exemplary embodiment of the invention.

The inventors conducted a study to evaluate the perceptual threshold for shockwaves of laser plasma on skin. FIG. 16A shows the optical circuit set up used for this study. Referring to FIG. 16A, a femtosecond laser light source 1610 with adjustable power settings emits laser pulses 1612 to objective lens 1660 which focuses the laser pulses at a focal point in order to induce plasma. Because it is difficult to measure the evaporation effect as force (N), the threshold was measured relative to laser output power (W). The laser output power was set at 0.05, 0.10, 0.13, or 0.16 W. The lowest power was limited by the femtosecond laser light source used and the highest power was determined by the preliminary safety tests.

Seven subjects participated in this study (22.5 years old on average, five females and two males). The subjects were asked to touch femtosecond laser induced plasma using their right forefingers. There were 8 trials per subject. Each trial involved the subjects touching up to 10 plasma dots and asked whether they felt something on their forefingers. The order of the output power settings used to generate the plasma dots were randomized and each output power setting was repeated at least once. The subjects wore blindfolds to exclude visual information and wore headphones playing white noise to exclude aural information.

Figure 18A:
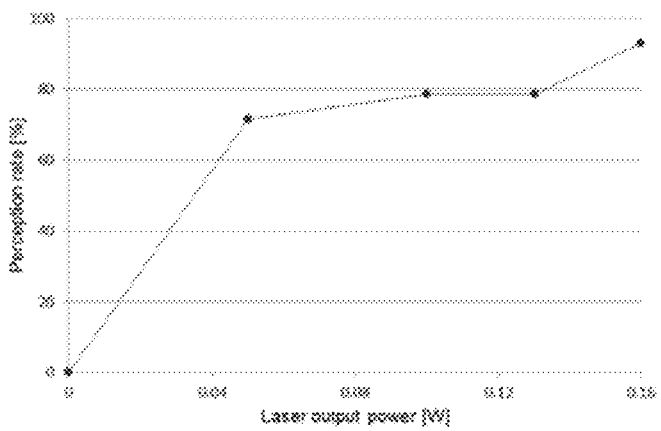
FIGS. 18A-18C shows experimental results regarding perceptual thresholds, and more specifically.

The results are shown in FIG. 18A. The perception rate is the ratio of the number of trials in which the subjects felt the stimulation to the number of trials of each laser power. The 50% threshold seems to be between 0.03 and 0.04 W. The subjects felt the stimulation confidently (i.e., more than 90%) at 0.16 W.

Haptic feedback is possible even if aerial plasma is not generated. The shockwave occurs on the skin surface with a focused laser that does not have sufficient power to generate plasma in air. This shockwave arises from ablation of the skin.

Haptics Experiment 4: Pattern Detection

The inventors conducted an experiment to test whether subjects could discriminate the spatial patterns rendered with laser plasma. FIG. 16B shows the optical circuit set up used for this study. Referring to FIG. 16B, a femtosecond laser light source 1610 emits laser pulses 1612 to a galvano scanner unit 1630 which can scan a programmed pattern. The objective lens 1660 focuses the pulses to induce plasma dots forming the programmed pattern.

Figures 19A, 19B, 19C:
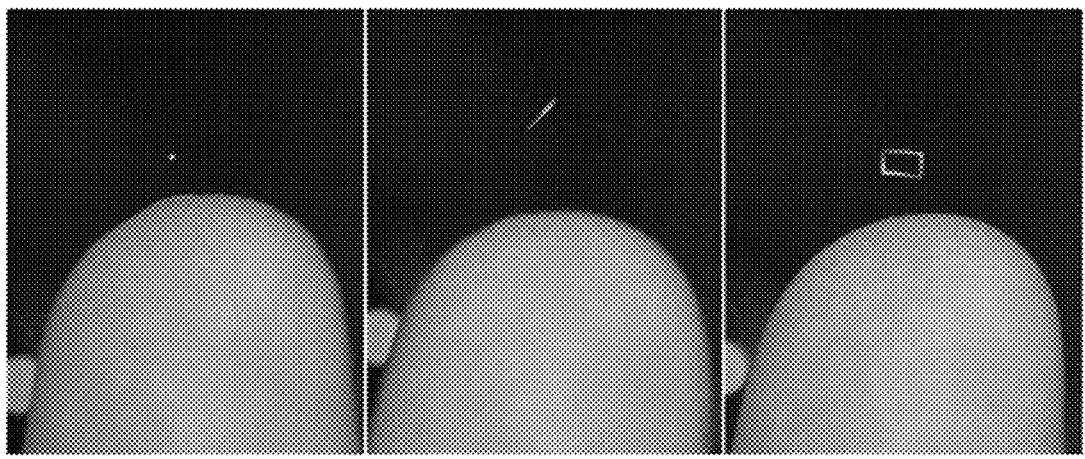
FIGS. 19A-19C show a series of photographs of spatial patterns rendered with laser plasma, more specifically.

FIGS. 19A-19C show examples of patterns rendered by a repetitive galvano scan of the laser plasma. In this experiment, two spatial patterns (dot and line) were used. The subjects were asked to touch the plasma patterns using their right forefingers. The subjects were the same subjects who participated in Haptics Experiment 3. There were 8 trials per subject. Each trial involved the subjects touching up to 10 plasma patterns and asked which pattern they felt on their forefingers. The plasma patterns were randomized and each plasma pattern was repeated at least once. The subjects wore blindfolds to exclude visual information and wore headphones playing white noise to exclude aural information.

The results are shown in FIG. 20. The merged result indicates that the subjects could discriminate between the two patterns but tend to answer inversely. The correct rate would become better once they recognize the patterns. However, there were subjects who could not discern the patterns at all. Furthermore, there were two types of tendency: one is an "ambiguous" group and the other is a "bias-to-line" group.

Haptics Experiment 5: Cross-Field Effect

Ultrasonic haptic feedback has been closely studied for years. Ultrasonic haptic feedback [Hoshi et al. 2010; Carter et al. 2013; Inoue et al. 2014] is highly programmable because of the use of ultrasonic phased arrays. Ultrasonic haptic feedback has a relatively high spatial resolution compared to other aerial haptic feedback methods and is limited by the wavelength (8.5 mm for 40 kHz ultrasound). Because of the absorption loss in air, higher-frequency ultrasound (i.e., shorter wavelengths) is not suitable for haptic feedback. Another limitation is the weakness of the stimulation, which is inadequate for reproducing impulses such as the instant of contact. The maximum force generated by a 18×18 array can be as low as 16 mN [Hoshi et al. 2010], and a larger array is required to obtain a larger force [Hasegawa and Shinoda 2013]. The ultrasonic haptics is based on acoustic radiation pressure, which is not vibrational and presses the skin surface. This can be applied on the skin for a long time but this is relatively weak (10-20 mN). The sensation is similar to a laminar air flow within a narrow area.

Figure 15:
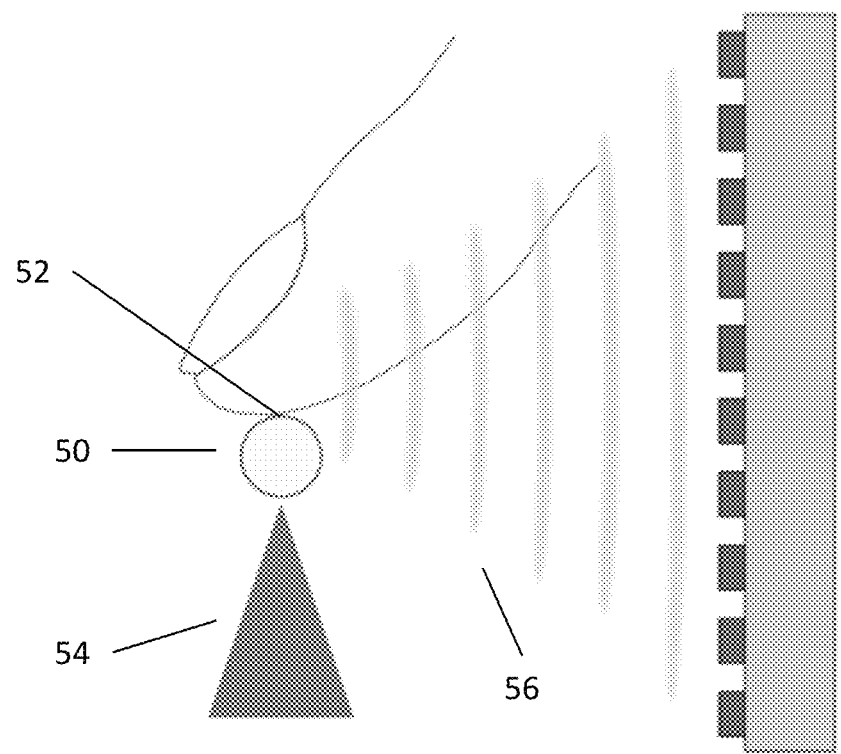
FIG. 15 shows aerial haptic feedback rendered by laser and ultrasound cross-field set-up.

The inventors considered whether the dull tactile perception of an acoustic field can be used to augment the sharp tactile perception of a femtosecond laser light field in order to improve tactile perception and to mitigate the stinging sensation that a subject experiences when touching a femtosecond laser induced plasma. Referring to FIG. 15, the light field 54 and acoustic field 56 are physically independent of each other and thus can be applied at the same point 50 and time, and mixed on the skin 52 as elastic wave and/or in the neural system as nerve signals. For example, the laser field simulates the initial contact between the skin and a virtual object and, after that; the ultrasound field produces continuous contact between them.

The inventors conducted a series of experiments to explore the tactile perception of a femtosecond laser light field when it is combined with an ultrasonic acoustic field. The inventors hypothesized that combining two fields of different physical quantities would provide not only the superposition effect proposed above but also synergistic effects such as modification of the sensation.

Figure 21:
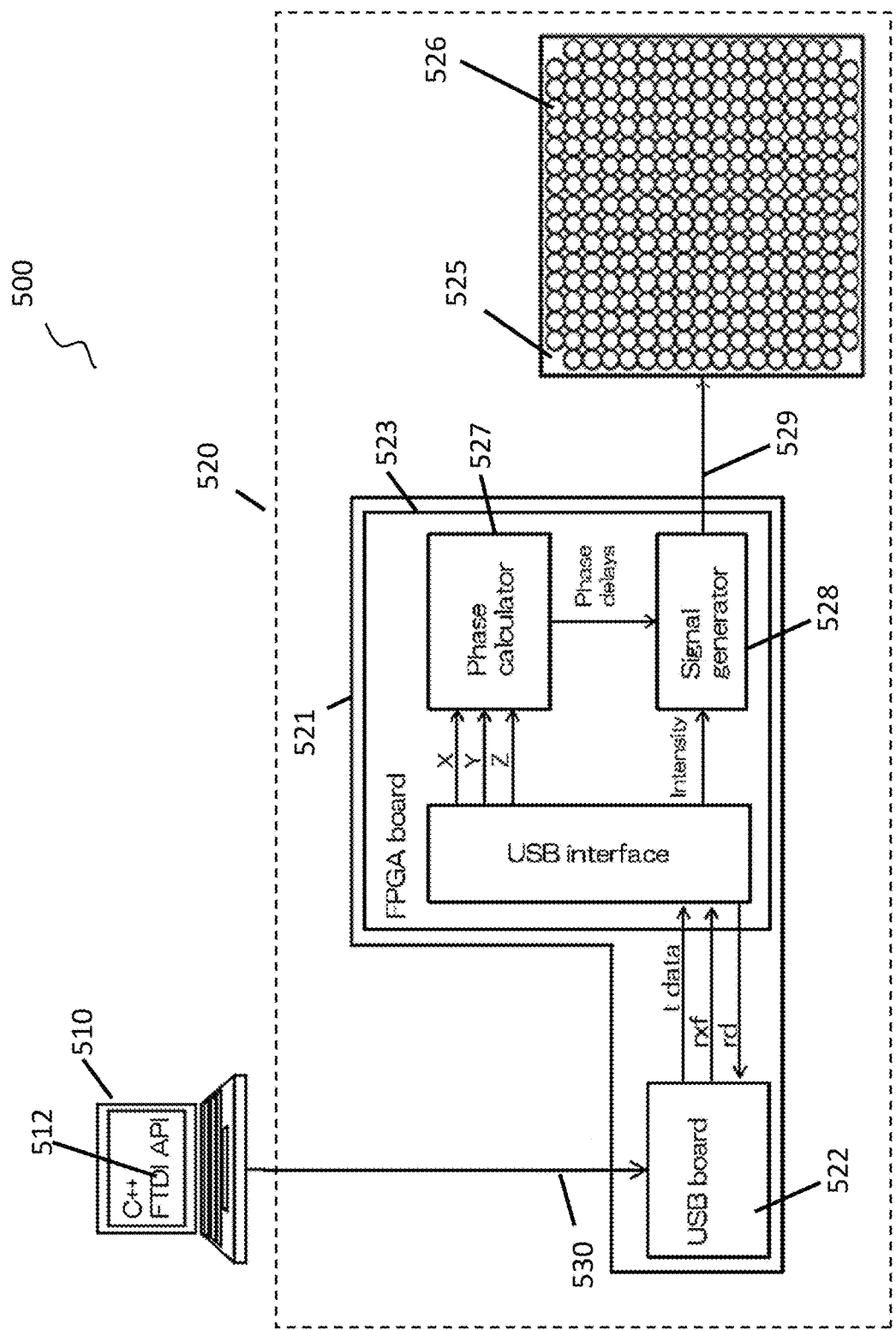
FIG. 21 shows a system for generating a palpable ultrasonic field in accordance with an embodiment of the present invention.

FIG. 21 shows an exemplary embodiment of an ultrasonic transducer array system 500 in accordance with the present invention. The system 500 includes a system controller 510 and one or more ultrasonic phased arrays 520. Each phased array 520 includes two circuit boards 521, 525. The first circuit board is an array 525 of ultrasonic transducers 526. The second circuit board contains the driving circuitry 521 which drives the ultrasonic transducers 526. The two circuit boards—and hence the transducer array 525 and the driving circuitry 521—are connected to each other.

As shown in FIG. 21, an ultrasonic transducer array 525 has hundreds of ultrasonic transducers 526 arranged in a grid pattern, each of which is controlled separately with an adequate time delay or phase delay that is specified by the system controller 510 and is applied by the driving circuitry 521. In this way, each array 525 of ultrasonic transducers 526 can generate various distributions of ultrasound.

The time delay $\Delta t_{ij}$ for the (i,j)-th transducer 526 of the transducer array 525 is given by $$\Delta t_{ij} = \frac{l_{00} - l_{ij}}{c}, \quad (13)$$

where $l_{00}$ and $l_{ij}$ are the distances from the focal point to the (0, 0)-th (reference) and (i,j)-th transducers, respectively, and c is the speed of sound in air. The focal point can be moved by recalculating and setting the time delays for the next coordinates.

It has been theoretically and experimentally shown that the spatial distribution of ultrasound generated from a rectangular transducer array is nearly shaped like a sinc function [Hoshi et al. 2010]. The width of the main lobe w parallel to the side of the rectangular array is written as $$w_m = 2\lambda \frac{R}{D}, \quad (14)$$

where $\lambda$ is the wavelength, R is the focal length, and D is the length of the side of the rectangular array. This equation implies that there is a tradeoff between the spatial resolution and array size.

The ultrasonic transducer array system 500 can be controlled to generate a distribution of ultrasound to form a haptic image. Haptic image $H_i$ is the summation of the time series of the focal points, that is, $$H_i = \Sigma f_p(x,y,z) \times p \times t, \quad (15)$$

where $f_p$ is the ultrasonic focal points generated based on (Eq. 13), p is the acoustic pressure, and t is the time duration.

Referring still to FIG. 21, the driving circuitry 521 includes a USB interface circuit 522, a field-programmable gate array FPGA 523, and drivers 524 (not shown).

Referring still to FIG. 21, the system controller 510 controls the ultrasonic transducer array 525 under the direction of a control application 512 to effect desired changes in the acoustic field that is generated by the one or more ultrasonic transducer arrays 525. The system controller 510 may be a PC. The system controller 510 controls each one of the ultrasonic phased arrays 520 via a USB cable 530.

In an embodiment in accordance with the present invention, the control application 512 is developed in C++ on the WINDOWS operating system. The system controller 510 sends the necessary data, including the X, Y, and Z coordinates of the focal point and the required output intensity of the ultrasonic beams, to the driving board 521. The driving circuitry 521 receives this data using the USB interface 522, and provides it to the FPGA 523. The phase calculator 527 of FPGA 523 then calculates the appropriate time (or phase) delays for each ultrasonic transducer 526 in the ultrasonic transducer array 525 based on Eqs. (13) or (15). The signal generator 528 then generates the driving signal for each transducer in the transducer array 525 based on the beam intensity data provided by the system controller 510 and the time (or phase) delays calculated by the phase calculator 527. The driving signals are then sent to the transducers 526 of the transducer array 525 via the push-pull amplifiers of the drivers.

Modifying the relative time (or phase) delays for the driving signals 529 that are applied to each of the transducers 526 is performed to change of the distribution of the acoustic field that is generated by the one or more ultrasonic phased arrays 525. The output intensity of each of the transducers 526 is varied using pulse width modulation ("PWM") control of the driving signal 529 that is applied to the transducer.

Haptics Experiment 5a: Perceptual Threshold of Ultrasound

Figure 16C:
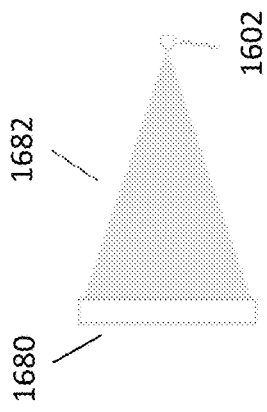
FIG. 16C shows a system for generating an acoustic pressure field at a focal point.

The inventors conducted a study to evaluate the perceptual threshold for acoustic radiation pressure elicited by focused ultrasound. FIG. 16C shows the basic set up used for this study. Referring to FIG. 16C, an ultrasound phased array 1680 is used to generate a palpable acoustic field 1682 at contact point 1602.

Although, the direct current output of ultrasound is too weak to be perceivable, there are sensory receptors in human skin that respond to vibrations. Specifically, the Pacinian corpuscles (PC) and Meissner corpuscles (RA) present in the epidermal layer respond to vibrations in the 10-200 Hz (10-50 Hz peak) and 40-800 Hz (200-300 Hz peak) frequency ranges, respectively. (Bolanowski et al. 1968). Hence, the study explored the application of vibrotactile stimulations modulated by 200- and 50-Hz rectangular waves on the forefingers.

The diameter of an ultrasonic focal point is approximately 20 mm which is larger than the width of a forefinger and thus the force acting on a forefinger is slightly lower than the output force setting of an ultrasonic phased array. The output force was set at one of fourteen values around the thresholds that were estimated by a preliminary experiment that determined the output force values that the participants can perceive.

The subjects were the same subjects who participated in Haptics Experiment 3 and 4. The subjects were asked to use their right forefingers to touch an ultrasound field configured to simultaneously vibrate at 50- and 200-Hz. There were 14 trials per subject. Each trial involved the subjects touching an ultrasound field and asked whether they felt something on their forefingers. The order of the output force setting used to generate the ultrasonic field were randomized and each output force setting was used once. The subjects wore blindfolds to exclude visual information and wore headphones playing white noise to exclude aural information.

The experiments were performed using a preferred embodiment (referred to herein as "System C") based on the ultrasonic transducer array system setup depicted in FIG. 21. System C is described below.

Referring to FIG. 21, System C includes an ultrasonic phased array 525 having a resonant frequency of 40 kHz. The position of the focal point is digitally controlled with a resolution of $\frac{1}{16}$ of the wavelength (approximately 0.5 mm for the 40-kHz ultrasound) and can be refreshed at 1 kHz. The 40-kHz phased array consists of 285 T4010A1 transducers 526 which are manufactured by Nippon Ceramic Co., Ltd. These transducers are 10 mm in diameter and are arranged in a 170×170 mm$^2$ area. The sound pressure at the peak of the focal point is 2585 Pa RMS (measured) when the focal length R=200 mm. The size and weight of a single phased array are 19×19×5 cm$^3$ and 0.6 kg, respectively. The workspace is 30×30×30 cm$^3$, but can be enlarged according to the size of the phased array.

Referring still to FIG. 21, System C further includes a driving circuit 521 having a USB interface 522, FPGA 523, and signal drivers 524 (not shown). The USB interface 522 of the driving circuit may be implemented by a USB board that employs an FT2232H Hi-Speed Dual USB UART/FIFO integrated circuit manufactured by Future Technology Devices International Ltd. of Glasgow, UK. The FPGA 523 may be implemented by an FPGA board that includes a Cyclone III FPGA manufactured by Altera Corp. of San Jose, Calif. The signal drivers 524 (not shown) of signal may be implemented using push-pull amplifier ICs.

Figure 18B:
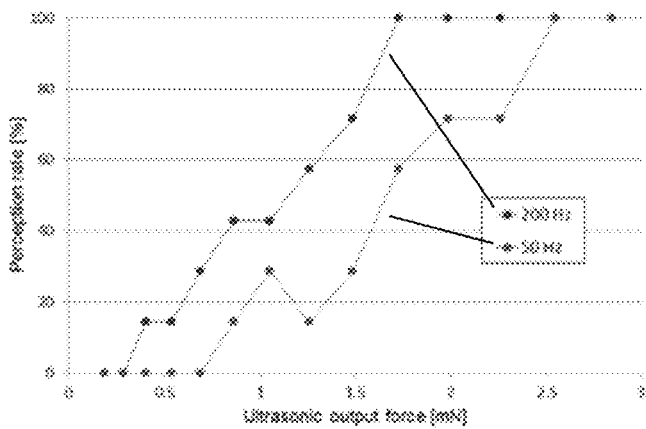

The experiment tested tactile perception of vibrations at 50 Hz and at 200 Hz. The results are shown in FIG. 18B. The perception rate is the ratio of the number of trials in which the subjects felt the stimulation to the number of trials of each ultrasonic output force. The 50% thresholds for 200- and 50-Hz stimulations seem to be about 1.1 mN and 1.6 mN, respectively. The subjects felt the 200- and 50-Hz stimulations confidently (i.e., 90%) at about 1.6 mN and 2.4 mN, respectively. It is well known in the research field of haptics that the tactile sensitivity is high against about 200-Hz stimulation, and our results agree with this knowledge.

Haptics Experiment 5b: Cross-Field Effect

The inventors conducted a study to evaluate the perceptual threshold for shockwaves of laser plasma under the preload of ultrasonic vibrotactile stimulation that is weaker than the perceptual threshold. There are two possible effects of ultrasound on the laser haptics. One is a masking effect that increases the perceptual threshold for laser plasma, and the other is a stochastic effect that decreases it.

Nine subjects participated in this study (21.6 years old on average, four females and five males). The subjects were asked to touch femtosecond laser induced plasma using their right forefingers. The laser output power was set at 0.05, 0.10, or 0.15 W. The modulation frequency of ultrasound was at 200 Hz or 50 Hz to stimulate PC and RA channels, respectively. There were 24 trials per subject. Each trial involved the subjects touching up to 10 plasma dots and asked whether they felt something on their forefinger. The combination of laser power and ultrasound frequency were randomized and each laser power and each ultrasound frequency was repeated at least four times in each trial. The ultrasonic stimulation was tuned to be just under the perceivable force for each frequency and subject. The subjects wore blindfolds to exclude visual information and wore headphones playing white noise to exclude aural information.

Figure 17:
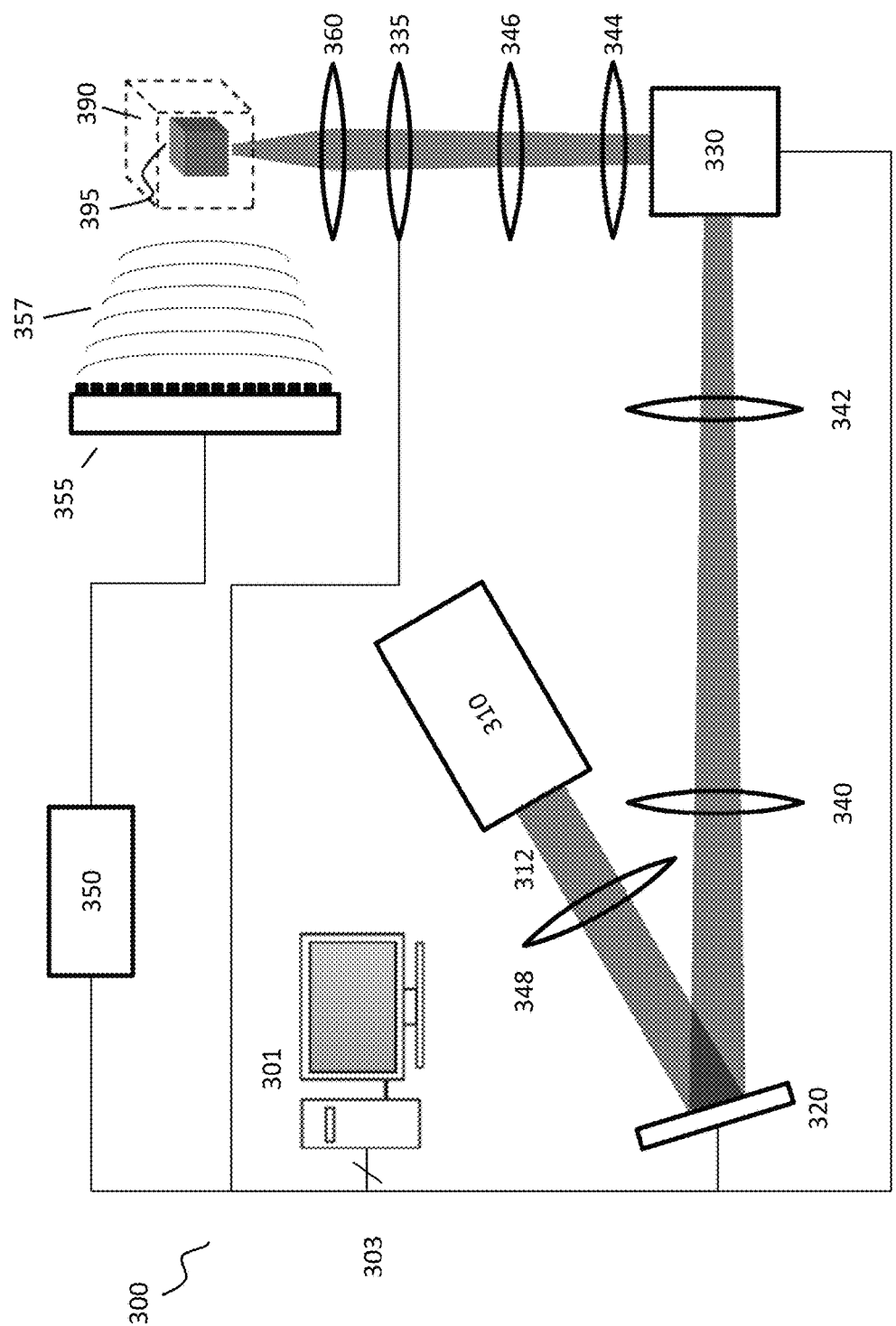
FIG. 17 shows a control system for an aerial volumetric display with cross-field haptic feedback.

The experiments were performed using a preferred embodiment (referred to herein as "System D") based on the system setup depicted in FIG. 17. System D combines the ultrasonic transducer array system of System C (see FIG. 21) with an optical circuit system similar to that of System A (see FIG. 2). The portion of the system 300 that corresponds to the optical circuit system of System A includes a system controller 301, a femtosecond laser light source 310, a spatial light modulator 320, a 3D position scanner including a galvano mirror scanner unit 330 and a varifocal lens 335, an objective lens 360, and optical lenses 340, 342, 344, and 346. The system controller 301 is operatively coupled to the spatial light modulator 320, the galvano scanner unit 330, and the varifocal lens 335 via various interfaces 303. The portion of system 300 that corresponds to the ultrasonic transducer array system of System C includes the ultrasonic phased array 355, which is driven by driving circuit 350 to generate an acoustic field 357.

Referring to FIG. 17, the optical circuit system setup of System D includes a femtosecond laser light source 310, manufactured by Coherent Co., Ltd., which has a center wavelength of 800 nm, repetition frequency of 1 kHz, and pulse energy in the 1- to 2-mJ range. The femtosecond laser source 310 is configured to emit a 40-fs laser pulse. System D further includes an XB267 LC-SLM, manufactured by Hamamatsu, which has a resolution of 768×768 pixels, pixel size of 20×20 μm$^2$, and response time of 100 ms. It is configured to generate a Fourier CGH that is used for parallel optical access. The CGH, which is derived from an optimal-rotation-angle (ORA) method. System D includes a 3D position scanner setup that utilizes a Canon GM-1010 as the galvano scanner unit 330 and an Optotune EL-10-30 as the varifocal lens unit. These devices are operated by applications created using C++. The workspace is 2×2×2 cm$^3$, but can be enlarged by using larger lenses to enable a larger angle range of the galvano scanner.

The ultrasonic phased array of System D can produce haptic images roughly (spatial resolution is only 16 mm, twice the wavelength) however it can cover large areas (around 30 cm) and radiation pressure is adequately strong (16 mN). The femtosecond laser system of System D can produce haptic images precisely (spatial resolution 1 m) however it can cover only small areas (up to 2 cm). The overlap area of workspace of these laser and ultrasonic haptics is 2×2×2 cm$^3$.

Figure 22:
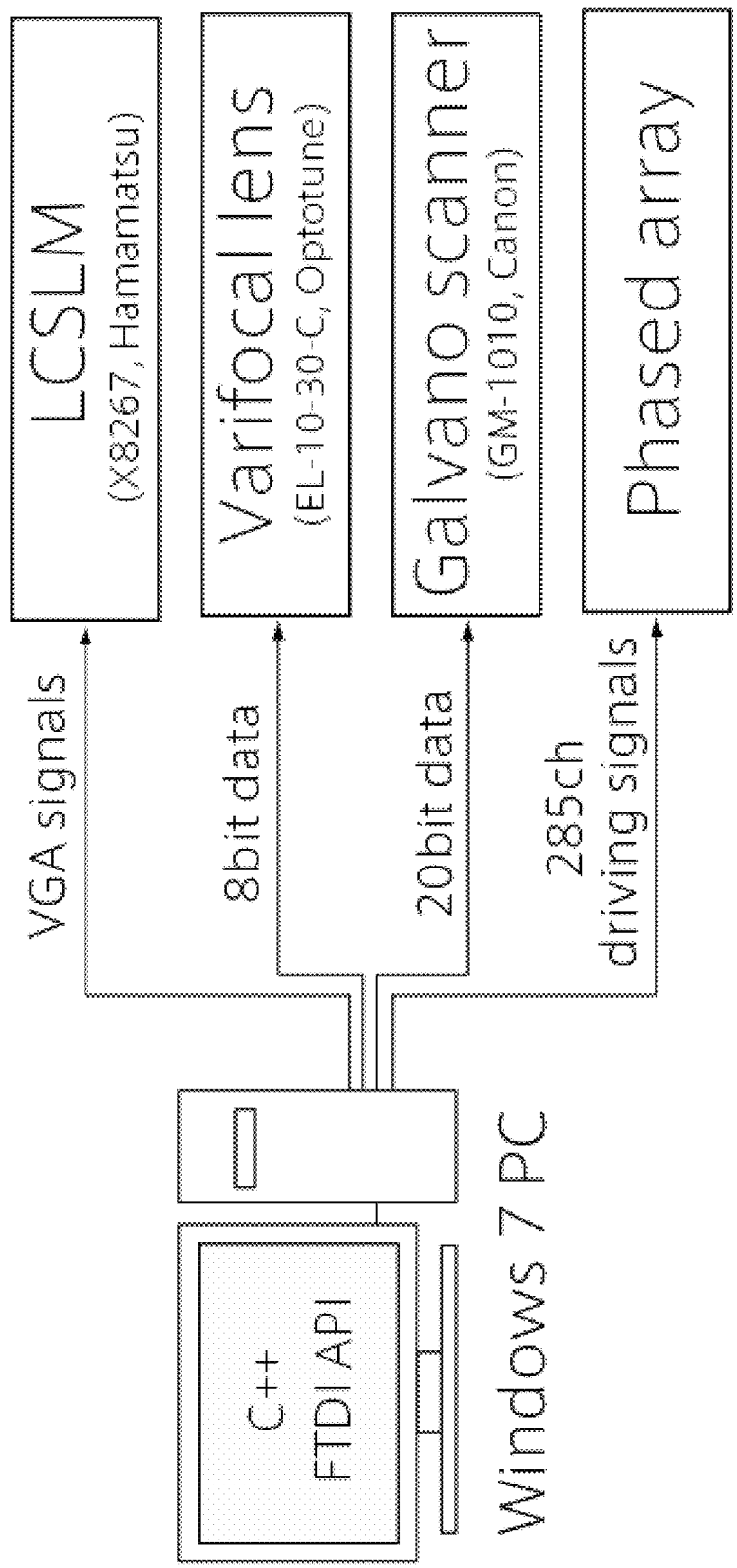
FIG. 22 shows a diagram of a control system in accordance with an embodiment of the present invention.

System D is controlled using a PC, with all programs coded in C++. Referring to FIG. 22, the PC is coupled to the ultrasonic phased array, SLM, galvano scanner unit, and varifocal lens unit via various interfaces. To monitor the interaction, a microscopic camera is connected to the system via a USB link to the PC. The ultrasonic phased array, galvano scanner unit, and varifocal lens unit run along different threads and are synchronized when new draw patterns are input. The user input is captured at 60 Hz, and the SLM is connected to the computer as an external display.

In the optical system, the PC directly sets the coordinates and controls the driving mirror, lens, and SLM. In the acoustic system, the PC transmits data including coordinates of the focal point and output force to an FPGA. On receiving the data, the FPGA calculates adequate time delays for each transducer based on Eqs. (13) and (15), and generates the driving signals. The driving signals are sent to the transducers via the amplifiers. Modifying the time-delay calculation algorithm changes the distribution of the acoustic-potential field. The output force is varied through pulse width modulation (PWM) control of the driving signal.

Figure 18C:
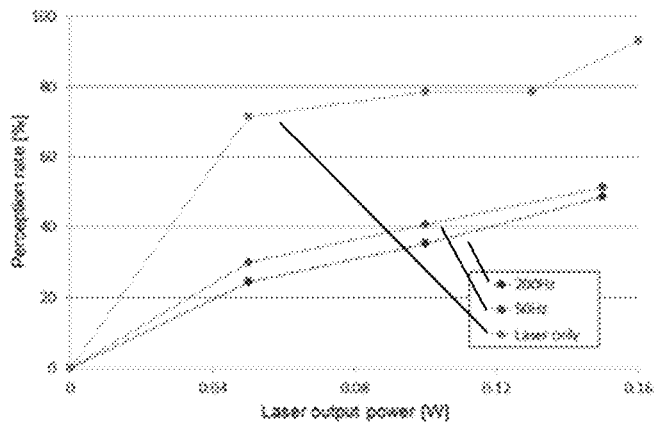

The results are shown in FIG. 18C, where "Laser only" is identical to FIG. 18A. The results indicate that an ultrasound field, weaker than the perceptual threshold, affects the perception of laser shock wave. The 50% perceptual threshold for the laser haptics with unperceivable ultrasonic preload is around 0.15 W, which is nearly 5 times larger than that of "Laser only" approach. (See FIG. 18C comparing trend lines corresponding to 200 Hz and 50 Hz to trend line corresponding to "Laser only").

The results demonstrate that the two fields can be superposed and that the combination of the field has a synergistic effect on haptic perception. Further, the results support a masking effect—i.e., the ultrasound represses the human sensitivity to the laser plasma. The acoustic field affects the tactile perception of the laser haptics. This means that the ultrasonic preload makes the laser haptics less surprising and less painful. The superposition of the field also provides benefits such as multi-resolution haptic images.

For aerial interaction, there are two necessary conditions on volumetric displays. They should be safe and accessible. The experiments demonstrate that a system set up like System D can provide a safe and accessible haptic interaction.

Haptic Application 1: Haptic Interface

In accordance with another embodiment of the present invention, an interactive user interface is provided. The experiments showed that human touch has some effect on the plasma that can be detected or cause changes in the content. Femtosecond laser induced-plasma generates shockwaves that are safe to touch and becomes brighter when it is contacted by an object. FIG. 14C shows a heart rendered in air and the effect of interaction with an object. FIG. 14F shows a light point that changes into a "jewel" after contact with a ring. 14G shows direct interaction between a light point and a finger. Thus, a plasma-based aerial display can be turned into an interactive aerial display system with the addition of a camera or other sensors.

A sensor, e.g., a camera or light detector, can be used to detect interactions between the plasma and a user. Further, the tactile sensation can be used, for example, to create "an aerial check box." FIG. 10B shows such an interaction between a user and an aerial image. A femtosecond laser field is used to render an aerial button graphic 12. When a user 10 touches the aerial button graphic 12, the user 10 can sense shockwaves 14 caused by contact with plasma which serves as haptic feedback. The contact also causes a change in brightness of the plasma which can be detected by a camera or other optical sensor coupled to a processor. This detected change can be registered as an indication that the aerial button graphic was selected. The control system can control the laser field to render a different aerial button graphic 16 which visually indicates that the aerial button graphic has been selected as a supplemental visual feedback.

Haptic Application 2: Multi-Resolution Haptics for VR

Other distributions of acoustic fields that can be generated in accordance with the present invention include acoustic fields having arbitrary shapes, including arbitrary 3D shapes. For example, one or more ultrasonic phased arrays surround a workspace can be used to generate standing waves of various shapes to provide acoustic fields having arbitrary shapes. In accordance with embodiments of the present invention, any desired 3D ultrasound distribution can be generated using ultrasonic computational holography using multiple phased arrays using Eq. (2) to generate the desired CGH. When generating standing waves using multiple arrays, the CGH $U_r$ to be generated by each phased array depends on its spatial position relative to the other phased arrays. For each phased array, the CGH $U_r$ should be rotated according to the relative position of the phased array in order to obtain a $U_h$ for the phased array. The desired 3D ultrasound distribution is ultimately obtained by superposing the 3D ultrasound distributions provided by each of the ultrasonic phased arrays.

Laser-induced haptic images are given by a combination of an SLM image and galvano scanner unit. Haptic image $H_i$ is the summation of the time series of the focal points, that is, $$H_i = \Sigma U_r(x,y) \times p \times t, \quad (16)$$

where $U_r$ represents the laser focal points given by (1), t is time duration, and p is laser intensity.

In accordance with another embodiment of the present invention, a multi-resolution haptics for virtual reality is provided. The acoustic field can be used for simple 3D haptic images and to indicate general haptic areas. The light field can be used for detailed haptic images. In AR/VR applications, an object perimeter (simple) may be expressed by ultrasound and the inner structure and/or indication (detailed) can be expressed by laser.

Figure 23:
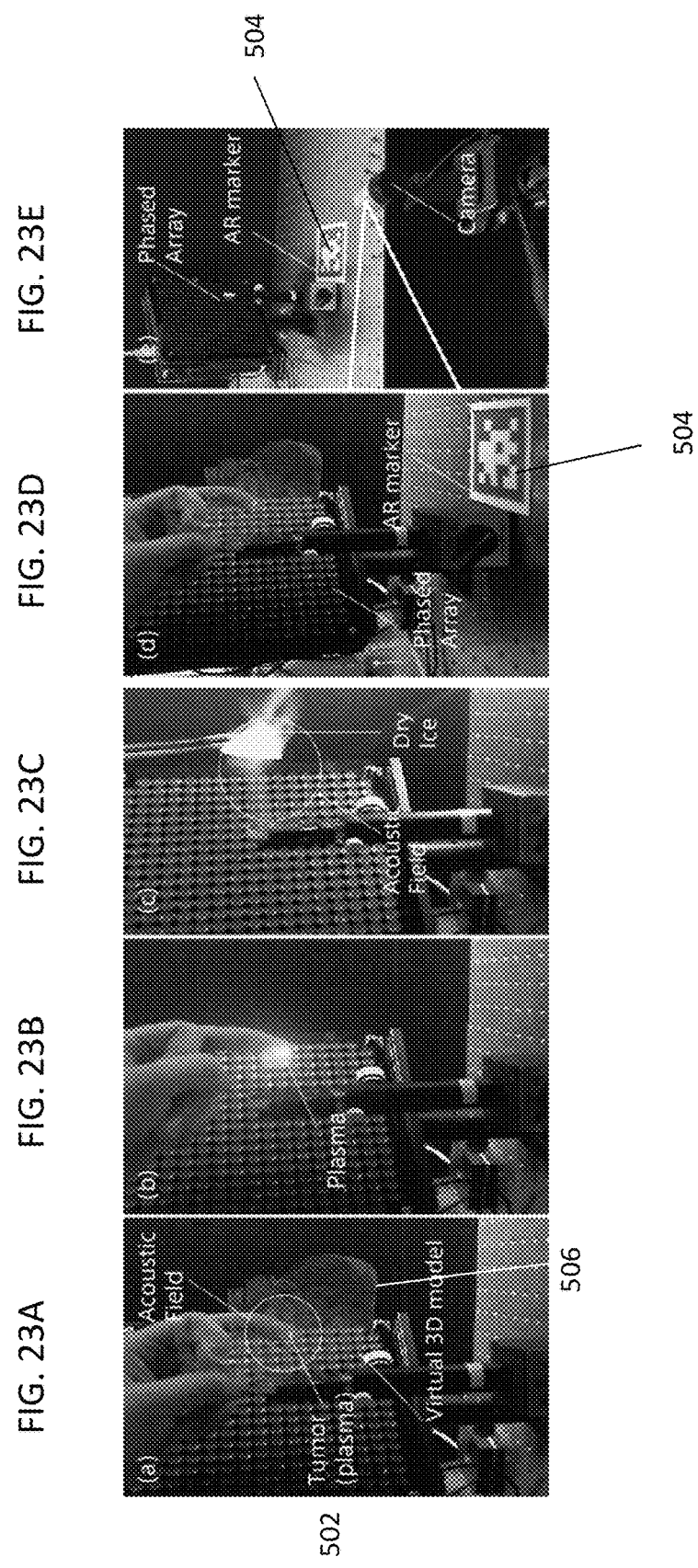
FIGS. 23A-23E show multiresolution 3D images rendered by laser and ultrasound, more specifically.

FIGS. 23A-23E show a series of photographs of an augmented reality system that is used to present the location of a tumor in a virtual 3D model of a heart. FIG. 23A shows a 3D haptic image of a heart 506 generated by an acoustic field and a haptic image of a tumor 502 generated by a light field. The haptic image of the tumor 502 is positioned within the 3D haptic image of the heart 506. An AR marker 504 is used for matching coordinates between the camera view and 3D object. The low resolution haptic image by acoustic field is used to as a general guide to point to a portion of 3D model. The high resolution haptic image by plasma is used for precise expression for pointing out an inner structure of target 3D models. When participants put their fingers into a virtual 3D model generated by System D, initially they feel the outer haptic image which corresponds to the perimeter of the virtual model. Subsequently, participants feel the inner haptic image (laser plasma) inside of the virtual model. This plasma works as an indicator to a precise point (ex., a tumor in organs, pointer of 3D haptic map, etc.). This application extends conventional ultrasonic haptics in the resolution and the variety of tactile feedback patterns.

Haptic Application 3: Aerial Braille Alphabet

Figure 24:
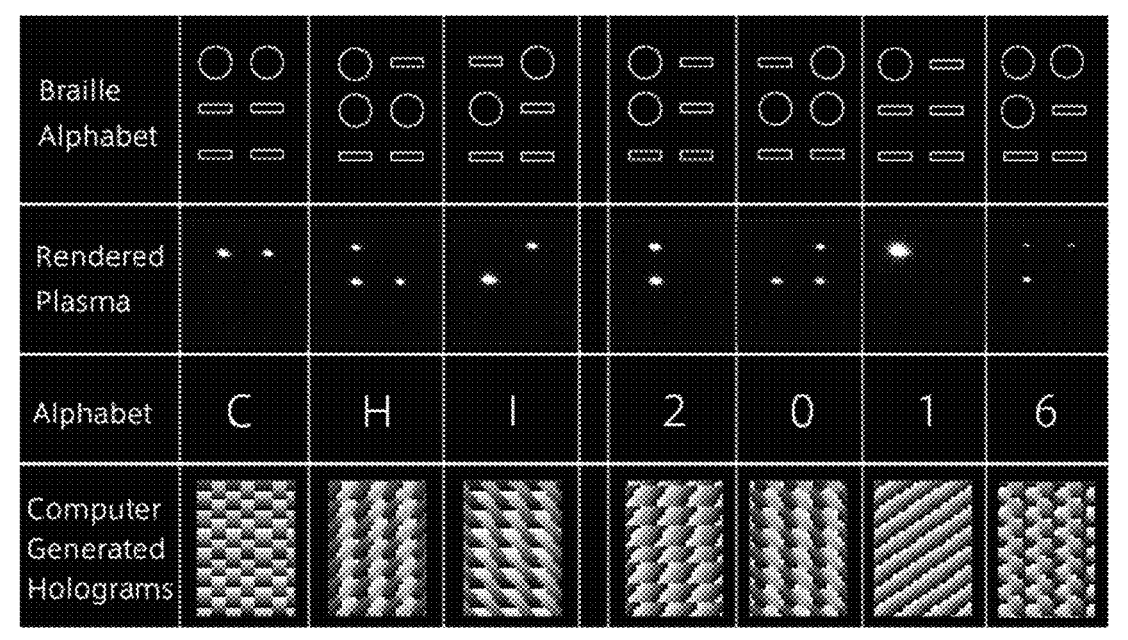

Conventional braille alphabet display is made of pin actuator arrays or other contact type display. In conventional ultrasonic or air jet haptic display cannot create precise and high resolution haptic image. In accordance with another embodiment of the present invention, an aerial Braille system is provided. System D can be programmed to express small and precise haptic images at an arbitrary position in air. These haptic images can be a collection of dots and dashes that can be used to generate a Braille display. FIG. 24 shows a series of rendered plasma images representing alphanumeric characters from a Braille alphabet and its corresponding CGH. A blind subject need no longer search for the Braille writing. A camera system integrated with System D can identify the location of a blind subject's finger. An acoustic field is used to indicate the general area for detailed haptic images. Further, the acoustic field can be shaped to lead a blind subject's finger to the general area for detailed haptic images. Thus, a blind subject can easily find the general area for detailed haptic images. It will change the interaction with Braille Alphabet from "touch" to "come".

Audio Generation

Figure 28:
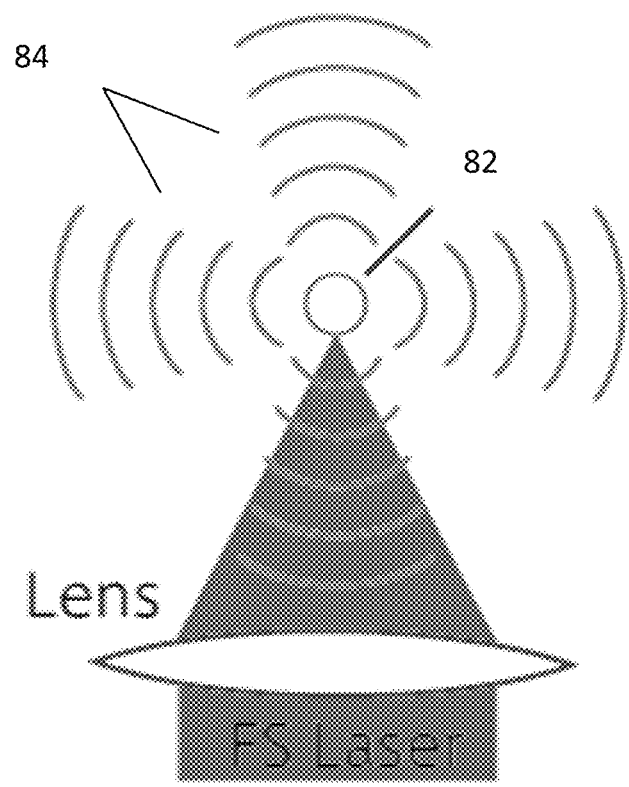
FIG. 28 illustrates sound waves radiated from laser plasma.
Figure 29:
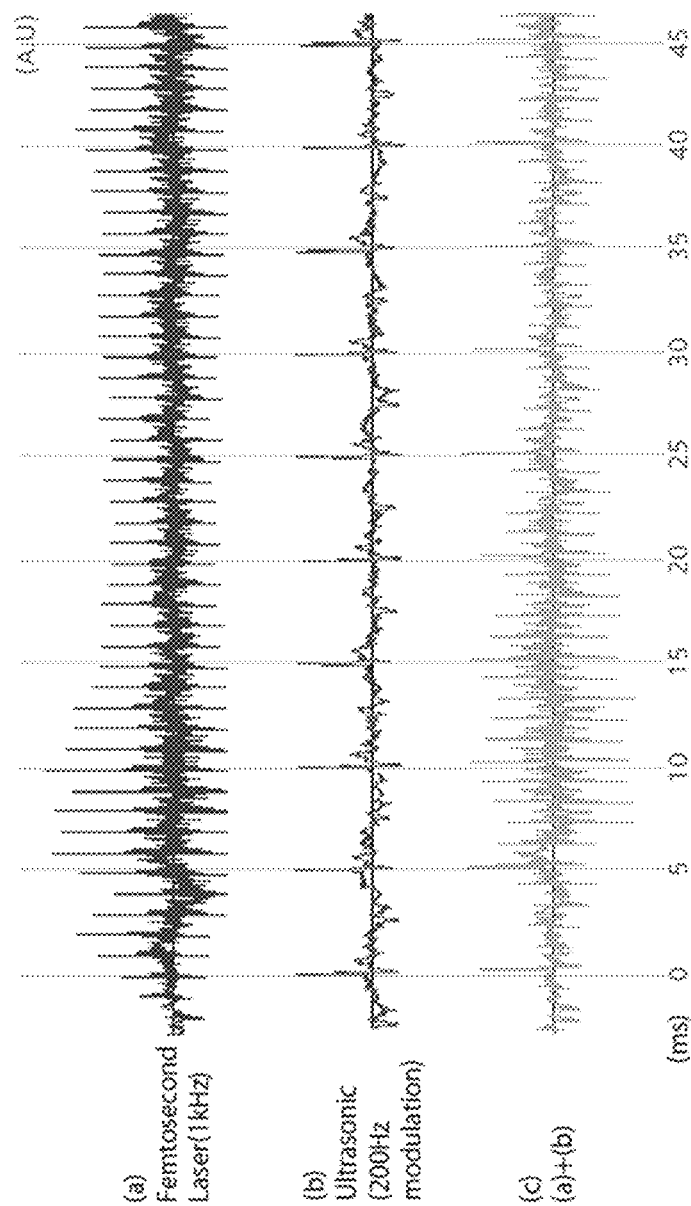
FIG. 29 shows overlapping waveforms of a light field and ultrasound field.

Plasma radiates not only light and palpable shockwaves, but also sound waves in air. Referring to FIG. 28, aerial plasma induced at focal point 82 generates audible sounds as a series of shockwaves 84. The inventors hypothesized that each plasma spot can be an ideal point source of sound with flat frequency characteristics. Thus, each plasma spot can be a speaker.

The sound pressure of a single point source $p_b r$) can be represented by the following equation:

$$p_b(r) = \frac{p_0}{r} e^{j(kr-\omega t)}, \qquad (17)$$

where r is the distance from the position of the point source, t is the time, $p_0$ is the sound pressure at the unit distance, k is the wave number and w is the angular frequency of sound. The time component $e^{-j\omega t}$ can be omitted in the calculation in order to focus on the spatial distribution. The value of $p_0$ is assumed to be equal to 1 because the relative pressure value is sufficient for the analysis.

The inventors also hypothesized that multiple plasma spots that are simultaneously generated can form a speaker array. A simulator to graphically design the acoustic fields generated by the plasma speaker array was developed based on Eq. (17). The simulator has a graphical user interface as shown in FIG. 30A that enables a user to input the positions of sound sources by selecting a point on a grid. Then it calculates the sound waves radiated from the sound sources and show the results as directivity, as shown in FIGS. 30B and 30C, or heat map, as shown in FIGS. 30D and 30E.

As discussed above, distortions due to the optical Kerr effect varies the focal-point shape resulting in filamentation. This effect must be considered when generating multiple plasma sound sources in free space because it may affect the directivity of a speaker array. The filamentation effect was simulated as the summation of plasma spots distributed along the elongated focal point. This model was formulated as follows:

$$p(x, y, z) = \sum_{n=o}^{N-1} p_b(r_n), \qquad (18)$$

where $r_n$ is the distance between the target position (x; y; z) and the n-th plasma spot. While the total energy was actually divided among N plasma dots, we used $p_0=1$ for all of them and obtained relative values in calculation.

The inventors conducted a series of experiments to explore the sonic characteristics of mid-air plasma induced by a femtosecond-pulse laser. In the experiments, the radiated sound is recorded by a microphone system recording at 192 kHz and at 24 bit. Each microphone is a mono microphone.

For each of the Audio Experiments 1-6, one or more of the following preferred embodiments were used.

Figure 31:
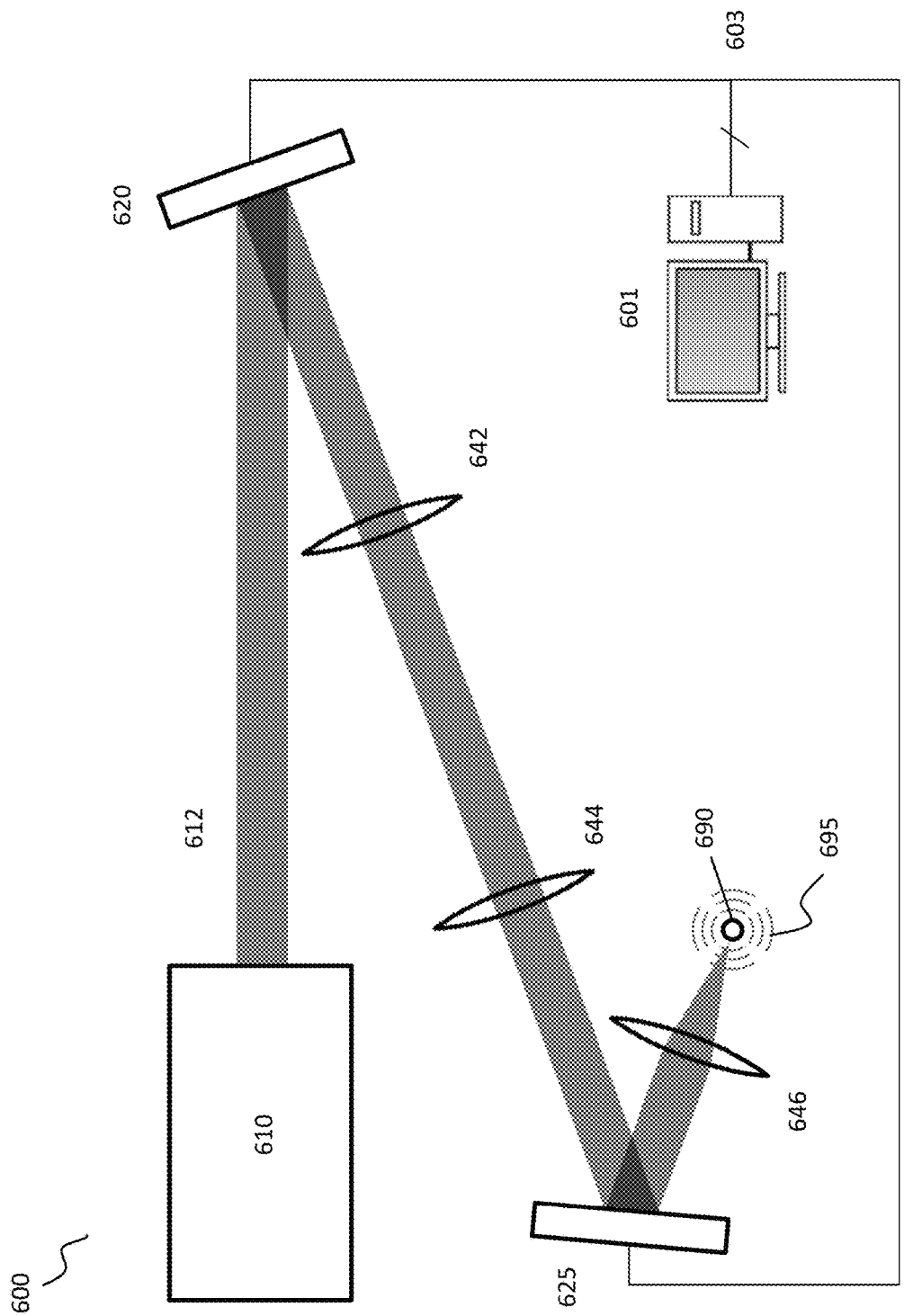
FIG. 31 shows a system for generating a sound source in mid-air according to an exemplary embodiment of the invention.

FIG. 31 shows an exemplary embodiment of a system 600 for rendering multi-point plasma speakers in accordance with the present invention. The system 600 includes a system controller 601, femtosecond laser source 610, two spatial light modulators 620, 625, and optical lenses 642, 644, and 646. The lens 646 serves as an objective lens. The system 600 can be used to generate a plasma sound source 690 at an arbitrary position in 3D space. The beam size, polarization, and power can be tuned. For example, a polarizing beam splitter (PBS), can be used for such tuning.

A preferred embodiment (referred to herein as "System E") based on the optical system setup depicted in FIG. 31 is described below.

System E includes a femtosecond laser source developed by Coherent Co., Ltd, which has an 800 nm center wavelength, 1 kHz repetition frequency, and 0.4-7 mJ pulse energy.

System E further includes a system controller comprising a PC running a Windows® operating system, with all programs coded in C++ which controls the operation of the DMD SLMs.

System E includes two DMD SLMs, DLP4500, manufactured by Texas Instruments, which have a resolution of 1190×712, a frame rate of 4 kHz, and pixel size of 7.6×7.6 μm². The DMD SLMs are controlled via a USB interface. The first DMD SLM is used to compensate for wavelength dispersion. All mirror pixels of the first DMD SLM are uniformly controlled. The second DMD SLM is used for frequency modulation and for parallel access to arrange multiple plasma speakers in air. The mirror pixels of the second DMD SLM are individually switched using pulse width modulation.

With respect to System E, a sound having a frequency up to 1 kHz (the repetition frequency of the laser source) can be radiated. Frequencies less than 1 kHz are produced by subtracting excess laser pulses. Because the frame rate of the SLM is 4 kHz, it can control individual laser pulses to deliver or not to deliver to the target point. The variation and frequency range can be improved by using a faster laser source and DMD.

Lenses 642 and 644 have a focal length 100 mm and lens 646 has a focal length 40 mm.

Figure 32:
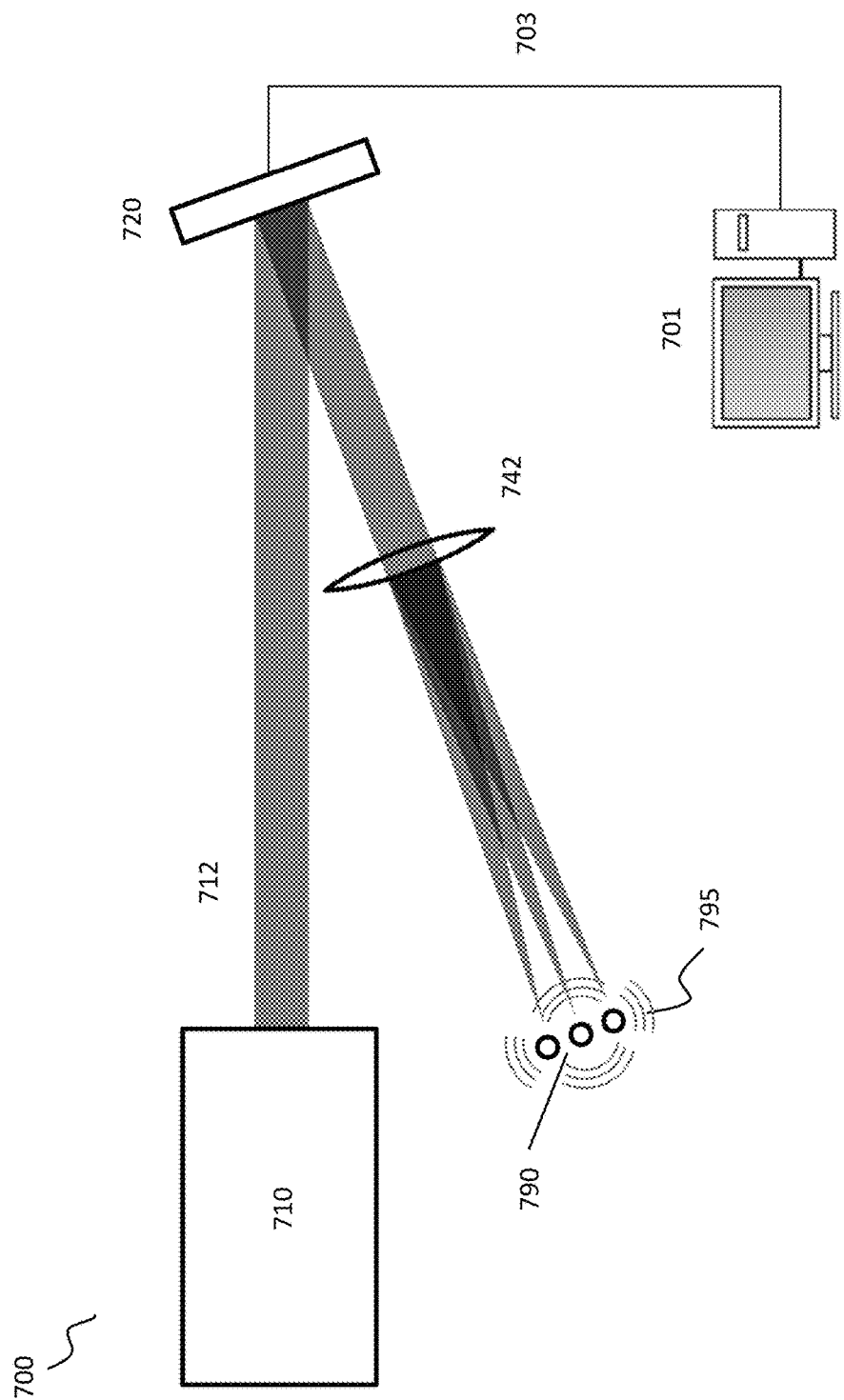
FIG. 32 shows a system for generating a sound source in mid-air according to another exemplary embodiment of the invention.

FIG. 32 shows an exemplary embodiment of a system 700 for rendering multi-point plasma speakers in accordance with the present invention. The system 700 includes a system controller 701, femtosecond laser source 710, a spatial light modulator 720, and optical lens 742 which serves as the objective lens. The system 700 can be used to generate multiple plasma sound sources 790 at arbitrary positions in 3D space. The beam size, polarization, and power can be tuned by using a PBS.

A preferred embodiment (referred to herein as "System F") based on the optical system setup depicted in FIG. 32 is described below.

System F includes a femtosecond laser source developed by Coherent Co., Ltd, which has an 800 nm center wavelength, 1 kHz repetition frequency, and 0.4-7 mJ pulse energy.

System F further includes a system controller comprising a PC running a Windows® operating system, with all programs coded in C++ which controls the operation of the SLM.

System F includes an LCOS-SLM manufactured by Hamamatsu Photonics which has a resolution of 768×768, a frame rate of 10 Hz, and pixel size of 20×20 μm². The LCOS-SLM is controlled via a USB interface and a video graphics array (GVA) display interface.

With respect to System F, a sound having a frequency up to 1 kHz (the repetition frequency of the laser source) can be radiated. Lower frequencies can be produced by subtracting excess laser pulses. Because the frame rate of the SLM is 10 Hz, it can make up to 5 Hz burst wave (10 ms for no sound and 10 ms for 1 kHz sound radiation). The variation and frequency resolution can be improved by using a faster laser source and SLM.

Lens 742 has a focal length 200 mm.

Figure 33:
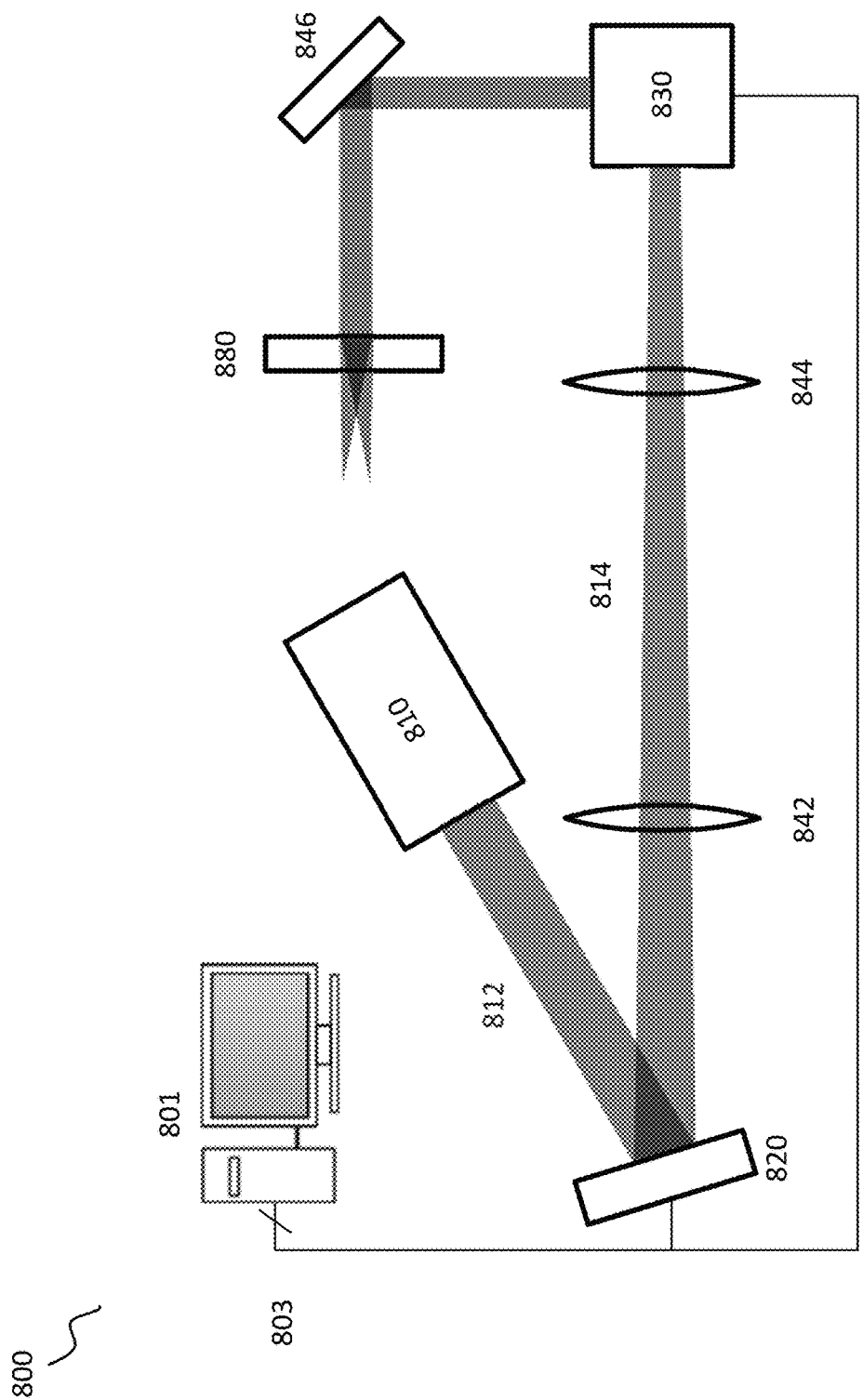
FIG. 33 shows a system for generating a sound source in mid-air according to another exemplary embodiment of the invention.

FIG. 33 shows an exemplary embodiment of a system 800 for rendering multi-point plasma speakers in accordance with the present invention. The system 800 includes a system controller 801, femtosecond laser source 810, SLM 820, optical mirrors and lenses 842, 844, and 846, a galvano scanner unit 830, and a microlens array 880. The microlens array serves as objective lenses.

A preferred embodiment (referred to herein as "System G") based on the optical system setup depicted in FIG. 33 is described below.

System G includes a femtosecond laser source developed by Coherent Co., Ltd which has a center wavelength of 800 nm, a repetition frequency of 1 kHz, a pulse energy of up to 2 mJ, and a pulse duration that is adjustable from 30 fs to 100 fs.

System G further includes an LCOS-SLM manufactured by Hamamatsu Photonics K.K. This device can perform phase-only modulation of more than 2 radian and has a resolution of 768 pixels×768 pixels, a pixel size of 20×20 m², and a response time of 100 ms.

System G further includes a galvano scanner unit, which includes a scan head unit (Canon GH-315) driven by a scanner control board (Canon GB-501). The Canon GH-315 scan head unit has a beam diameter of 10-14 mm, a scan angle of ±0.17 rad, an error of less than 5 prad, and a resolution of 20 bits. The scan head covers an area of at least about 10×10 mm². The Canon GB-501 scanner control board controls the scan head unit and laser unit to direct a laser beam to any coordinate in an XY plane. It has a standard PCI bus for interfacing with a PC and takes instructions from PC commands.

System G further includes a system controller comprising a PC running a Windows® operating system, with all programs coded in C++ which controls the operation of the SLM, galvano scanner unit, and varifocal lens unit. The galvano scanner unit and varifocal lens unit run along different threads and are synchronized when new draw patterns are received. The user input may be captured at 20 Hz. The control system further includes a USB microscope used to monitor the interactions between the optical set up and the display medium.

System G further includes a microlens array, whose lens size is 4×4 mm² and focal length is 38.24 mm.

System G can produce multiple sound sources at arbitrary positions. The SLM 820 splits a single laser beam 812 to multiple beams 814 by CGH, and the galvano mirror 830 directs these beams towards multiple focal points. Finally, the microlens array 880 focuses these beams to form sound sources at the focal points.

Figure 34:
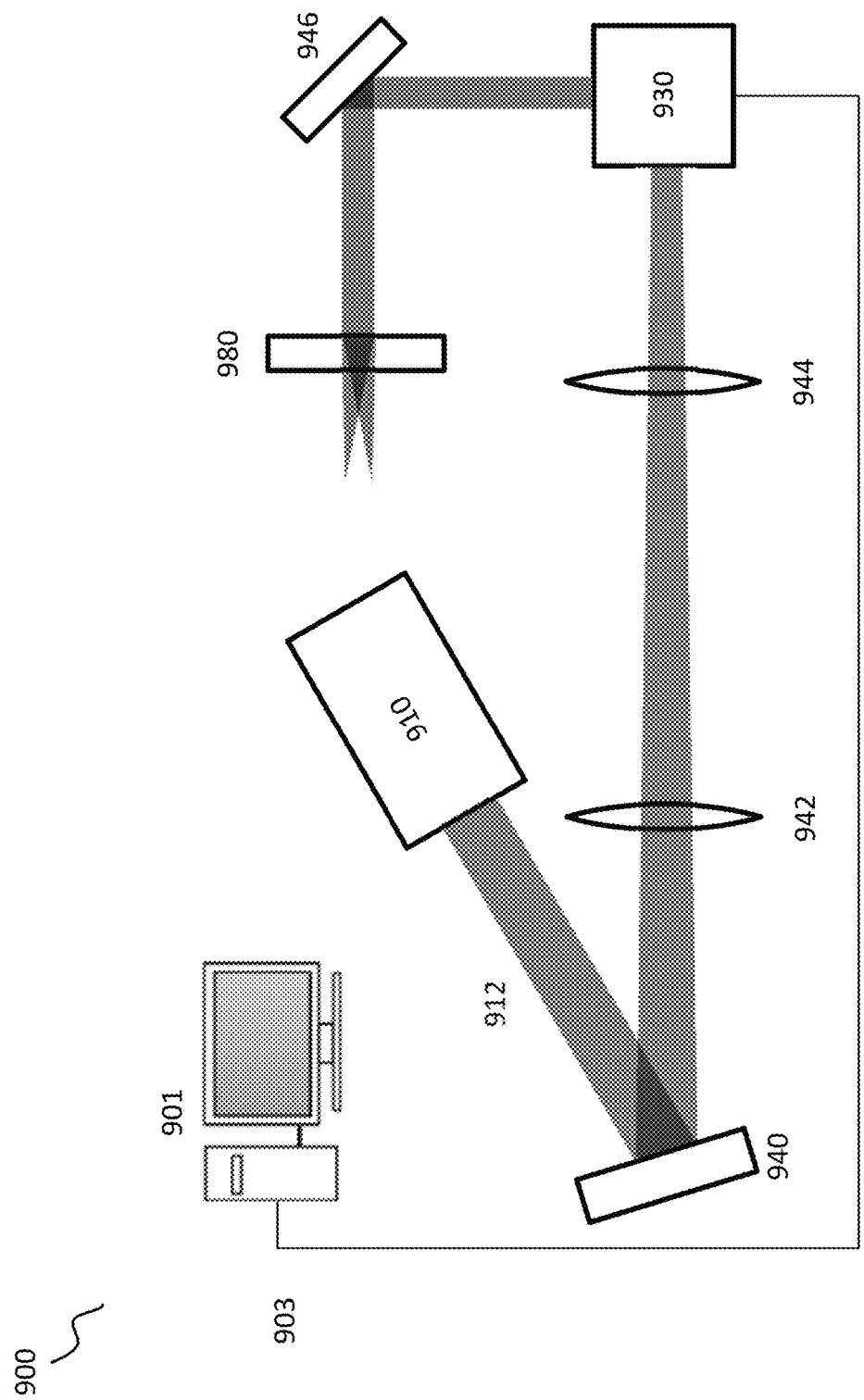
FIG. 34 shows a system for generating a sound source in mid-air according to another exemplary embodiment of the invention.

FIG. 34 shows an exemplary embodiment of a system 900 for rendering multi-point plasma speakers in accordance with the present invention. The system 900 includes a fabricated modulator 980 instead of an SLM. The fabricated modulator is a microlens array that is covered with a printed mask.

A fabricated modulator is a passive modulator that can be made by printing a gray-scale pattern on transparent film using an ink-jet printer. A laser pulse beam is scanned on the fabricated modulator using a galvano mirror, and the focal point is modulated by the energy absorption of the gray-scale pattern. This method exploits the high spatial resolution of an ink-jet printer.

A preferred embodiment (referred to herein as "System H") based on the optical system setup depicted in FIG. 34 is described below.

System H is similar to System G, except that SLM 830 is replaced with an optical mirror 940 and microlens array 880 is replaced with a fabricated modulator 980.

System H includes a fabricated modulator which has a resolution of 300 dpi.

The galvano mirror 930 directs the laser beam 912 along a programmed trajectory through the gray-scale pattern of the fabricated modulator 980. The laser beam 912 is attenuated by the gray-scale pattern and then the microlens array focuses the laser beam. The gray-scale pattern is used to modulate the amplitude of the laser beam. The gray-scale pattern can be derived according to audio data (phonorecord-like method) for playback or can be a coded pattern in which the galvano mirror directs the laser beam to a particular position in the coded pattern to generate a particular sound (piano-like method).

Audio Experiment 1: Laser Power vs. Sound Volume

Figure 25A:
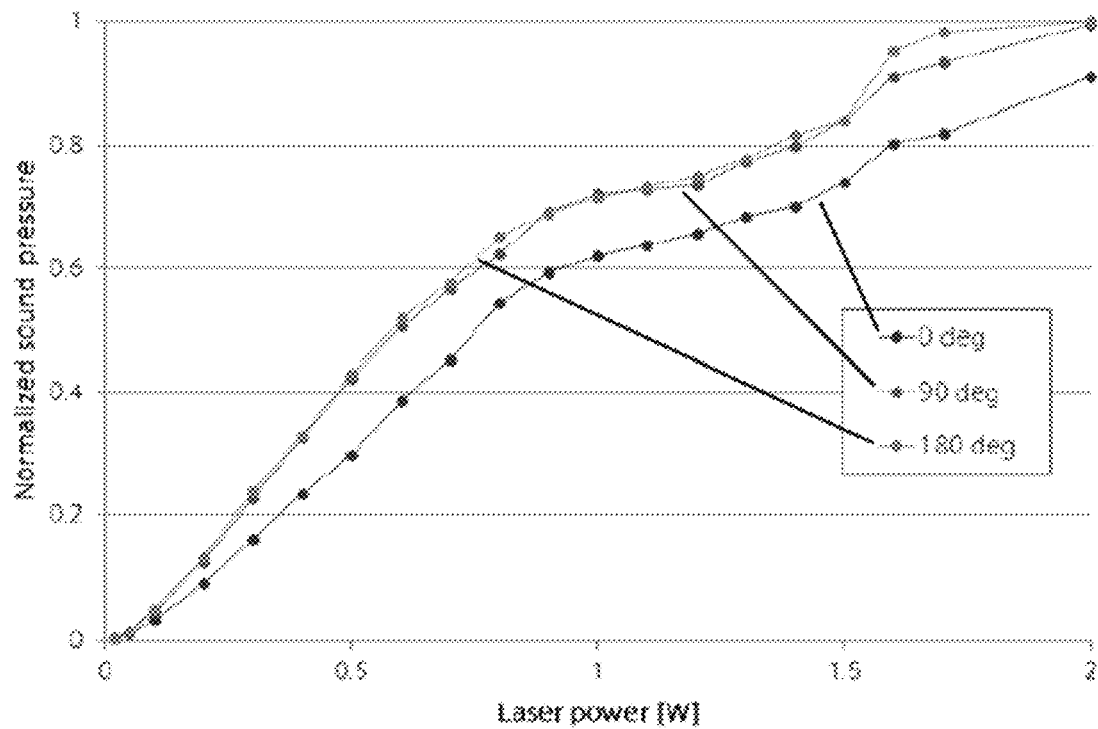
FIG. 25A shows a chart comparing normalized sound pressure radiated from a single focal point with various laser power.
Figure 25B:
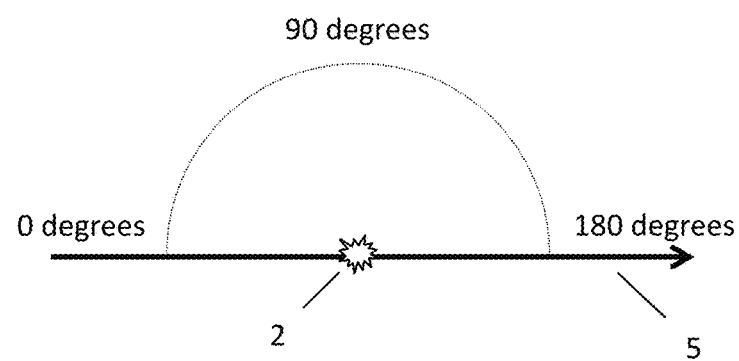
FIG. 25B shows microphone positions around a plasma spot measured in degrees relative to the propagation direction of a laser beam.

The inventors conducted experiments to evaluate the relationship between the plasma-production and the resultant radiation of the speakers. The experiments determined the sound volume corresponding to the energy level. The experiments were conducted using System A configured at 30 fs for a time-averaged power output range from 0.05 to 1.60 W. The experiments were performed under energies per pulse in the range from 0.16 to 1.6 mJ. The experimental results are shown in FIG. 25A. The phases are the relative angles between the propagation direction of a laser beam 5 and the position of a microphone relative to a plasma spot 2 as shown in FIG. 25B. The vertical axis shows the amplitude of sound wave in linear scale (not in decibels). The brighter plasma spots tend to be accompanied by the louder sound.

Audio Experiment 2: Polar Characteristics

The inventors conducted an experiment to evaluate the polar characteristics of a single sound source in order to consider the effect of laser filamentation on sonic applications. The polar characteristics of a sound source is a measure of the directional characteristics of a sound source at a short distance, whereas directivity is generally a measure of the directional characteristics at a far distance. In this experiment and the following experiments, the audio data was measured at short a distance and there is a possibility that sound waves can further interfere with each other at greater distances. Nevertheless, the terms polar characteristics and directivity are similar with respect to a plot showing angle against amplitude and are used interchangeably herein.

The directivity is determined by the arrangement of sound sources. So the difference between these devices with respect to directivity is how freely they can generate sound sources in air.

The inventors experimented with three different focus distance lenses (f=40, 100, and 300 mm). The femtosecond laser light source was configured to have a 30-fs pulse width, 6.62-W source power, 1-kHz pulse repetition (6.62 mJ/pulses).

Figure 26:
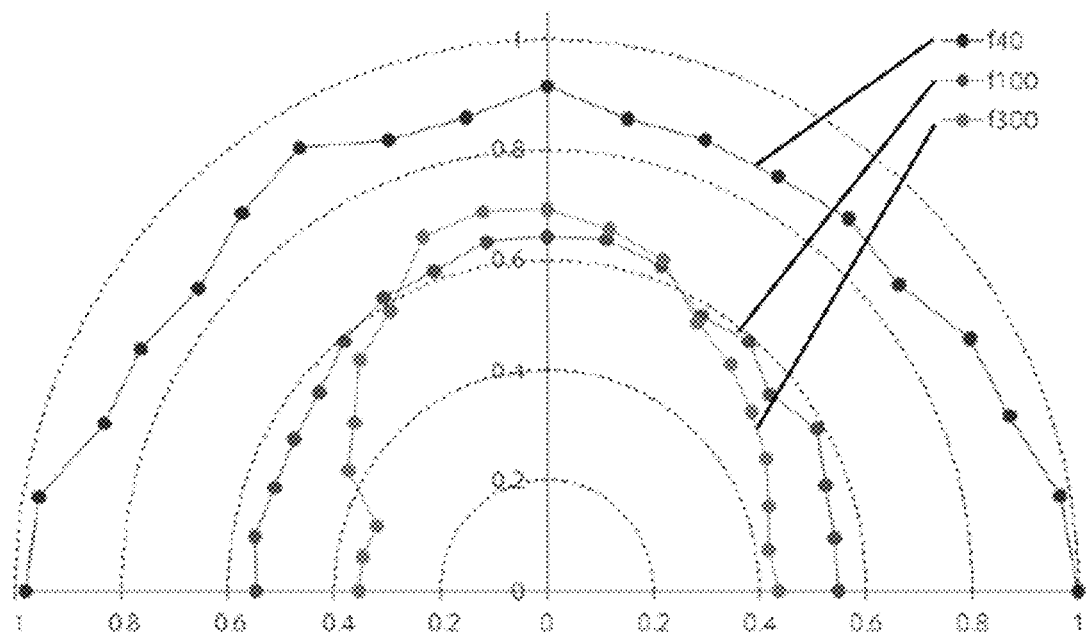
FIG. 26 shows a chart comparing the directivity of a focal point at different focal lengths.

FIG. 26 shows the polar characteristics of a single focal point at various focal lengths for a laser beam propagating from left to right. The experiment showed that the filamentation of the short focal length lens is shorter than that of the long focal length lens. The experiment also showed that the filamentation has a directivity of sound radiation. It radiates stronger sound in the vertical direction than that in the parallel direction. The graph shows the characteristics of filamentation that become noticeable when the focal length increases.

Interference between the sound waves radiated from the sound sources makes a complex sound pressure distribution around them. A 2D spatial map of sound pressure is used to describe these sound sources. However, from a distance, these sound sources appear to be a single sound source with a directivity. So the angle, or polar characteristics, is sufficient to describe the characteristics of a single sound source.

Audio Experiment 3: Pulse Width vs. Sound Volume

The inventors conducted experiments to explore the relationship between laser power and the resultant speaker volume for different pulse width settings. The experiments were conducted using System A with pulse widths set at 30 fs and at 100 fs and for a laser output power range from 0.05 to 1.60 W. The same microphone, as used in Audio Experiment 1, was used to capture the sound generated.

Figure 27:
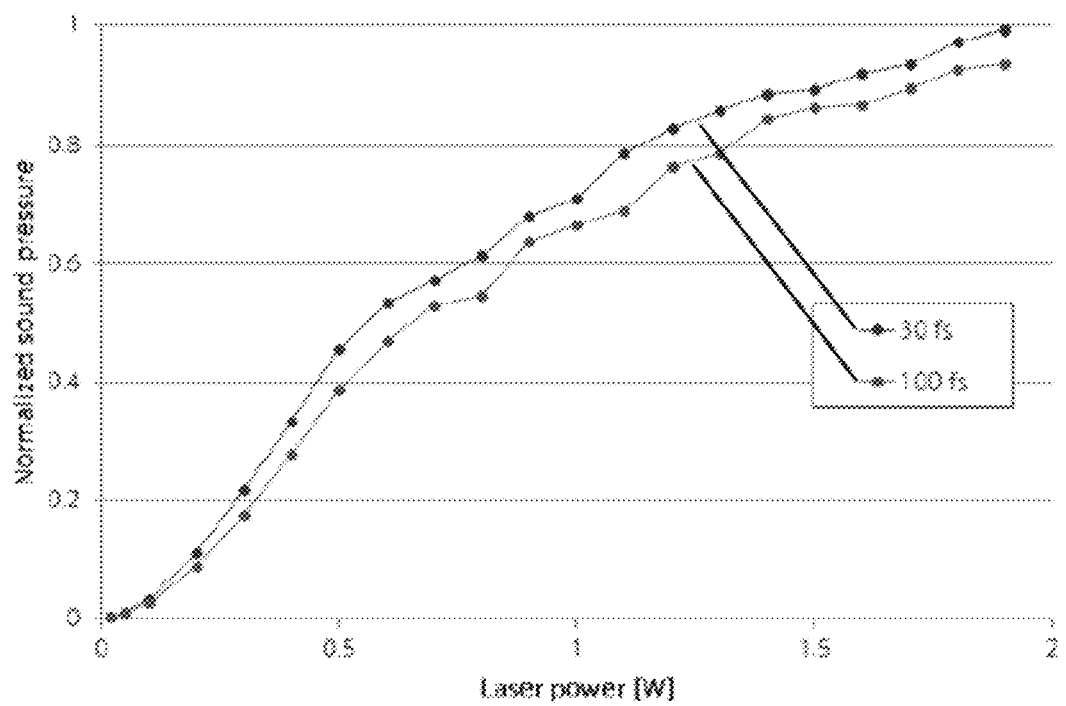
FIG. 27 shows a chart comparing normalized sound pressure radiated from a single focal point with various laser power and various pulse widths.

The results of the experiment are shown in FIG. 27. Plasma generated from a 100-fs pulse width radiates slightly weaker sounds than plasma generated from 30-fs pulse width, however the difference is minimal under the same laser source power.

Audio Experiment 4: Characteristics in Frequency Domain

Figure 35A:
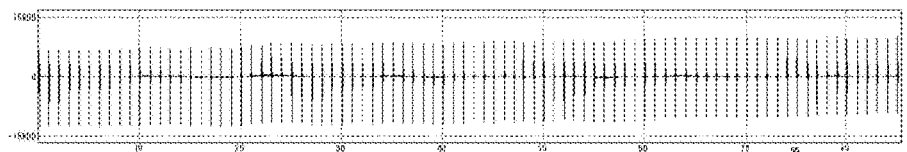
FIGS. 35A and 35B show the sound waveform and frequency characteristics of a single focal point, more specifically.
Figure 35B:
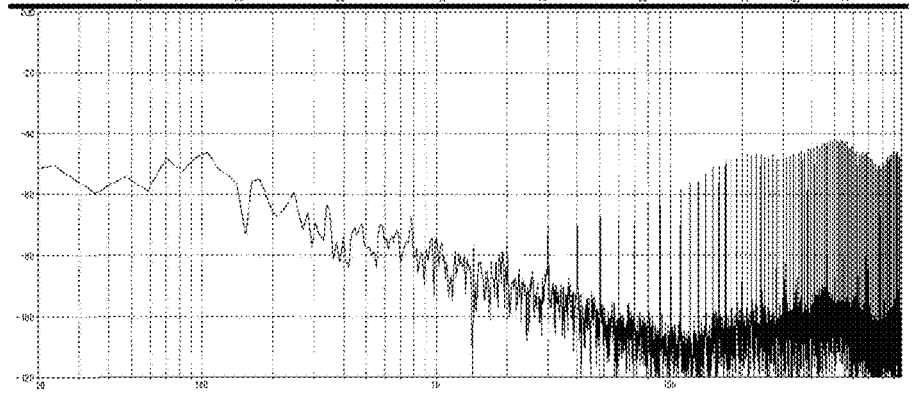

The inventors analyzed the frequency characteristics of the measured sound using Fast Fourier Transform (FFT). FIGS. 35A and 35B show an exemplary sound waveform and frequency characteristics of a single focal point. FIG. 35A shows the recorded waveform in the time domain and FIG. 35B shows the calculated frequency spectrum. There are sharp peaks at intervals of 1 kHz, which is expected since the repetition frequency of the femtosecond laser light source is 1 kHz. The sharp pulses repeated in intervals of 1 ms in the time domain is transformed to a broad spectrum sampled by a comb function in intervals of 1 kHz in the frequency domain.

Audio Experiment 5: Polar Characteristics of Simultaneously Addressed Voxels by Microlens Array The inventors conducted an experiment to determine whether multiple plasma sound sources can be simultaneously rendered in free space. Simultaneous addressing is important for creating spatial distribution of acoustic fields, polar characteristics of sound source, and the function of directional speakers. The simultaneously addressed plasma speakers have smaller maximum amount of speaker volume than a single plasma speaker because the energy is distributed among them. In this experiment, multiple sound sources were simultaneously generated from a microlens array.

A microlens array has discrete small lenses. A microlens array is generally a glass plate that has a surface with concave portions arranged in a grid where each concave portion acts as a lens. A microlens array which has 4×4-mm² lenses was used in this experiment.

Figure 36A:
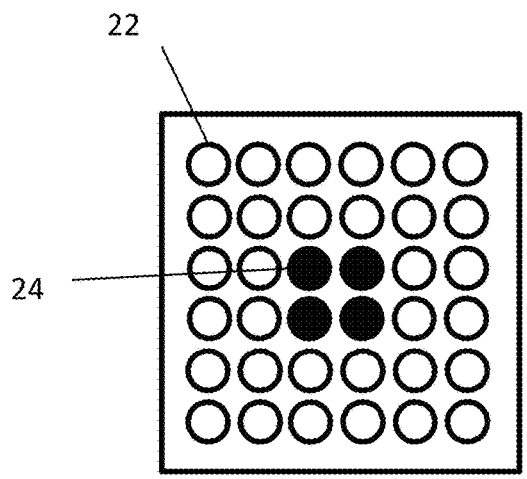
FIG. 36A shows a microlens array with a particular illumination pattern according to an exemplary embodiment of the invention.
Figure 36B:
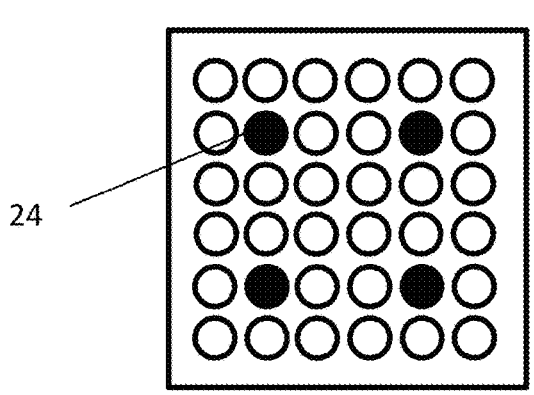
FIG. 36B shows a microlens array with another illumination pattern according to an exemplary embodiment of the invention.

When a microlens array is used as objective lenses, a single laser beam is split by the small lenses and multi-access is achieved without an SLM. For example, if the diameter of a laser beam is about 8 mm then the laser beam can pass through a group of four adjacent lenses resulting in focal points. FIG. 36A shows a microlens array 20 having lenses 22. A laser beam passes through a group of lenses indicated by darkened lenses 24 which split the laser beam into four beams. If an SLM is used in conjunction with a microlens array, any lens on the microlens array is available to make focal points (e.g., as shown in FIG. 36B). Referring to FIG. 36B, the darkened lenses 24 indicate a different illumination pattern for a laser beam.

Figure 36C:
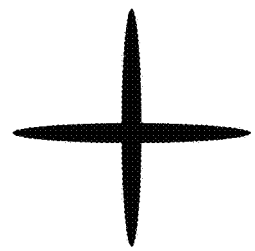
FIG. 36C shows a theoretical sound pressure distribution corresponding to a plasma distribution induced using the microlens array shown in FIG. 36A.
Figure 36D:
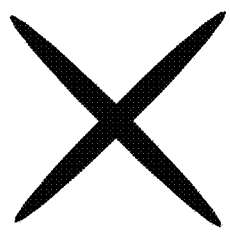
FIG. 36D shows a theoretical sound pressure distribution corresponding to a plasma distribution induced using the microlens array shown in FIG. 36B.
Figure 36E:
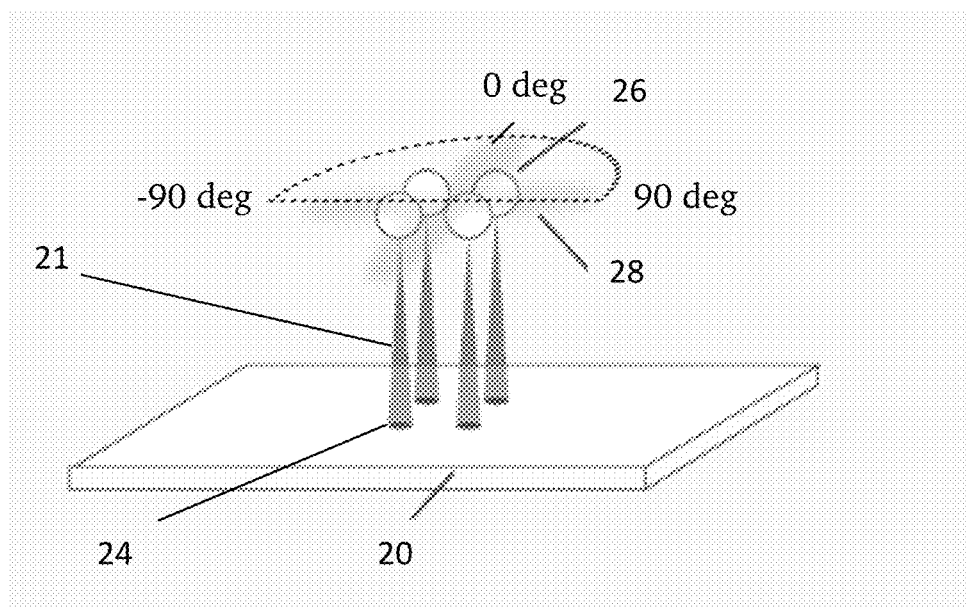
FIG. 36E shows an experimental setup for measuring a sound pressure distribution generated by a microlens array.

This experiment aimed to explore the polar characteristics of the of the simultaneously generated multiple sound sources and validate our simulators and hologram generators to compare the results. To consider the difference of spatial distributed plasma, the experiments were performed using a microlens arrays (4×4 mm²) having a focal distance of 38.24 mm. The sound was recorded with mono microphones placed at various positions from −90° to 90°. Referring to FIG. 36E, a laser pulse beam passes through four lenses 24 and splits into four laser pulse beams 21 that induce plasma emission effects at four focal points 26. The induced plasma generate sound waves that interact with each other to form a sound pressure distribution 28 that depends on the distribution of the plasma. FIGS. 36C and 36D show the theoretical sound pressure distributions corresponding to the plasma distributions induced by microlens arrays having the illumination patterns shown in FIGS. 36A and 36B, respectively.

The results for a system utilizing a microlens array as the modulator are shown in FIGS. 44A-44I. In FIGS. 44A-44I, the directivity characteristics of 10-, 20-, 30-, 40-, 50-, 60-, 70-, 80-, and 90-kHz components are shown. These measurements shows the fundamental characteristics of interference between laser-generated sound sources depending on frequency.

The possible plasma distributions are limited by the interval of the microlenses. A continuous objective lens, instead of microlens array, can generate sound sources at arbitrary positions and intervals.

Figure 38:
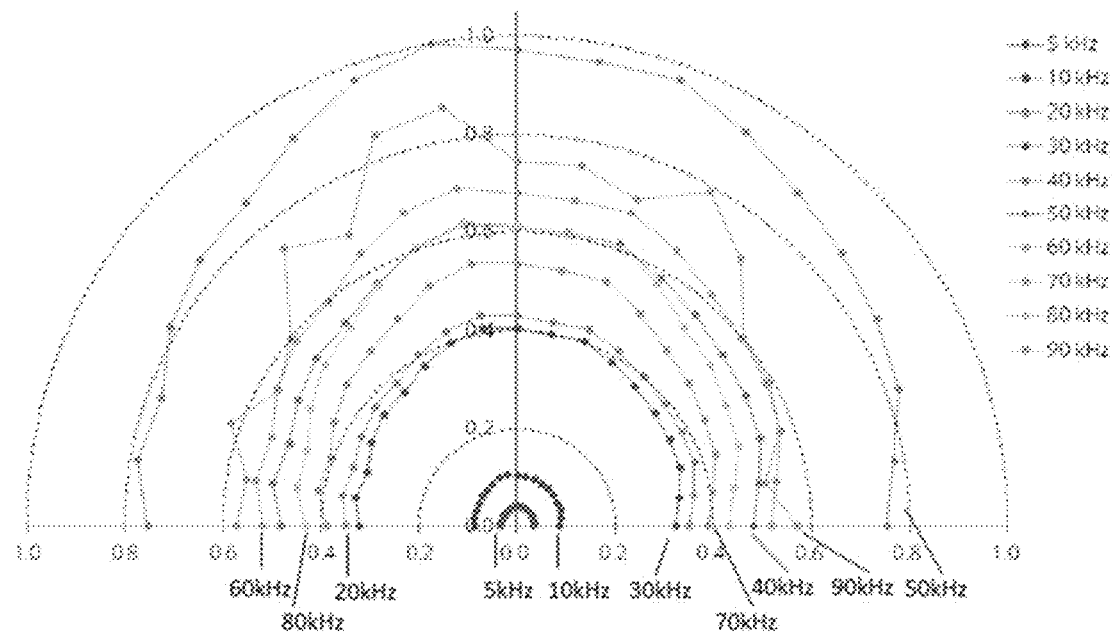
FIG. 38 shows the polar characteristics of each frequency component of the sound radiated from two sound sources generated by using LCOS-SLM.
Figure 39:
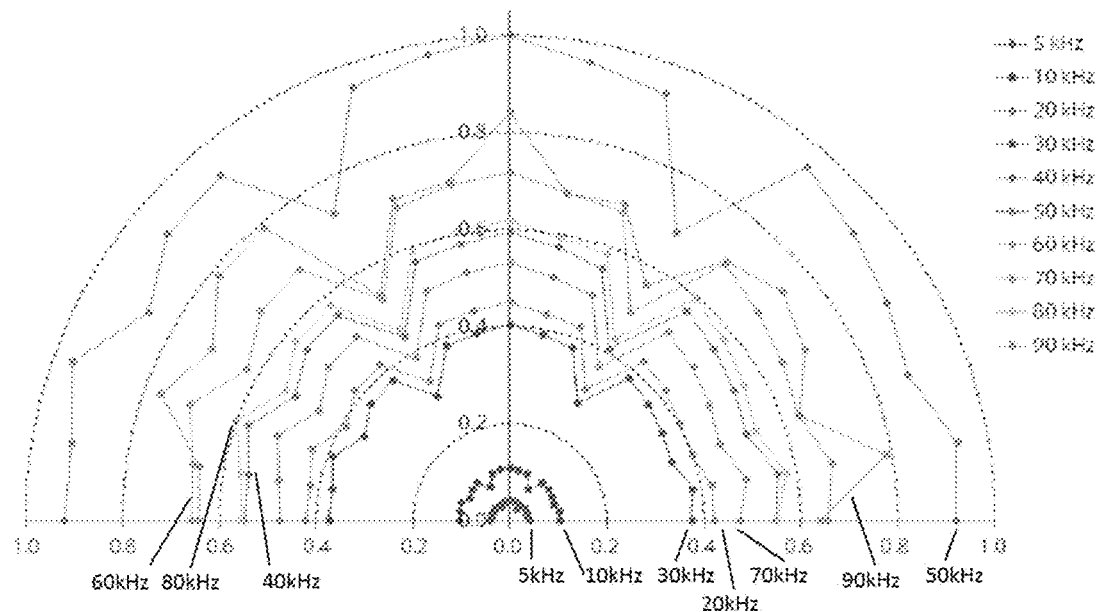
FIG. 39 shows the polar characteristics of each frequency component of the sound radiated from four sound sources generated by using LCOS-SLM.

Audio Experiment 6: Polar Characteristics of Simultaneously Addressed Voxels by SLM The inventors conducted an experiment to evaluate the polar characteristics of multiple sound sources simultaneously generated from SLMs and holograms. This experiment aimed to compare the polar characteristics of multiple sound sources generated using holography techniques with those of previous experiments, in which the spatial positions of the plasma are fixed by microlens array, described in Audio Experiment 5. It is also aimed to validate the directivity/distribution simulators developed for estimation and design of the acoustic field. In this experiment, a focal length of 30 mm was used. The sound was recorded using a mono microphone placed at the 90° position towards the optical path. The plasma distribution from the SLM was rotated by changing the CGH in 100 steps. FIGS. 38 and 39 show the results and simulations. The results confirmed that plasma distribution using SLM and CGH can be generated and the measured distribution validates simulated results.

System F was used for this experiment.

The polar characteristics are measured with a fixed microphone by rotating the CGH, instead of moving the microphone around the laser beam. These two measurements are equivalent and we used the former just for simple experimental procedure.

The two and four sound sources were generated at 0.5-mm intervals, which were too short to make effective interference. This can be improved by using a larger-diameter objective lens. As another way to achieve longer intervals between sound sources, a microlens array can be used in conjunction with an LCOS-SLM.

Audio Applications

Audio Application 1: 3D Aerial Audio Speaker (Spatial Audio)

Laser induced plasma can be manipulated and distributed at arbitrary positions within a three-dimensional space. Plasma induced at a focal point of an ultra-short pulse laser generates impulse-like shockwaves. The shockwaves can be modulated and adapted for spatial audio designs. Thus, the plasma can be arranged as audio speakers in arbitrary positions in a three-dimensional (3D) configuration in the real world. This spatial control feature expands the possible applications of sound distribution control. 3D audio generation can play an important role in immersing users in communications and entertainment, in conjunction with visual displays.

In accordance with an exemplary embodiment of the present invention, a plasma based aerial speaker is provided.

The inventors examined how the sound volume can be controlled. Amplitude control is performed by adjusting the intensity (i.e., power) of the laser pulses. For fixed intensity laser pulses, a DMD SLM, LC-SLM, LCOS-SLM, fabricated modulator, or beam shutter can be used to attenuate the intensity of the laser pulses. A DMD SLM can control the number of pixels that are on and thus can be used to control how much of the incident laser pulse is reflected. An LC type SLM can generate multiple focal points from a single laser pulse beam and thus can be used to reduce the laser intensity by splitting the laser pulse beam. A grayscale glass can control how much of the incident laser pulse is transmitted and thus can be used to attenuate the laser intensity. A grayscale glass is a fabricated modulator that has pixelated areas with various grayscale transparencies printed. A beam shutter can also be used to attenuate the intensity of laser pulses. A beam shutter can decrease the cross-sectional area of a laser pulse beam and thus can be used to control how much of the incident laser is transmitted.

The inventors examined how frequency can be modulated. Frequency control is performed by adjusting the repetition rate of the laser pulses. For a fixed frequency laser pulses, some pulses can be eliminated. This can be realized by delivering laser pulses to a sound source position at the intended frequency. For example, if a 1-kHz pulse laser source is used and a 500 Hz tone is desired, only half of the pulses generated by the laser source should be directed to the sound source position.

Figure 37A:
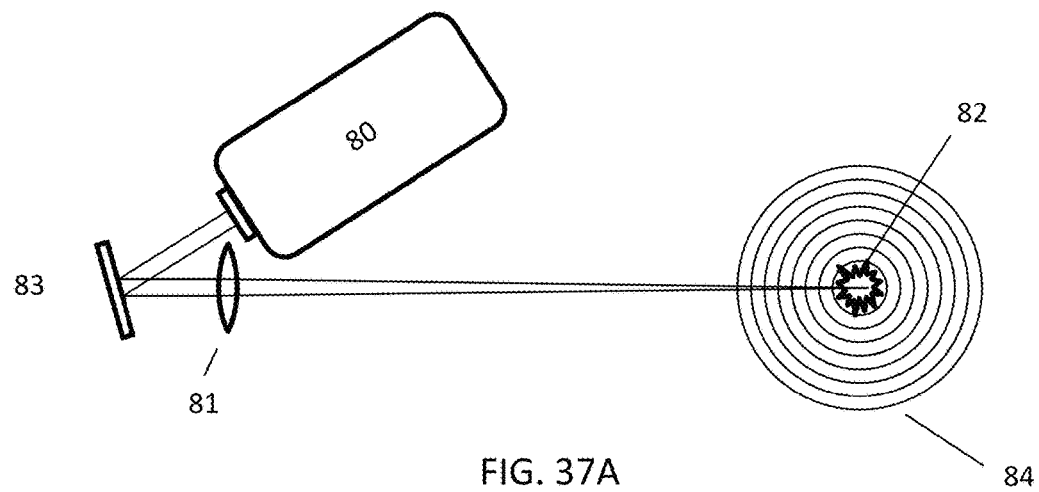
FIG. 37A shows a system for generating sound according to an exemplary embodiment of the invention.
Figure 37B:
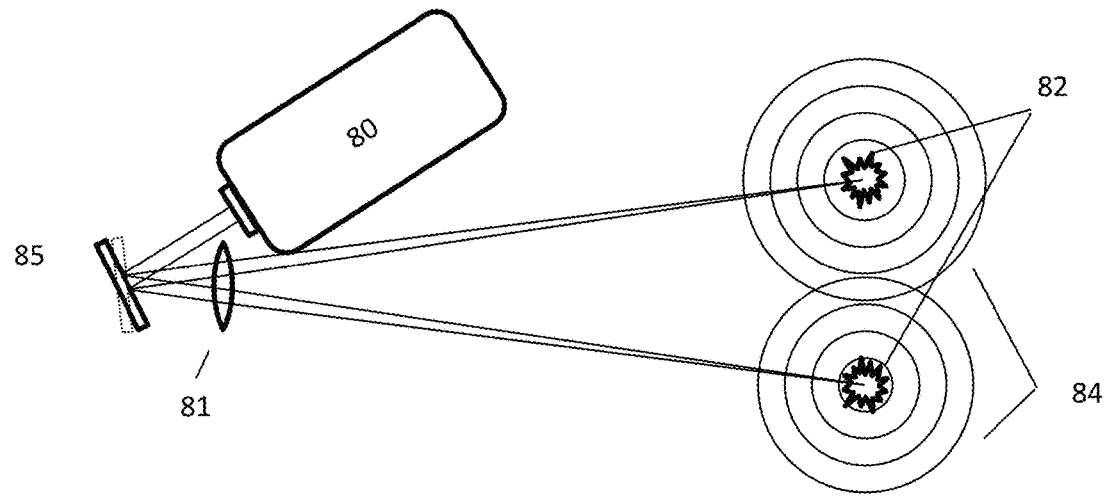
FIG. 37B shows a system for changing the frequency of generated sound according to an exemplary embodiment of the invention.
Figure 37C:
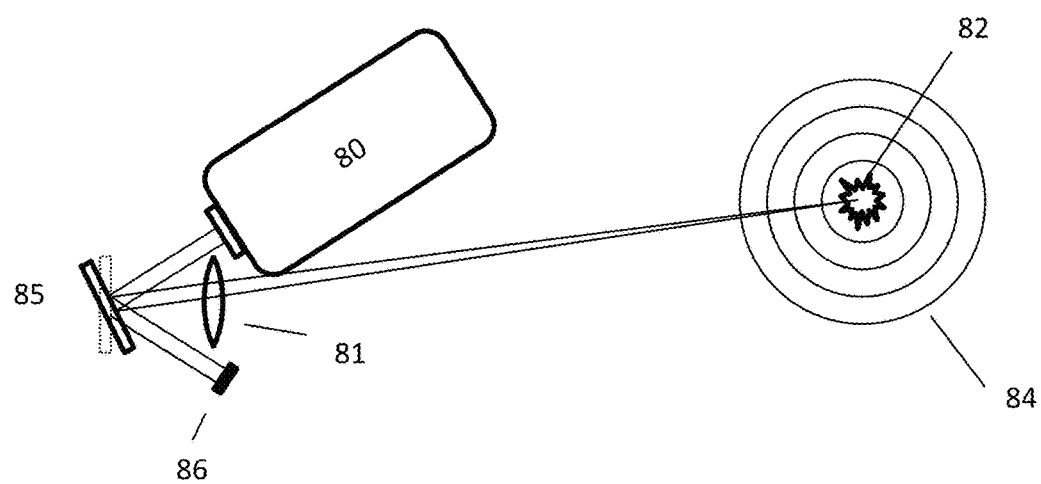
FIG. 37C shows a system for changing the frequency of generated sound according to another exemplary embodiment of the invention.
Figure 37D:
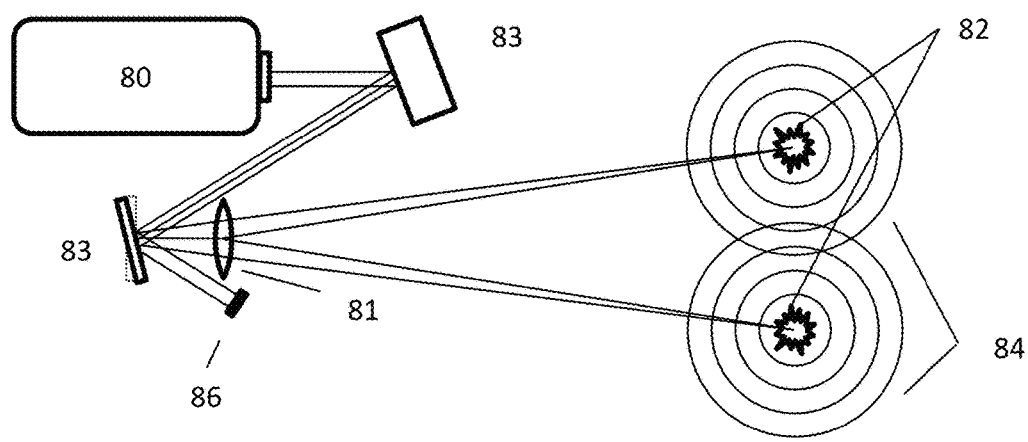
FIG. 37D shows a system for changing the frequency of generated sound according to another exemplary embodiment of the invention.

In this manner, half, one-third, one-fourth, etc., of the repetition frequency can be generated. A DMD SLM and/or a galvano scanner can be used to subtract excess laser pulses from the pulse series coming from the laser source. For example, a DMD SLM can be controlled to reflect only certain laser pulses from the pulse series. A galvano scanner unit can be controlled to direct only certain laser pulses from the pulse series to the target position. Referring to FIG. 37C, a galvano scanner unit 85 is used halve the frequency generated by alternately directing a laser beam pulse to a target position 82 and a termination point 86. Referring to FIG. 37B, a galvano scanner unit 85 is used to alternately direct a laser beam pulse to two target positions 82 to generate two sound sources each at half of the frequency. Referring to FIG. 37D, a galvano scanner unit 85 is used to alternately direct a laser beam pulse to two target positions 82 and a termination point 86 to generate two sound sources each at one third of the frequency. A DMD SLM is preferred because a galvano scanner unit is slower than a DMD SLM. A beam chopper or shutter can also be used to block certain pulses from the pulse series. With a faster laser source and SLM, the range of sound frequency that can be produced can be increased.

Fourier computer-generated holography (CGH) can also be used to control the number of laser pulses delivered to a sound source position per second by changing the distribution pattern. However, this requires an SLM that has a high scan rate.

Position control is performed by generating focal points of the laser pulse beam at target positions. 3D scanners such as the combination of a galvano scanner and a varifocal lens can be used. A galvano scanner unit scans the direction of the laser pulse beam in the lateral X and Y directions. A varifocal lens unit alters the focal length in the axial Z direction. Additionally, Fourier computer-generated holography (CGH) can be used to arrange the sound sources in free space.

Directivity control is performed by arranging one or more sound sources so that the radiated sounds interfere with each other in such a way that the resultant wavefront is directed to a target. Plasma generated by a femtosecond laser pulse radiates wideband waves of a very wide frequency range, including electromagnetic waves (radio frequency and light, known as supercontinuum) and sound waves (audible sound and ultrasound). Although a broad spectrum of waves co-exist, frequency bands can be separately controlled. When multiple plasma spots are spatially arranged in free space a "phased array" of light, electromagnetic wave, sound, and/or ultrasound can be generated.

Although the phases of the wave sources are same, the directivity of a specific frequency wave can be controlled by the arrangement of the wave sources (laser focal points) in order to create a specific interference pattern. The spatial position and distance among the plasma spots determine the time (phase) difference. Thus, it is not a "phased array" per se but it is a "spatial array".

Computational phase modulation permits complex placement of focal points in air. Particular spatial array arrangements can be designed in order to control the interference patterns and shape the wavefront to obtain directional control of the emitted sound.

An LC type SLM generates multiple interfering focal points by using the derived CGH. Additionally, a DMD SLM can control the amplitude of the laser pulse beam so that the resultant shockwaves can interfere with each other. A CGH can be derived using a simulator to design a sound wave distribution. After determining the arrangement of sound sources that would produce a desired wavefront, a CGH is calculated for LCSLM or DMD SLM based on the position of the sound sources.

A microlens array can also be used. The discrete small lenses split a single laser beam to, for example, four sound sources at intervals of the microlens array. If the interval is sufficiently far apart, the four sound sources can generate sound that interfere with each other to form a particular sound distribution pattern.

The longer filamentation radiates more intense sound wave vertically to the laser propagation. This effect may determine the preferable laser direction to deliver sound wave to a target point effectively.

Figure 40:
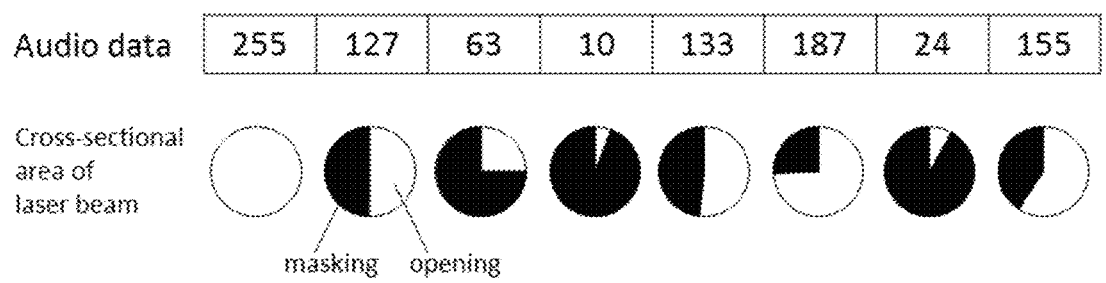
FIG. 40 shows a system for amplitude modulation according to an exemplary embodiment of the invention.

The inventors examined how audio data can be reproduced at the target position. One way to generate sound and voice is by using amplitude modulation. As shown in FIG. 40, a beam shutter can be used to control the power of individual pulses. To play 44.1-kHz-sampled data, at least 44.1-kHz is required for both of the pulse laser source and shutter.

This may also be realized by using harmonics of impulsive sound (e.g., shown in FIGS. 38 and 39 or by using much faster SLMs). A microphone that can measure up to 100 kHz was used to confirm that at least waves having a frequency up to 96 kHz were radiated. Although multiple frequency components are simultaneously radiated, a target frequency can be selected by controlling the directivities of each frequency. Pure tones may be difficult but at least most excess frequencies can be removed for a target direction.

Audio Application 2: Spatial Audio Augmented Reality

Aerial plasma speakers can transform ordinary objects into audio media. The aerial plasma sound source can be superimposed on or repositioned adjacent a real-world object. Thus, any real-world object can become the source of sound. For example, an aerial plasma sound source can be positioned next to the mouth of a toy figurine so as to make it appear that the toy figurine is the source of the sound. The aerial plasma can be repositioned manually or repositioned automatically by utilizing a camera system that can scan and map the environment around the workspace of the plasma speakers.

Audio Application 3: Aerial Speaker: Bodiless Mid-Air Speakers

The spatial position and intensity of a plasma spot can be changed by modifying a CGH. In accordance with an exemplary embodiment of the present invention, laser induced plasma can be generated anywhere and can be modulated to emit audible waves as a point sound source like a conventional speaker. The plasma can be induced at multiple points to act as a set of conventional surround sound speakers. For example, multiple laser induced plasma spots are arranged in a room in a conventional surround sound configuration and each plasma spot is modulated with a different audio signal.

In accordance with an exemplary embodiment of the present invention, a laser plasma speaker is configured to operate like a parametric directional speaker. The directivity is attained by arranging multiple sound sources. The directivity can be changed.

Audio Application 4: Aerial Speaker Array—Directed Speakers

An ultrasonic superdirective speaker can be simulated with laser-generated sound sources. The laser focal points radiate ultrasonic waves. These ultrasonic waves are modulated based on audio data. The non-linearity of air demodulates these modulated ultrasonic waves into audible sound.

Alternatively, the use of SLMs and computational phase modulation permits complex placement of focal points in air. Particular spatial array arrangements can be designed in order to control the interference patterns and shape the wave front to obtain directional control of the emitted sound.

Figure 41A:
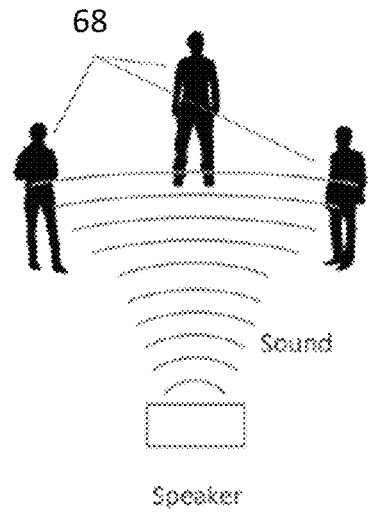
FIGS. 41A-41D show various speaker configurations that can be implemented according to an exemplary embodiment of the invention, more specifically.
Figure 41B:
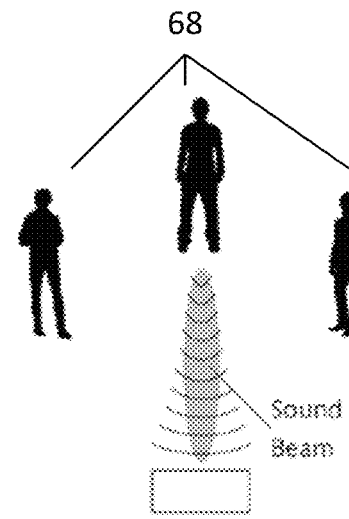
Figure 41C:
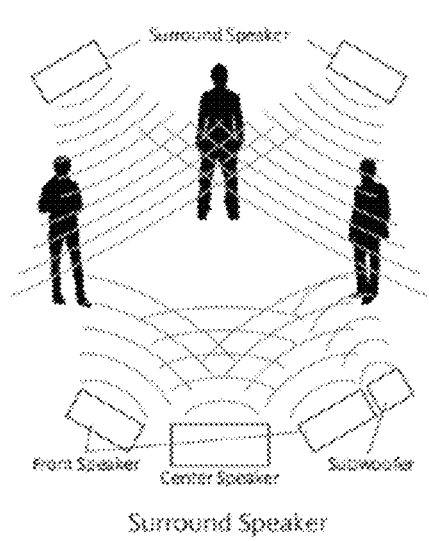
Figure 41D:
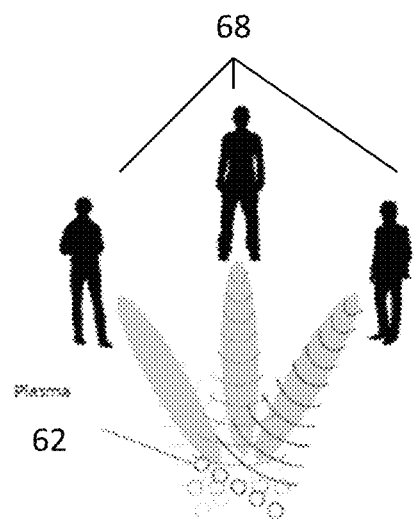
Figures 42A, 42B, 42C:
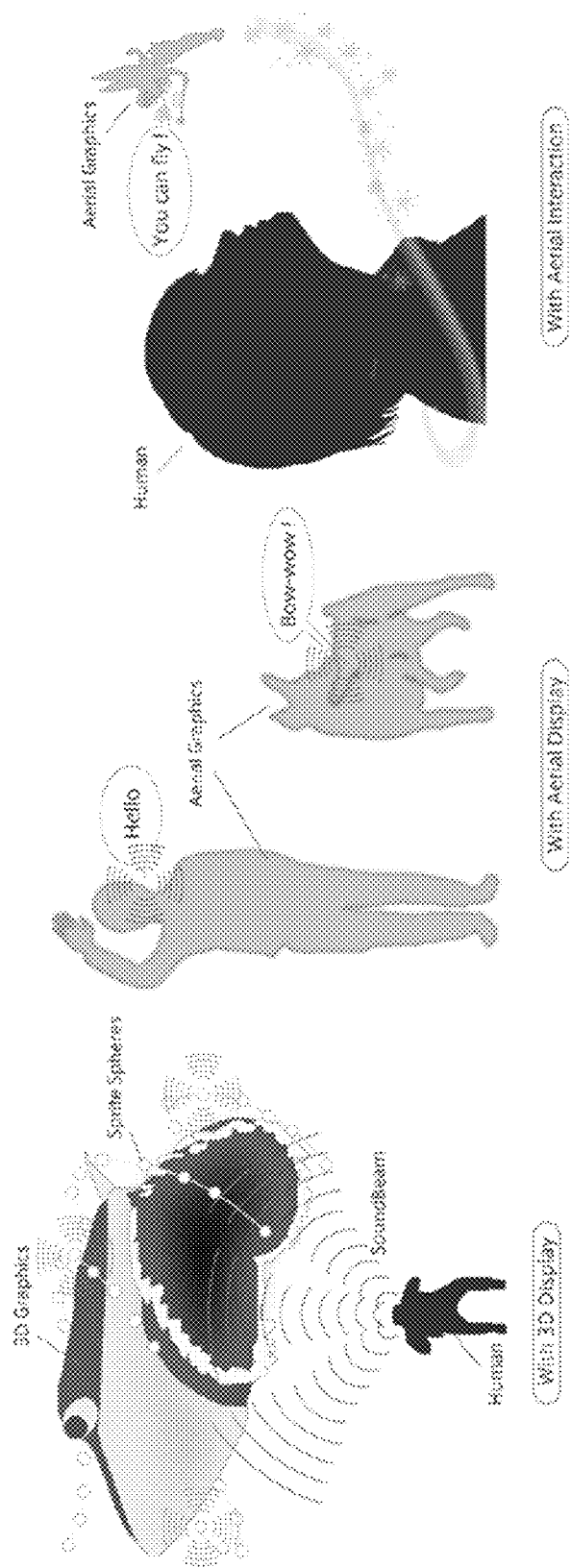
FIGS. 42A-42C shows various applications of spatial sound according to an exemplary embodiment of the invention, more specifically.
Figure 43:
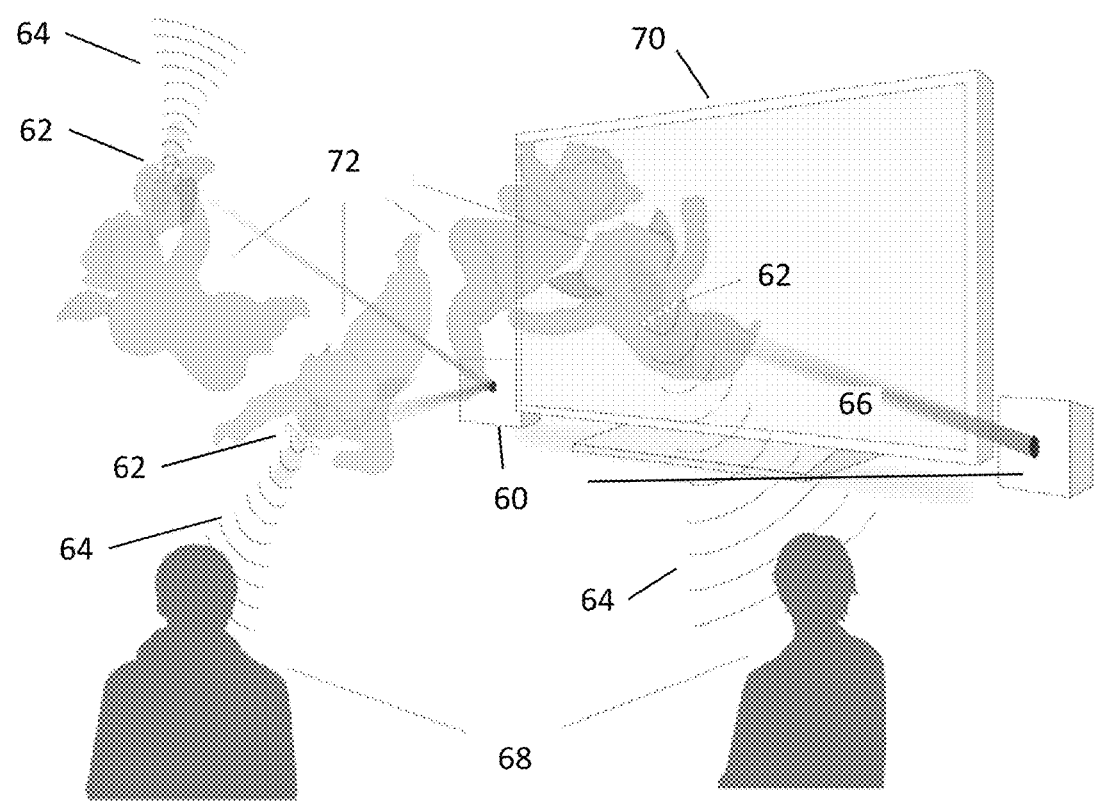
FIG. 43 shows another application of spatial sound with 3D graphics according to an exemplary embodiment of the invention.
Figure 44A:
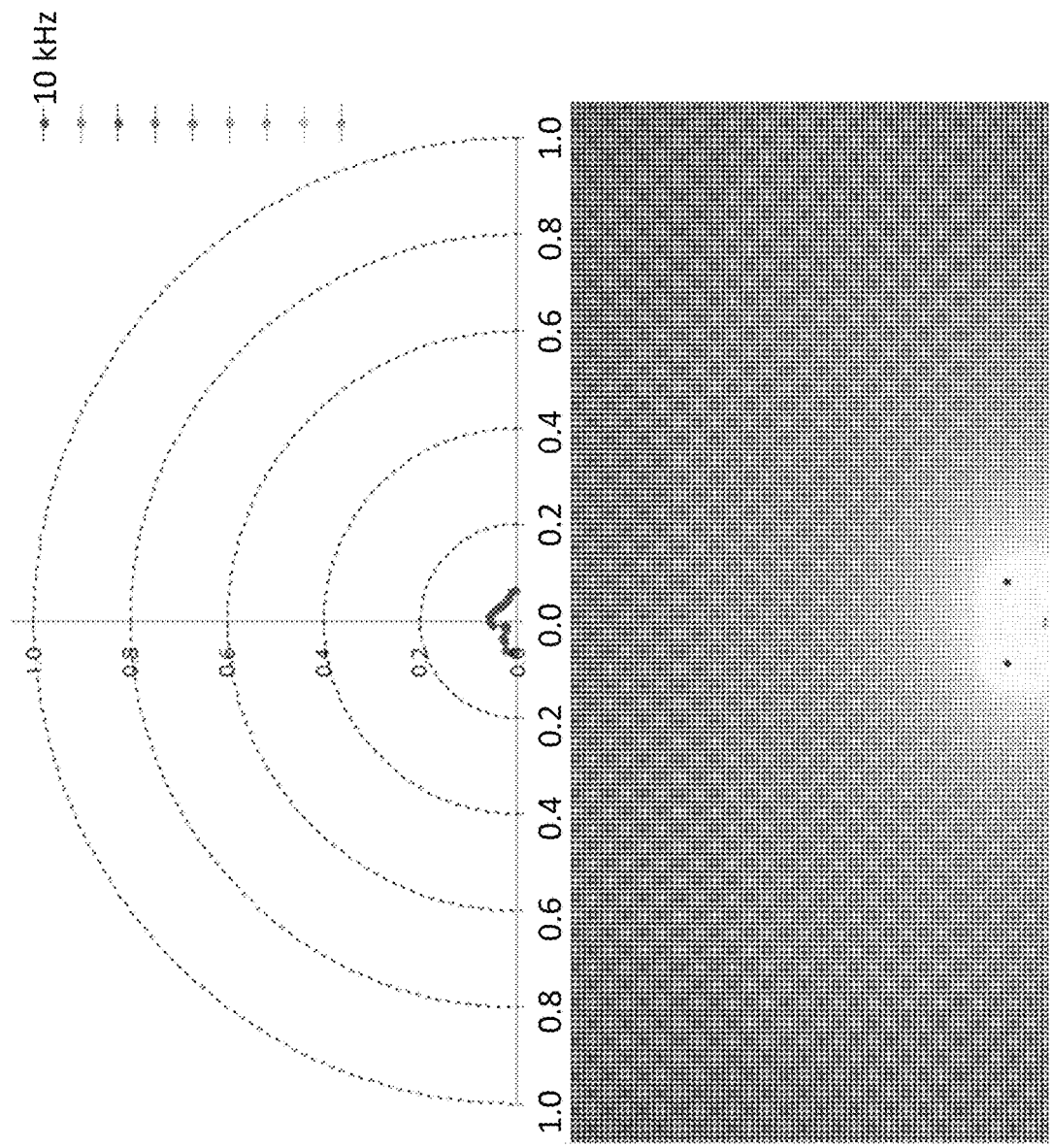
FIGS. 44A-44I shows the directivity characteristics of 10, 20, 30, 40, 50, 60, 70, 80, and 90 kHz components, respectively.
Figure 44B:
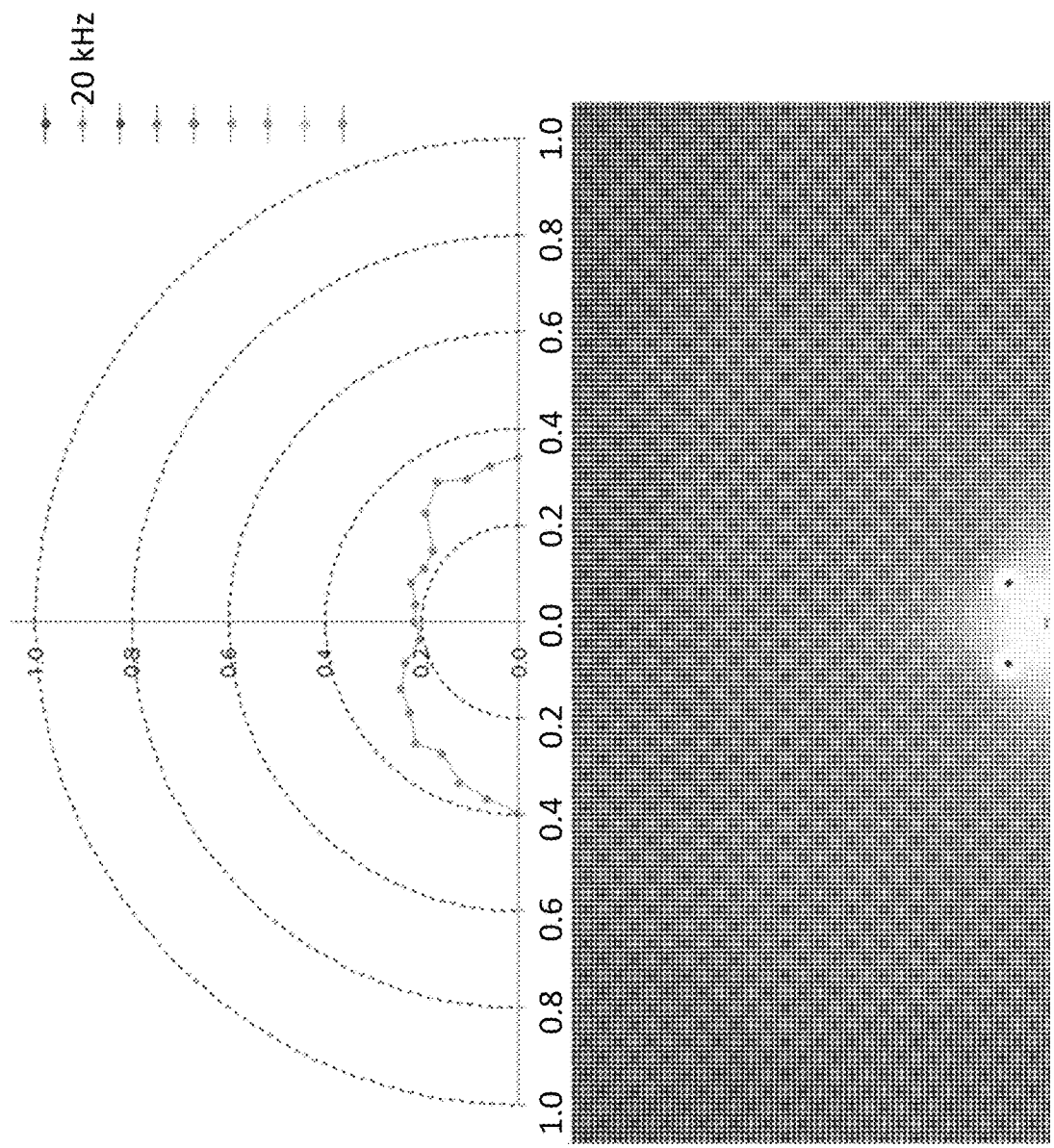
Figure 44C:
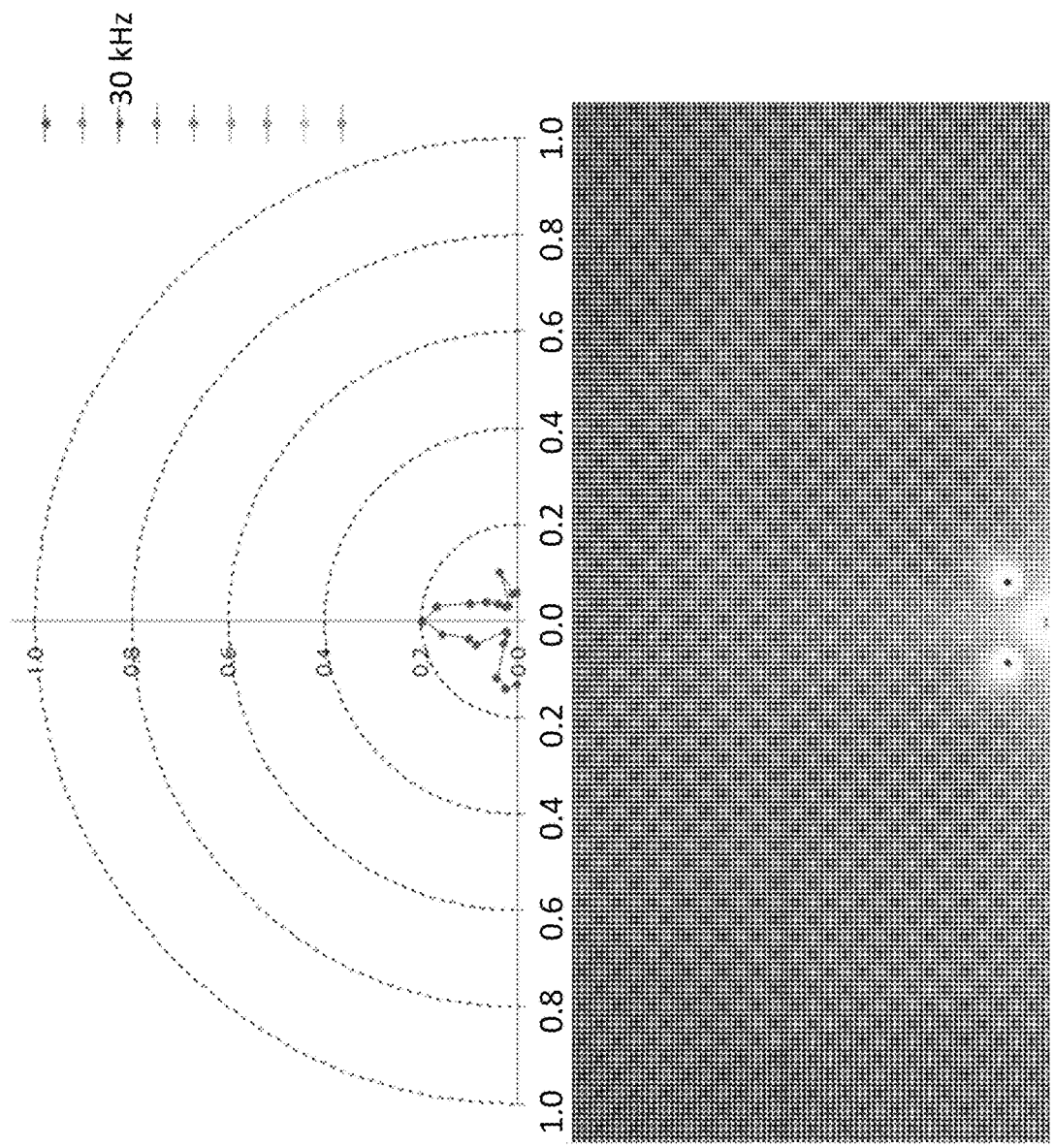
Figure 44D:
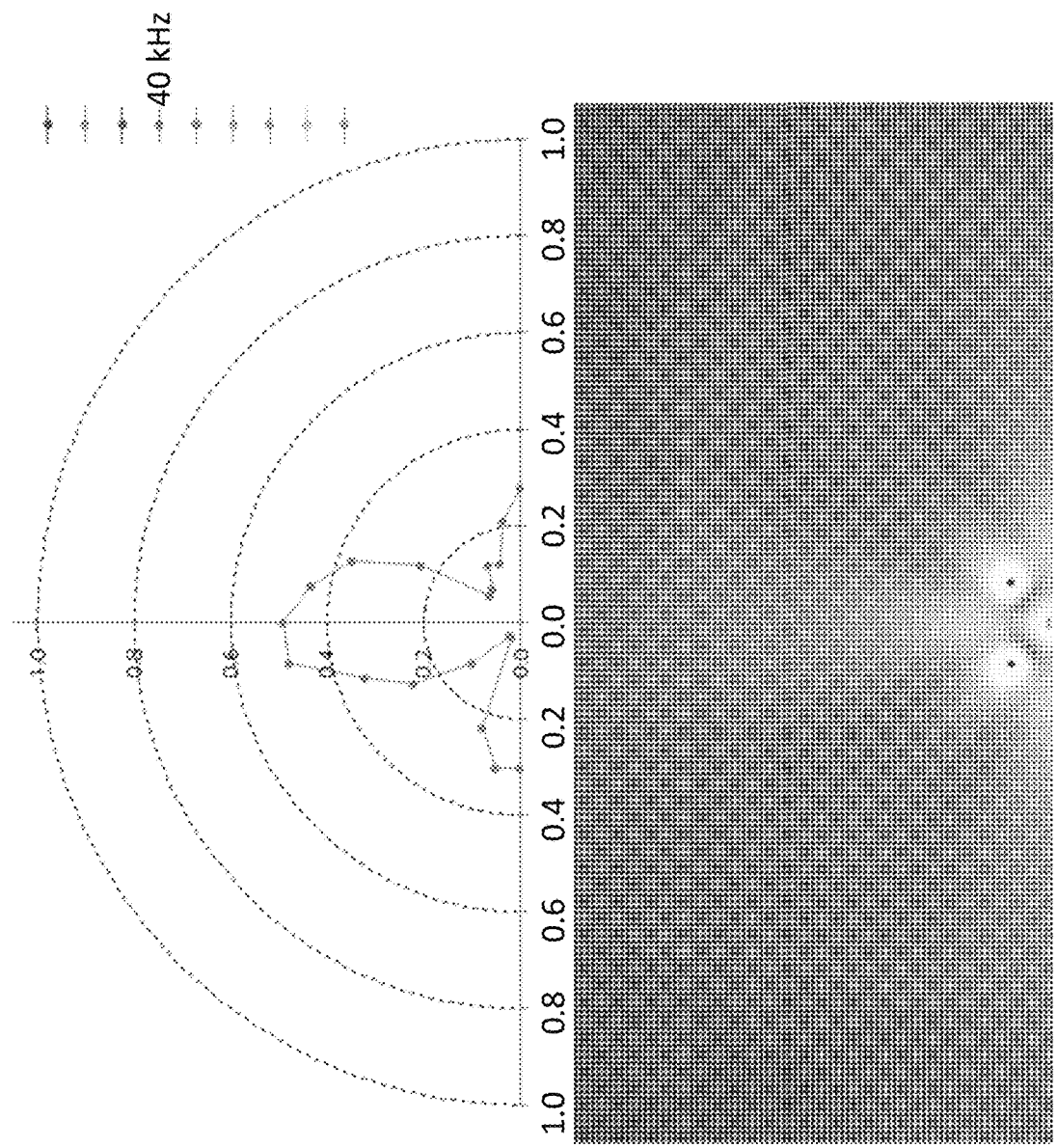
Figure 44E:
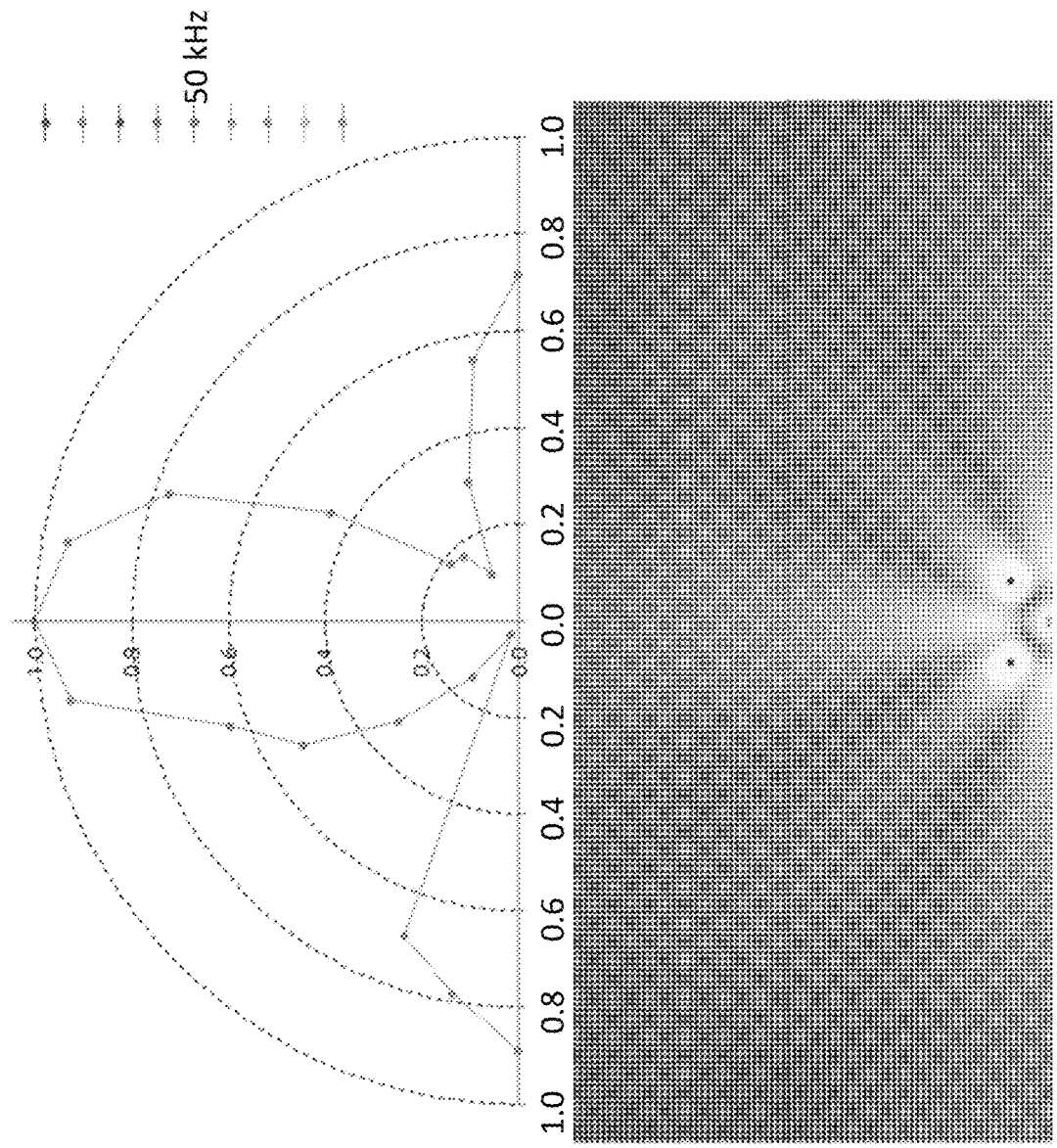
Figure 44F:
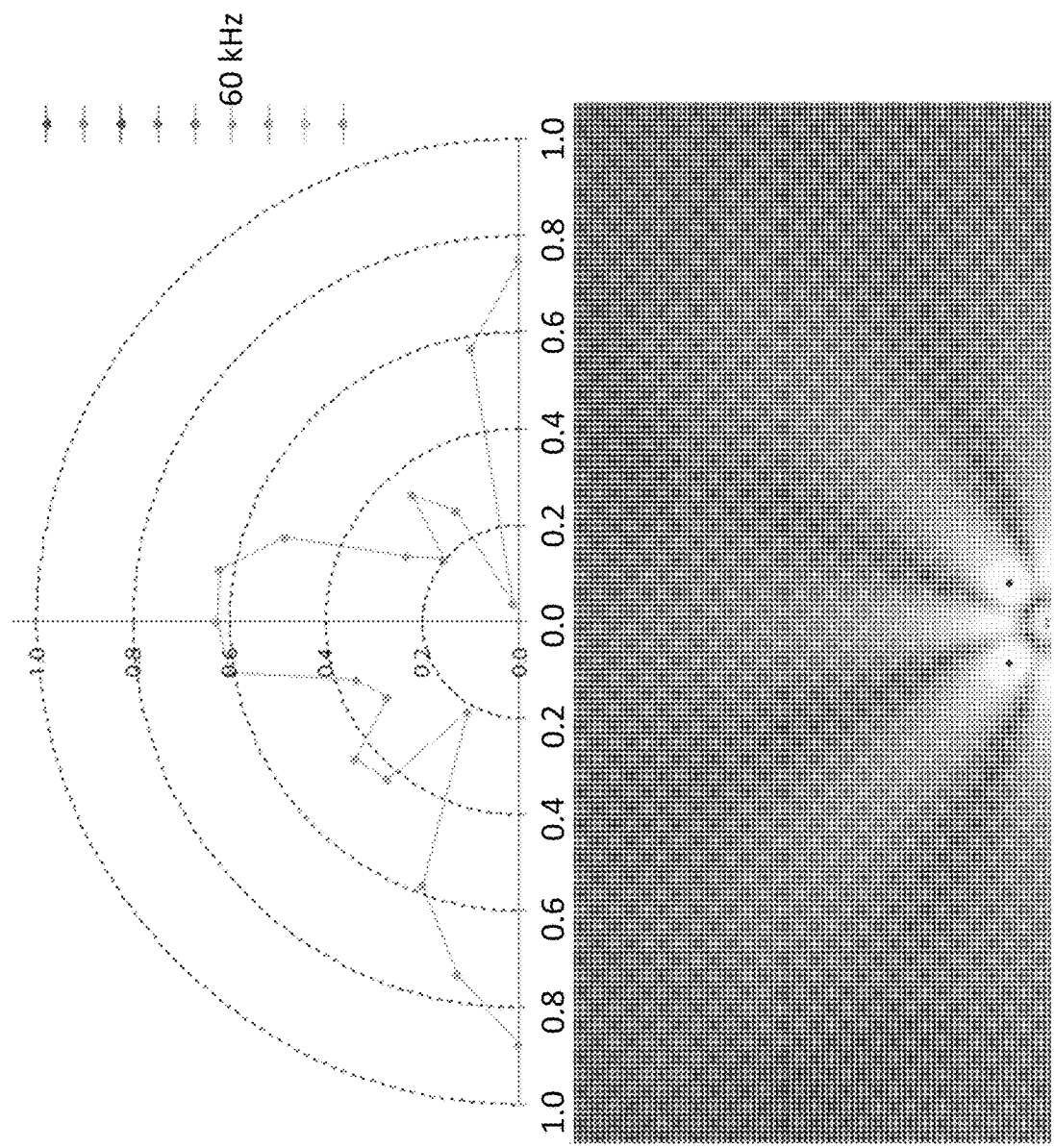
Figure 44G:
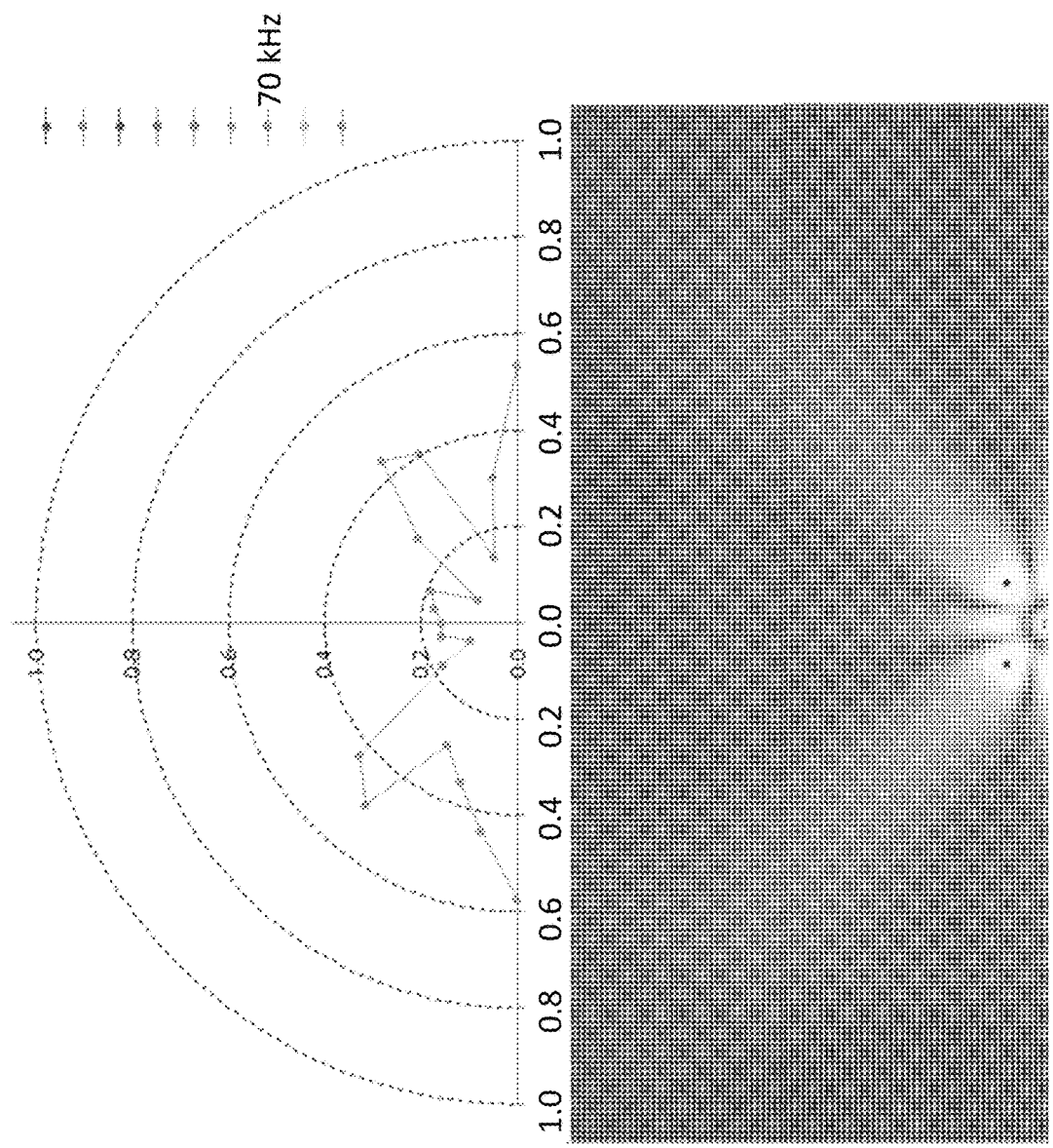
Figure 44H:
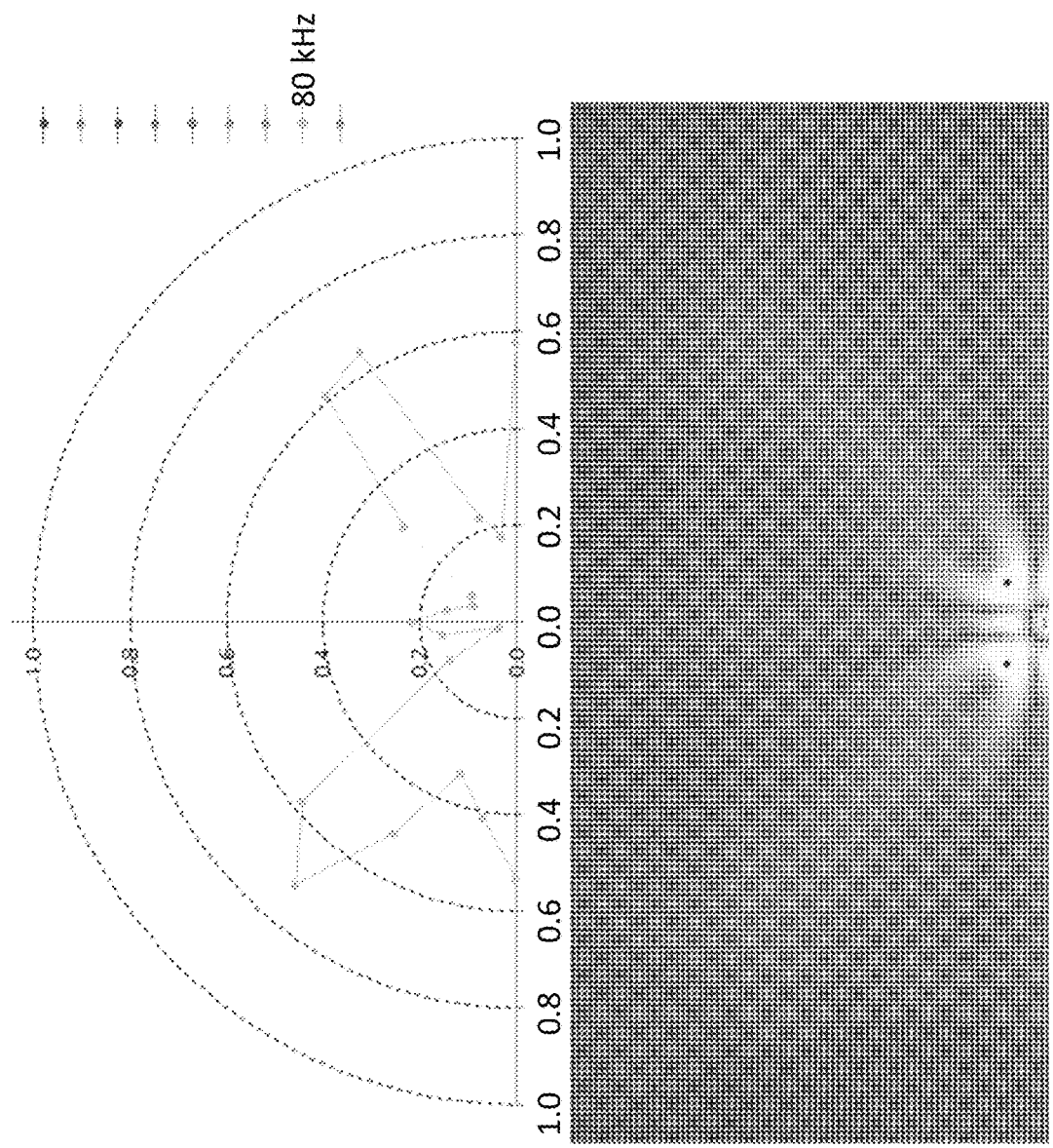
Figure 44I:
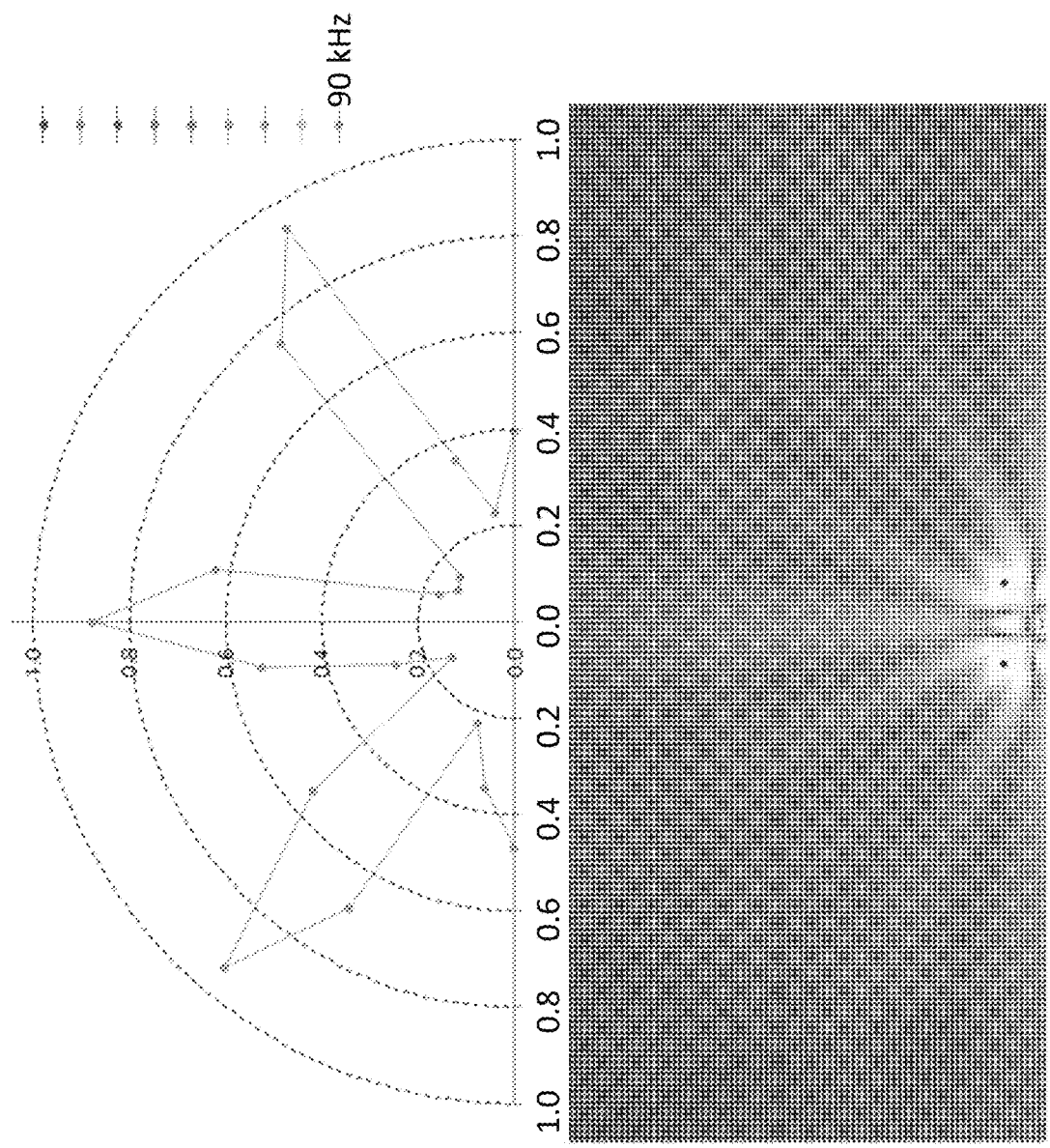

As shown in FIG. 41D which depicts an exemplary configuration for an aerial speaker array, the focal points 62 can be arranged in order to direct sound waves to specific target persons 68. As shown in FIG. 43 which depicts an exemplary set up for 3D audio generation in an immersive entertainment environment, the focal points 62 generated by aerial speaker array 60 can be continuously rearranged to track the motion and orientation of a virtual object 72 so that the sound 64 generated by plasma induced at focal points 62 appears to be emitted relative to the motion and orientation of the virtual object as perceived by a target person 68.

Improved Safety Applications

Aerial plasma generation requires an instantaneous laser power of petawatts per centimeter squared. The optical circuit should be developed and treated carefully. Ionization may occur along the optical circuit when high-intensity lasers are utilized. This limits the available laser power, as damage to the optical components must be avoided. Further, plasma generation is a nonlinear phenomenon and, therefore, careful handling is required. These issues should be carefully considered to ensure application safety. An SLM with higher reflectance efficiency can be used would allow an increase in the time-averaged laser power and thus a greater number of simultaneously addressed voxels can be generated.

In order to avoid undesired ionization, an objective lens is used to focus lower power high-intensity laser pulses to particular points in space to generate plasma. The use of an objective lens places a limit on the size of the workspace. The workspace is determined by the angle range of the galvano mirror and the depth range of the varifocal lens. However, the angle range of the galvano mirror is dependent on the aperture of the objective lens. An objective lens with a larger aperture would allow a larger angle range of the galvano scanner in the lateral direction, i.e., XY scanning.

In accordance with another embodiment of the present invention, safety can be further improved by increasing the scanning speed as a precaution to prevent skin damage or minimize discomfort.

In an exemplary embodiment, the volumetric display scans a three dimensional space very rapidly, therefore, it does not remain at specific points in space for long periods so serious damage is unlikely.

In accordance with another embodiment of the present invention, safety for interactive haptics can be further improved by adjusting the target position of the plasma to avoid the potential for serious damage by preventing further contact at the same point.

In an exemplary embodiment, a camera or sensor system can be used to monitor a user's activity in and around the workspace where plasma spots can be induced. As a precautionary measure, the plasma voxels can be disabled or repositioned within 17 ms (a single frame) from when the camera or sensor system detects a user touching a plasma voxel. This shutoff time is sufficiently less than the harmful exposure time of 2,000 ms. [Ochia et al. 2015]. If the repetition times and energy of laser source are increased, faster camera recognition system and faster scanning system would be needed.

Immersive Virtual Reality Application—Combined Audio-Visual-Haptic System

It is possible to combine the visual, haptic, and audio applications. 3D images rendered in air would appear to speak to users, who could interact with these images via touch. The visual application control rate is 30 fps, which is also sufficient for haptic application. This rate is significantly lower than that for audio application, so the visual application does not interfere with the audio application.

In accordance with an exemplary embodiment of the present invention, a method of realizing functional aerial audio speakers utilizing femtosecond laser induced plasma is provided. Plasma induced at the focal points of an ultra-short pulse laser generates impulse-like shockwaves, and the focal points can be distributed at arbitrary positions within a 3D space. The position of the focal points can be dynamically changes. Speakers rendered in air with a 7 W femtosecond laser source have broad frequency characteristics in the range from 1 kHz to 96 kHz.

The example experiments, experimental data, tables, graphs, plots, photographs, figures, and processing and/or operating parameters (e.g., values and/or ranges) described herein are intended to be illustrative of some possible operating conditions of the disclosed systems and methods and are not intended to limit the scope of the operating conditions for other embodiments of the methods and systems disclosed herein. Additionally, the experiments, experimental data, calculated data, tables, graphs, plots, photographs, figures, and other data disclosed herein demonstrate various regimes in which embodiments of the disclosed systems and methods may operate effectively to produce one or more desired results. Such operating regimes and desired results are not limited solely to specific values of operating parameters, conditions, or results shown, for example, in a table, graph, plot, figure, or photograph, but also include suitable ranges including or spanning these specific values. Accordingly, the values disclosed herein include the range of values between any of the values listed or shown in the tables, graphs, plots, figures, photographs, etc. Additionally, the values disclosed herein include the range of values above or below any of the values listed or shown in the tables, graphs, plots, figures, photographs, etc. as might be demonstrated by other values listed or shown in the tables, graphs, plots, figures, photographs, etc. Also, although the data disclosed herein may establish one or more effective operating ranges and/or one or more desired results for certain embodiments, it is to be understood that not every embodiment need be operable in each such operating range or need produce each such desired result. Further, other embodiments of the disclosed systems and methods may operate in other operating regimes and/or produce other results than shown and described with reference to the example experiments, experimental data, tables, graphs, plots, photographs, figures, and other data herein.

Other systems, setups, and parameters may be used in other implementations, which may provide the same or different results. Many variations are possible and are contemplated within the scope of this disclosure.

While particular embodiments of the invention have been illustrated and described, it would be obvious to those skilled in the art that various other changes and modifications may be made without departing from the spirit and scope of the invention. It is therefore intended to cover in the appended claims all such changes and modifications that are within the scope of this invention.

REFERENCES

1. Ammosov, M. V., Delone, N. B., and Krainov, V. P. 1986. Tunnel ionization of complex atoms and of atomic ions in an alternating electromagnetic field. Soviet Physics JETP 64, 6, 1191-1194.
2. Barnum, P. C., Narasimhan, S. G., and Kanade, T. 2010. A multi-layered display with water drops. *ACM Trans. Graph.* 29, 4 (July), 76:1-76:7.
3. Bengtsson, J. 1994. Kinoform design with an optimal-rotation-angle method. *Appl. Opt.* 33, 29 (October), 6879-6884.
4. Benzie, P., Watson, J., Surman, P., Rakkolainen, I., Hopf, K., Urey, H., Sainov, V., and Von Kopylow, C. 2007. A survey of 3dtv displays: Techniques and technologies. Circuits and Systems for Video Technology, *IEEE Transactions on* 17, 11 (November), 1647-1658.
5. Cain, C. P., Roach, W. P., Stolarski, D. J., Noojin, G. D., Kumru, S. S., Stockton, K. L., Zohner, J. J., and Rockwell, B. A., 2007. Infrared laser damage thresholds for skin at wavelengths from 0.810 to 1.54 microns for femto-to-microsecond pulse durations. In *Proc. SPIE*, vol. 6435, 64350 W-64350 W-12.
6. Clar, J. 2008. traffic. http://www.viatraffic.org/index.php?page=3ddisplay-cube-v4 (last accessed on 20 Jan. 2015).
7. Denk, W., Strickler, J., and Webb, W. 1990. Two-photon laser scanning fluorescence microscopy. *Science* 248, 4951, 73-76.
8. Downing, E., Hesselink, L., Ralston, J., and Macfarlane, R. 1996. A three-color, solid-state, three-dimensional display. *Science* 273, 5279, 1185-1189.
9. Eitoku, S., Tanikawa, T., and Suzuki, Y. 2006. Display composed of water drops for filling space with materialized virtual three-dimensional objects. In *Virtual Reality Conference*, 2006, 159-166.
10. Favalora, G. E., Napoli, J., Hall, D. M., Dorval, R. K., Giovinco, M., Richmond, M. J., and Chun, W. S. 2002. 100-million-voxel volumetric display. In *Proc. SPIE*, vol. 4712, 300-312.
11. Follmer, S., Leithinger, D., Olwal, A., Hogge, A., and Ishii, H. 2013. inform: Dynamic physical affordances and constraints through shape and object actuation. In *Proceedings of the 26th Annual ACM Symposium on User Interface Software and Technology*, ACM, New York, N.Y., USA, UIST '13, 417-426.
12. Grossman, T., and Balakrishnan, R. 2006. The design and evaluation of selection techniques for 3d volumetric displays. In *Proceedings of the 19th Annual ACM Symposium on User Interface Software and Technology*, ACM, New York, N.Y., USA, UIST '06, 3-12.
13. Hasegawa, S., and Hayasaki, Y. 2013. Liquid volumetric display with parallel optical access by computer-generated hologram. In *Digital Holography and Three-Dimensional Imaging*, Optical Society of America, DTh2A.7.
14. Hashida, T., Kakehi, Y., and Naemura, T. 2011. Photochromic sculpture: Volumetric color-forming pixels. In *ACM SIGGRAPH* 2011 *Emerging Technologies*, ACM, New York, N.Y., USA, SIGGRAPH '11, 11:1-11:1.
15. Hayasaki, Y., Sugimoto, T., Takita, A., and Nishida, N. 2005. Variable holographic femtosecond laser processing by use of a spatial light modulator. *Appl. Phys. Lett.* 87, 3.

16. Hoshi, T., Takahashi, M., Nakatsuma, K., and Shinoda, H. 2009. Touchable holography. In *ACM SIGGRAPH 2009 Emerging Technologies*, ACM, New York, N.Y., USA, SIGGRAPH '09, 23:1-23:1.
17. Ishikawa, H., and Saito, H. 2008. Closed-line based representation of 3d shape for point cloud for laser plasma scanning 3d display. *Proc. 18th International Conference on Artificial Reality and Telexistence* (ICAT08), Yokohama, Japan, December, 28-35.
18. Ishikawa, H., and Saito, H. 2008. Point cloud representation of 3d shape for laser-plasma scanning 3d display. *In Industrial Electronics, 2008 (IECON 2008) 34th Annual Conference of IEEE,* 1913-1918.
19. Ishikawa, H., Watanabe, H., Aoki, S., Saito, H., Shimada, S., Kakehata, M., Tsukada, Y., and Kimura, H. 2011. Surface representation of 3d object for aerial 3d display. *In Proc. SPIE*, vol. 7863, 78630X-78630X-8.
20. IWATA, H., YANO, H., NAKAIZUMI, F., AND KAWAMURA, R. 2001. Project feelex: Adding haptic surface to graphics. In Proceedings of the 28th Annual Conference on Computer Graphics and Interactive Techniques, ACM, New York, N.Y., USA, SIGGRAPH '01, 469-476.
21. Jansson, D. G., and Berlin, E. P. 1979. A three-dimensional computer display. *In First Annual Conference of Computer Graphics in CAD/CAM System,* 1979.
22. Jones, A., Mcdowall, I., Yamada, H., Bolas, M., and Debevec, P. 2007. Rendering for an interactive 360 deg light field display. *ACM Trans. Graph.* 26, 3 (July).
23. Karnik, A., Henderson, A., Dean, A., Pang, H., Campbell, T., Sakurai, S., Herrmann, G., Izadi, S., Kitamura, Y., and Subramanian, S. 2011. Vortex: Design and implementation of an interactive volumetric display. *In CHI '11 Extended Abstracts on Human Factors in Computing Systems*, ACM, New York, N.Y., USA, CHI EA '11, 2017-2022.
24. Keldysh, L. V. 1965. Ionization in the field of a strong electromagnetic wave. *Soviet Physics JETP* 20 (May), 1307-1314.
25. Kimura, H., Uchiyama, T., and Yoshikawa, H. 2006. Laser produced 3d display in the air. *In ACM SIGGRAPH 2006 Emerging Technologies*, ACM, New York, N.Y., USA, SIGGRAPH '06.
26. Kimura, H., Asano, A., Fujishiro, I., Nakatani, A., and Watanabe, H. 2011. True 3d display. *In ACM SIGGRAPH 2011 Emerging Technologies*, ACM, New York, N.Y., USA, SIGGRAPH '11, 20:1-20:1.
27. Lee, C., Diverdi, S., and Hollerer, T. 2009. Depth-fused 3d imagery on an immaterial display. *IEEE Trans. Vis. Comput. Graph.* 15, 1, 20-33.
28. Lee, J., Post, R., and Ishii, H. 2011. Zeron: Mid-air tangible interaction enabled by computer controlled magnetic levitation. *In Proceedings of the 24th Annual ACM Symposium on User Interface Software and Technology*, ACM, New York, N.Y., USA, UIST '11, 327-336.
29. Macfarlane, D. L. 1994. Volumetric three-dimensional display. *Appl. Opt.* 33 (November), 7453-7457.
30. Masia, B., Wetzstein, G., Didyk, P., and Gutierrez, D. 2013. A survey on computational displays: Pushing the boundaries of optics, computation, and perception. *Computers & Graphics* 37, 8, 1012-1038.
31. Matoba, Y., Tokui, T., Sato, R., Sato, T., and Koike, H. 2012. Splashdisplay: Volumetric projection using projectile beads. *In ACM SIGGRAPH 2012 Emerging Technologies*, ACM, New York, N.Y., USA, SIGGRAPH '12, 19:1-19:1.
32. Ochiai, Y., Hoshi, T., Oyama, A., and Rekimoto, J. 2013. Poppable display: A display that enables popping, breaking, and tearing interactions with people. *In 2013 IEEE 2nd Global Conference on Consumer Electronics (GCCE)*, 124-128.
33. Ochiai, Y., Hoshi, T., and Rekimoto, J. 2014. Pixie Dust: Graphics generated by levitated and animated objects in computational acoustic-potential field. *ACM Trans. Graph.* 33, 4 (July), 85:1-85:13.
34. Paddock, S. 1999. Confocal laser scanning microscopy. *Biotechniques* 27, 5, 992-1004.
35. Parker, E. 1948. Three-dimensional cathode-ray tube displays. *Journal of the Institution of Electrical Engineers—Part III: Radio and Communication Engineering* 95 (September), 371-387(16).
36. Pereira, T., Rusinkiewicz, S., and Matusik, W. 2014. Computational light routing: 3d printed optical fibers for sensing and display. *ACM Trans. Graph.* 33, 3 (June), 24:1-24:13.
37. Poupyrev, I., Nashida, T., Maruyama, S., Rekimoto, J., and Yamaji, Y. 2004. Lumen: Interactive visual and shape display for calm computing. *In ACM SIGGRAPH 2004 Emerging Technologies*, ACM, New York, N.Y., USA, SIGGRAPH '04, 17-.
38. Rakkolainen, I., Diverdi, S., Olwal, A., Candussi, N., H'U Llerer, T., Laitinen, M., Piirto, M., and Palovuori, K. 2005. The interactive fogscreen. *In ACM SIGGRAPH 2005 Emerging Technologies*, ACM, New York, N.Y., USA, SIGGRAPH '05.
39. Saito, H., Kimura, H., Shimada, S., Naemura, T., Kayahara, J., Jarusirisawad, S., Nozick, V., Ishikawa, H., Murakami, T., Aoki, J., Asano, A., Kimura, T., Kakehata, M., Sasaki, F., Yashiro, H., Mori, M., Torizuka, K., and Ino, K. 2008. Laser-plasma scanning 3d display for putting digital contents in free space. *Proc. SPIE* 6803, 680309-680309-10.
40. Soltan, P., Trias, J. A., Robinson, W. R., and Dahlke, W. J. 1992. Laser-based 3-d volumetric display system. *In Proc. SPIE*, vol. 1664, 177-192.
41. Sullivan, A. 2004. Depthcube solid-state 3d volumetric display. *In Proc. SPIE*, vol. 5291, 279-284.
42. Sutherland, I. E. 1968. A head-mounted three dimensional display. *In Proceedings of the Dec. 9-11, 1968, Fall Joint Computer Conference, Part I*, ACM, New York, N.Y., USA, AFIPS '68 (Fall, part I), 757-764.
43. Willis, K., Brockmeyer, E., Hudson, S., and Poupyrev, I. 2012. Printed optics: 3d printing of embedded optical elements for interactive devices. *In Proceedings of the 25th Annual ACM Symposium on User Interface Software and Technology*, ACM, New York, N.Y., USA, UIST '12, 589-598.
44. Yoshida, T., Kamuro, S., Minamizawa, K., Nii, H., and Tachi, S. 2010. Repro3d: Full-parallax 3d display using retro-reflective projection technology. *In ACM SIGGRAPH 2010 Emerging Technologies*, ACM, New York, N.Y., USA, SIGGRAPH '10, 20:1-20:1.
45. Bengtsson, J., Kinoform Design With An Optimal-Rotation Angle Method. Appl. Opt. 33, 29 (October 1994), 6879.6884.
46. Bolanowski, S. J. Jr., Gescheider, G. A., Verrillo, R. T., And Checkosky, C. M. 1968. Four channels mediate the mechanical aspects of touch. The Journal of the Acoustical Society of America. 84, 5, 1680.94.
47. Brandt, E. H. 1989. *Levitation in physics. Science* 243, 4889, 349.55.
48. Cain, C. P., Roach, W. P., Stolarski, D. J., Noojin, G. D., Kumru, S. S., Stockton, K. L., Zohner, J. J., And Rockwell, B. A. 2007. Infrared laser damage thresholds for skin at wavelengths from 0.810 to 1.54 microns for femto-to-microsecond pulse durations. In Proc. SPIE. Vol. 6435. 64350 W.64350 W.12.

49. Carter, T., Seah, S. A., Long, B., Drinkwater, B., And Subramanian, S. 2013. Ultrahaptics: Multi-point mid-air haptic feedback for touch surfaces. In Proceedings of the 26th Annual ACM Symposium on User Interface Software and Technology, ACM, New York, N.Y., USA, UIST '13, 505.514.

50. Gupta, S., Morris, D., Patel, S. N., And Tan, D. 2013. Airwave: Non-contact haptic feedback using air vortex rings. In Proceedings of the 2013 ACM International Joint Conference on Pervasive and Ubiquitous Computing, ACM, New York, N.Y., USA, UbiComp '13, 419.428.

51. Hasegawa, K., And Shinoda, H. 2013. Aerial display of vibrotactile sensation with high spatial-temporal resolution using large-aperture airborne ultrasound phased array. In World Haptics Conference (WHC), 2013, 31.36.

52. Hayasaki, Y., Sugimoto, T., Takita, A., And Nishida, N. 2005. Variable holographic femtosecond laser processing by use of a spatial light modulator. Appl. Phys. Lett. 87, 3.

53. Hoshi, T., Takahashi, M., Iwamoto, T., And Shinoda, H. 2010. Noncontact tactile display based on radiation pressure of airborne ultrasound. IEEE Transactions on Haptics 3, 3, 155.165.

54. Inoue, S., Kobayashi-Kirschvink, K. J., Monnai, Y., Hasegawa, K., Makino, Y., And Shinoda, H. 2014. Horn: The hapt-optic reconstruction. In ACM SIGGRAPH 2014 Emerging Technologies, ACM, New York, N.Y., USA, SIGGRAPH '14, 11:1.11:1.

55. Iwaki, S., Morimasa, H., Noritsugu, T., And Kobayashi, M. 2011. Contactless manipulation of an object on a plane surface using multiple air jets. In ICRA, IEEE, 3257.3262.

56. Jun, J. H, Park, J. R., Kim, S. P., Min, B. Y., Park J. Y., Kim H. S., Choi, S., Jung, S. J., Hwa P. S., Yeom D. I., Jung, G. I., Kim J. S., And Chung, S. C. 2015. Laser-induced thermoelastic effects can evoke tactile sensations. Scientific Reports 5, 11016.

57. Kimura, H., Uchiyama, T., And Yoshikawa, H. 2006. Laser produced 3d display in the air. In ACM SIGGRAPH 2006 Emerging Technologies, ACM, New York, N.Y., USA, SIGGRAPH '06.

58. Kono, M., Kakehi, Y., And Hoshi, T., 2013. lapillus bug. SIGGRAPH Asia 2013 Art Gallery.

59. Lee, H., Kim, J. S., Choi, S., Jun, J. H., Park, J. R., Kim, A. H., Oh, H. B., Kim, H. S, And Chung, S. C., 2015. Mid-air tactile stimulation using laser induced thermoelastic effects: The first study for indirect radiation. In World Haptics Conference (WHC), 2015, 374.380.

60. Lee, J., Post, R., And Ishii, H. 2011. Zcron: Midair tangible interaction enabled by computer controlled magnetic levitation. In Proceedings of the 24th Annual ACM Symposium on User Interface Software and Technology, ACM, New York, N.Y., USA, UIST '11, 327.336.

61. Marshall, M., Carter, T., Alexander, J., And Subramanian, S. 2012. Ultra-tangibles: Creating movable tangible objects on interactive tables. In Proceedings of the SIGCHI Conference on Human Factors in Computing Systems, ACM, New York, N.Y., USA, CHI '12, 2185.2188.

62. Ochiai, Y., Hoshi, T., Oyama, A., And Rekimoto, J. 2013. Poppable display: A display that enables popping, breaking, and tearing interactions with people. In Consumer Electronics (GCCE), 2013 IEEE 2nd Global Conference on, 124.128.

63. Ochiai, Y., Hoshi, T., And Rekimoto, J. 2014. Pixie dust: Graphics generated by levitated and animated objects in computational acoustic-potential field. ACM Trans. Graph. 33, 4 (July), 85:1.85:13.

64. Saga, S. 2014. Fingerflux: Near-surface haptic feedback on tabletops. In Proceedings of AsiaHaptics 2014, AsiaHaptics 2014.

65. Sodhi, R., Poupyrev, I., Glisson, M., And Israr, A. 2013. Aireal: Interactive tactile experiences in free air. ACM Trans. Graph. 32, 4 (July), 134:1.134:10.

66. Suzuki, Y., And Kobayashi, M. 2005. Air jet driven force feedback in virtual reality. Computer Graphics and Applications, IEEE 25, 1 (January), 44.47.

67. Weiss, M., Wacharamanotham, C., Voelker, S., And Borchers, J. 2011. Fingerflux: Near-surface haptic feedback on tabletops. In Proceedings of the 24th Annual ACM Symposium on User Interface Software and Technology, ACM, New York, N.Y., USA, UIST '11, 615.620.

68. AMMOSOV, M. V., DELONE, N. B., AND KRAINOV, V. P. 1986. Tunnel ionization of complex atoms and of atomic ions in an alternating electromagnetic field. *Soviet Physics—JETP* 64, 6, 1191-1194.

69. BENGTSSON, J. 1994. Kinoform design with an optimal-rotation angle method. *Appl. Opt.* 33, 29 (October), 6879-6884.

70. CAIN, C. P., ROACH, W. P., STOLARSKI, D. J., NOOJIN, G. D., KUMRU, S. S., STOCKTON, K. L., ZOHNER, J. J., AND ROCKWELL, B. A. 2007. Infrared laser damage thresholds for skin at wavelengths from 0.810 to 1.54 microns for femto-microsecond pulse durations. In *Proc. SPIE*, vol. 6435, 64350 W-64350 W-12.

71. HAYASAKI, Y., SUGIMOTO, T., TAKITA, A., AND NISHIDA, N. 2005. Variable holographic femtosecond laser processing by use of a spatial light modulator. *Appl. Phys. Lett.* 87, 3.

72. JOHNSTON, B., BAILEY, J., AND MCKINNON, D. 2014. Nico: An open-source interface, bridging the gap between musician and tesla coil. In *Proc. ICMC-SMC-2014*, 711-714.

73. KELDYSH, L. V. 1965. Ionization in the field of a strong electromagnetic wave. *Soviet Physics JETP* 20 (May), 1307-1314.

74. KIMURA, H., UCHIYAMA, T., AND YOSHIKAWA, H. 2006. Laser produced 3d display in the air. In *ACM SIGGRAPH 2006 Emerging Technologies*, ACM, New York, N.Y., USA, SIGGRAPH '06.

75. KONO, M., KAKEHI, Y., AND HOSHI, T., 2013. lapillus bug. SIGGRAPH Asia 2013 Art Gallery.

76. MARSHALL, M., CARTER, T., ALEXANDER, J., AND SUBRAMANIAN, S. 2012. Ultra-tangibles: Creating movable tangible objects on interactive tables. In *Proceedings of the SIGCHI Conference on Human Factors in Computing Systems*, ACM, New York, N.Y., USA, CHI '12, 2185-2188.

77. OCHIAI, Y., HOSHI, T., OYAMA, A., AND REKIMOTO, J. 2013. Poppable display: A display that enables popping, breaking, and tearing interactions with people. In *Consumer Electronics (GCCE), 2013 IEEE 2nd Global Conference on,* 124-128.

78. OCHIAI, Y., HOSHI, T., AND REKIMOTO, J. 2014. Pixie dust: Graphics generated by levitated and animated objects in computational acoustic-potential field. *ACM Trans. Graph.* 33, 4 (July), 85:1-85:13.

79. OCHIAI, Y., OYAMA, A., HOSHI, T., AND REKIMOTO, J. 2014. The colloidal metamorphosis: Time division multiplexing of the reflectance state. *IEEE Computer Graphics and Applications* 34, 4, 42-51.

80. OCHIAI, Y., KUMAGAI, K., HOSHI, T., REKIMOTO, J., HASEGAWA, S., AND YOSHIO, H. 2015. Fairy lights in femtoseconds: Aerial and volumetric graphics rendered by focused femtosecond laser combined with computational holographic fields. In *ACM SIGGRAPH 2015 Emerging Technologies*, ACM, New York, N.Y., USA, SIGGRAPH '15.

81. OCHIAI, Y., KUMAGAI, K., HOSHI, T., REKIMOTO, J., HASEGAWA, S., AND YOSHIO, H. 2015. Fairy lights in femtoseconds: Aerial and volumetric graphics rendered by focused femtosecond laser combined with computational holographic fields. *CoRR abs/*1506. 06668.

82. SANO, S., HASHISHIN, Y., AND NAKAYAMA, T. 2011. Development of cw co2 laser percussion technique. In *5th Kuala Lumpur International Conference on Biomedical Engineering 2011* Springer Berlin Heidelberg, N. Osman, W. Abas, A. Wahab, and H.-N. Ting, Eds., vol. 35 of *IFMBE Proceedings*, 296-299.

83. SHINAGAWA, K., AMEMIYA, Y., TAKEMURA, H., KAGAMI, S., AND MIZOGUCHI, H. 2007. Three dimensional simulation and measurement of sound pressure distribution generated by 120 ch plane loudspeaker array. In *Systems, Man and Cybernetics, 2007. ISIC. IEEE International Conference on*, 278-283.

84. SHINODA, H., NAKAJIMA, T., UENO, K., AND KOSHIDA, N. 1999. Thermally induced ultrasonic emission from porous silicon. *Nature* 400, 853-855.

85. YONEYAMA, M., FUJIMOTO, J., KAWAMO, Y., AND SASABE, S. 1983. The audio spotlight: An application of nonlinear interaction of sound waves to a new type of loudspeaker design. *The Journal of the Acoustical Society of America* 73, 5, 1532-1536.

We claim:

1. A plasma generator comprising:
a femtosecond light source that generates a laser pulse beam;
a processor that computes a computer generated hologram, said computer generated hologram including phase modulation values;
a spatial light modulator that modifies said laser pulse beam using said phase modulation values to generate simultaneously addressed multiple voxels;
a three dimensional scanner comprising a galvano scanner and a varifocal lens, the three dimensional scanner directing the modified laser pulse beam to one or more focal points in air; and
a fixed objective lens that focuses the modified laser pulse beam directed by said three dimensional scanner to generate an aerial tactile image pattern, wherein said fixed objective lens is disposed between said varifocal lens and said aerial tactile image pattern.

2. The plasma generator of claim 1, wherein the modified laser pulse beam induces a light emission effect at one or more focal points.

3. The plasma generator of claim 2, further comprising a sensor that detects a change in brightness of said light emission effect.

4. The plasma generator of claim 1, wherein the modified laser pulse beam generates a palpable light field at said one or more focal points.

5. The plasma generator of claim 4, further comprising an ultrasonic phased array that generates a palpable acoustic field at said one or more focal points.

6. The plasma generator of claim 4, further comprising one or more ultrasonic phased arrays that generate a palpable acoustic field surrounding said one or more focal points.

7. A method of generating plasma, comprising:
generating a femtosecond laser pulse beam;
computing a computer generated hologram, said computer generated hologram including phase modulation values;
modifying said femtosecond laser pulse beam using said computed phase modulation values to generate simultaneously addressed multiple voxels;
directing said modified laser pulse beam to one or more focal points in air using a three dimensional scanner comprising a galvano scanner and a varifocal lens; and
focusing the directed laser pulse beam to generate a tactile image without moving a lens that is closest to the tactile image.

8. The method of claim 7, further comprising the step of focusing said modified laser pulse beam to induce a light emission effect at said one or more focal points.

9. The method of claim 8, further comprising the step of detecting a change in brightness of said light emission effect.

10. The method of claim 9, further comprising the step of using the detected change as an input selection.

11. The method of claim 8, further comprising the step of inducing said light emission effects at a rate sufficient to generate persistence of vision.

12. The method of claim 8, further comprising the step of determining a new set of one or more focal points that is adjacent to said one or more focal points.

13. The method of claim 7, further comprising the step of generating a palpable light field at said one or more focal points.

14. The method of claim 13, further comprising the step of generating ultrasonic acoustic radiation pressure at said one or more focal points.

15. The method of claim 13, further comprising the step of generating ultrasonic acoustic radiation pressure around said one or more focal points.

16. The method of claim 7, further comprising the step of directing a sequence of said one or more modified laser pulse beams at said one or more focal points to induce light emission effects that create sound waves.

17. The method of claim 16, wherein the sound waves are in the audible frequency range.

18. The method of claim 16, wherein the sound waves are in the ultrasonic frequency range.

19. A method of generating plasma, comprising:
generating a plurality of femtosecond laser pulse beams;
computing a computer generated hologram, said computer generated hologram including phase modulation values;
modifying said plurality of femtosecond laser pulse beams using said computed phase modulation values to generate simultaneously addressed multiple voxels;
directing said plurality of modified femtosecond laser pulse beams, alternately, to two or more focal points in air using a throe dimensional scanner comprising a galvano scanner and a varifocal lens; and
providing a fixed objective lens that focuses the directed laser pulse beams to generate an aerial tactile image pattern, wherein said fixed objective lens is disposed closest to the aerial tactile image pattern.

20. The method of claim 19, wherein said two or more focal points comprise a palpable tactile pattern.

21. The method of claim 20, further comprising the step of generating ultrasonic acoustic radiation pressure near said two or more focal points.

* * * * *